US007187269B2

(12) United States Patent
Ohdachi et al.

(10) Patent No.: US 7,187,269 B2
(45) Date of Patent: Mar. 6, 2007

(54) NOTIFYING DEVICE, NOTIFYING METHOD, AND RECORDING MEDIUM

(75) Inventors: Eriko Ohdachi, Yokohama (JP); Yuki Kawamura, Sagamihara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 617 days.

(21) Appl. No.: 10/380,732

(22) PCT Filed: Aug. 27, 2001

(86) PCT No.: PCT/JP01/07314

§ 371 (c)(1), (2), (4) Date: Jul. 15, 2003

(87) PCT Pub. No.: WO02/23506

PCT Pub. Date: Mar. 21, 2002

(65) Prior Publication Data

US 2004/0021582 A1 Feb. 5, 2004

(30) Foreign Application Priority Data

Sep. 18, 2000 (JP) ............................ 2000-281925

(51) Int. Cl.
*B60Q 1/00* (2006.01)

(52) U.S. Cl. .................. 340/425.5; 340/438; 340/902; 340/988; 340/994; 340/995.1; 701/25; 701/117; 701/201; 701/202

(58) Field of Classification Search ............ 340/425.5, 340/438, 901, 902, 903, 905, 988, 994, 995.1, 340/995.17, 990, 991; 701/1, 200, 201, 202, 701/209, 211, 213, 117, 25; 342/456, 457

See application file for complete search history.

(56) References Cited

U.S. PATENT DOCUMENTS

| | | | | |
|---|---|---|---|---|
| 4,360,875 | A | 11/1982 | Behnke | |
| 5,594,432 | A | 1/1997 | Oliva et al. | |
| 5,721,678 | A | 2/1998 | Widl | |
| 6,310,543 | B1 * | 10/2001 | Yoshioka et al. | 340/436 |
| 6,700,504 | B1 * | 3/2004 | Aslandogan et al. | 340/901 |

FOREIGN PATENT DOCUMENTS

| | | |
|---|---|---|
| JP | 63-164751 | 7/1988 |
| JP | 6/259694 | 9/1994 |
| JP | 7-15541 | 1/1995 |

(Continued)

*Primary Examiner*—Davetta W. Goins
(74) *Attorney, Agent, or Firm*—Pearne & Gordon LLP

(57) ABSTRACT

The present invention provides a notification apparatus, a notification method, and a recording medium, which are capable of notifying to a user, such a fact that either trouble or an accident happens to occur at a registered point when a target point of a vehicle is made coincident with the registered point which has been previously registered.

The notification apparatus of the present invention is arranged by comprising: an acquisition unit (1) for acquiring target point information A indicative of a target point to which an emergency vehicle is directed; a storage unit (2) for storing therein registered point information B indicative of a registered point which has been previously registered by an owner of the notification apparatus; an identification unit (3) for identifying as to whether or not the target point information A acquired by the acquisition unit (1) is made coincident with the registered point information B stored in the storage unit (2); and a notification unit (4) for notifying an identification result obtained in the identification unit (3) to the owner of this communication apparatus.

34 Claims, 32 Drawing Sheets

FOREIGN PATENT DOCUMENTS

| | | |
|---|---|---|
| JP | 10-222779 | 8/1998 |
| JP | 11-14388 | 1/1999 |
| JP | 11-250383 | 9/1999 |
| JP | 11-328563 | 11/1999 |
| JP | 11-341193 | 12/1999 |
| NL | 1001830 | 12/1995 |

* cited by examiner

*FIG. 15*

| J | T | K | I |
|---|---|---|---|
| ADDRESS INFORMATION $J_1$ | TELEPHONE NUMBER INFORMATION $T_1$ | PERSONAL ID INFORMATION $K_1$ | POSITIONAL INFORMATION $I_1$ |
| ADDRESS INFORMATION $J_2$ | TELEPHONE NUMBER INFORMATION $T_2$ | PERSONAL ID INFORMATION $K_2$ | POSITIONAL INFORMATION $I_2$ |
| ⋮ | ⋮ | ⋮ | ⋮ |
| ADDRESS INFORMATION $J_n$ | TELEPHONE NUMBER INFORMATION $T_n$ | PERSONAL ID INFORMATION $K_n$ | POSITIONAL INFORMATION $I_n$ |

*FIG. 16*

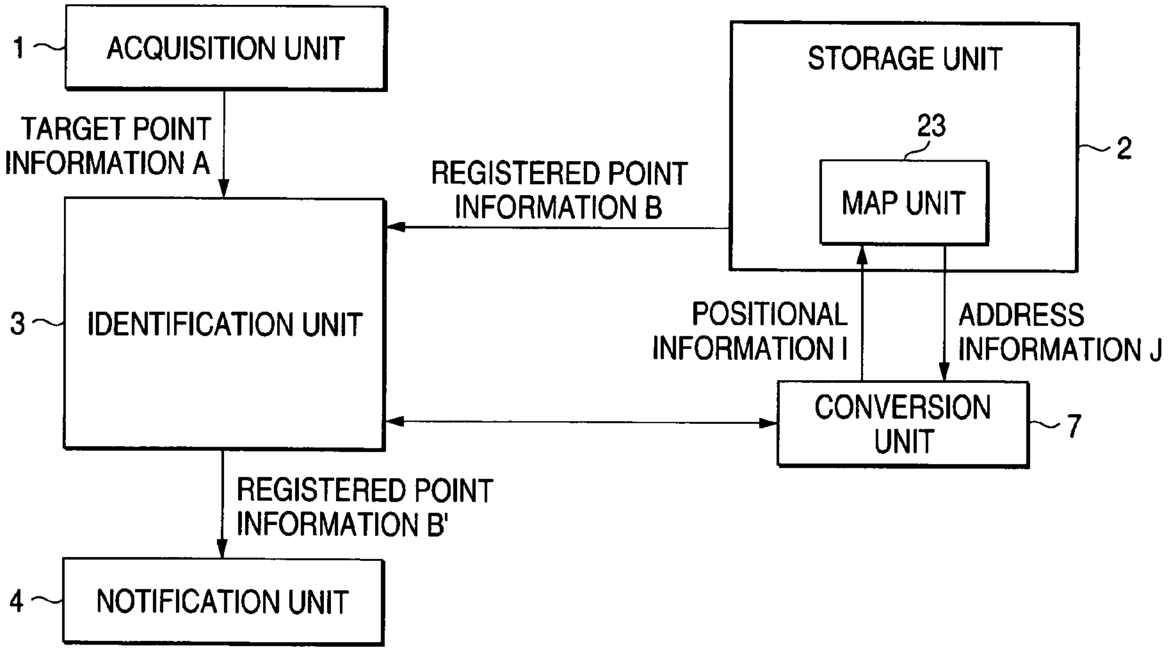

FIG. 19

| S | Z |
|---|---|
| SHAPE $S_1$ | ATTRIBUTE $Z_1$ |
| ⋮ | ⋮ |
| SHAPE $S_n$ | ATTRIBUTE $Z_n$ |

FIG. 20

| IC | IG | | |
|---|---|---|---|
| POSITIONAL INFORMATION NUMBER | POSITIONAL INFORMATION $I_1$ | ........ | POSITIONAL INFORMATION $I_n$ |

FIG. 21

| JS | J | JR |
|---|---|---|
| ADDRESS SHAPE $JS_1$ | ADDRESS INFORMATION $J_1$ | ADDRESS RULE $JR_1$ |
| ADDRESS SHAPE $JS_2$ | ADDRESS INFORMATION $J_2$ | ADDRESS RULE $JR_2$ |
| ⋮ | ⋮ | ⋮ |
| ADDRESS SHAPE $JS_7$ | ADDRESS INFORMATION $J_7$ | ADDRESS RULE $JR_7$ |
| ⋮ | ⋮ | ⋮ |
| ADDRESS SHAPE $JS_n$ | ADDRESS INFORMATION $J_n$ | ADDRESS RULE $JR_n$ |

FIG. 32

| CONDITION DURING IDENTIFYING OPERATION | RESULT OF IDENTIFYING OPERATION | STRUCTURE OF MAP FORMING INSTRUCTION | | MAP INFORMATION | CASE |
|---|---|---|---|---|---|
| | | FIRST MAP FORMING INSTRUCTION | SECOND AND SUCCEEDING MAP FORMING INSTRUCTIONS | | |
| CONTENT OF TARGET POINT INFORMATION IS NOT SO PRECISE THAN THAT OF REGISTERED POINT INFORMATION | ANY ONE OF REGISTERED POINT INFORMATION ($B_x$) IS MADE COINCIDENT WITH TARGET POINT INFORMATION | PRODUCED BY TARGET POINT INFORMATION (A) ITSELF | PRODUCED BY REGISTERED POINT INFORMATION ($B_x$) WHOSE PORTION IS MADE COINCIDENT WITH TARGET POINT INFORMATION | FIG. 33 | (a) |
| | ALL OF REGISTERED POINT INFORMATION IS NOT MADE COINCIDENT WITH TARGET POINT INFORMATION | PRODUCED BY TARGET POINT INFORMATION (A) ITSELF | PRODUCED BY ALL OF REGISTERED POINT INFORMATION ($B_1$ TO $B_n$) OF REGISTRATION UNIT 21 OF STORAGE UNIT 2 | FIG. 34 | (b) |
| IDENTIFY AS TO WHETHER OR NOT RANGE WHERE REGISTERED POINT INFORMATION IS LOCATED AS CENTER IS MADE COINCIDENT WITH TARGET POINT INFORMATION | ANY ONE OF REGISTERED POINT INFORMATION ($B_x$) IS MADE COINCIDENT WITH TARGET POINT INFORMATION | PRODUCED BY PORTION OF TARGET POINT INFORMATION (A) USED IN IDENTIFYING OPERATION | PRODUCED BY REGISTERED POINT INFORMATION ($B_x$) WHOSE PORTION IS MADE COINCIDENT WITH TARGET POINT INFORMATION | FIG. 33 | (c) |
| | ALL OF REGISTERED POINT INFORMATION IS NOT MADE COINCIDENT WITH TARGET POINT INFORMATION | PRODUCED BY PORTION OF TARGET POINT INFORMATION (A) USED IN IDENTIFYING OPERATION | PRODUCED BY ALL OF REGISTERED POINT INFORMATION ($B_1$ TO $B_n$) OF REGISTRATION UNIT 21 OF STORAGE UNIT 2 | FIG. 34 | (d) |

FIG. 42

| |
|---|
| TARGET POINT INFORMATION A |

↓ IDENTIFICATION

2

| | | |
|---|---|---|
| REGISTERED POINT INFORMATION $B_1$ | NOTIFICATION DESTINATION INFORMATION $C_1$ | CHARGING DESTINATION INFORMATION $D_1$ |
| REGISTERED POINT INFORMATION $B_2$ | NOTIFICATION DESTINATION INFORMATION $C_2$ | CHARGING DESTINATION INFORMATION $D_2$ |
| ⋮ | ⋮ | ⋮ |
| REGISTERED POINT INFORMATION $B_n$ | NOTIFICATION DESTINATION INFORMATION $C_n$ | CHARGING DESTINATION INFORMATION $D_n$ |

FIG. 45

| DIGIT NUMBER | | | a) TARGET POINT INFORMATION/ REGISTERED POINT INFORMATION | b) IDENTIFI-CATION DEGREE INFORMATION |
|---|---|---|---|---|
| 1 | PREFECTURE | KANAGAWA | 1 | 1 |
| 2 | | | 4 | 1 |
| 3 | SHI/KU/CHO/ SON | YOKOHAMA-SHI, KOHOKU-KU | 1 | 1 |
| 4 | | | 0 | 1 |
| 5 | | | 9 | 1 |
| 6 | OAZA | TSUNASHIMA-NISHI | 0 | 1 |
| 7 | | | 8 | 1 |
| 8 | | | 3 | 1 |
| 9 | CHOME | 99-CHOME | 9 | 1 |
| 10 | | | 9 | 1 |
| 11 | BANCHI | 100-BANCHI | 0 | 1 |
| 12 | | | 0 | 1 |
| 13 | | | 1 | 1 |
| 14 | | | 0 | 1 |
| 15 | | | 0 | 1 |
| 16 | GO | 101-GO | 0 | 0 |
| 17 | | | 0 | 0 |
| 18 | | | 1 | 0 |
| 19 | | | 0 | 0 |
| 20 | | | 1 | 0 |
| 21 | ROOM NUMBER | 102 | 0 | 0 |
| 22 | | | 0 | 0 |
| 23 | | | 1 | 0 |
| 24 | | | 0 | 0 |
| 25 | | | 2 | 0 |

NOTIFYING DEVICE, NOTIFYING METHOD, AND RECORDING MEDIUM

This application is a 371 of PCT/JP01/07314 Aug. 27, 2001.

TECHNICAL FIELD

The present invention is related to a notification apparatus, a notification method, and a recording medium for recording thereon a program used to execute the notification method. More specifically, the present invention is related to a notification apparatus for judging as to whether or not a target point to which an emergency vehicle is dispatched is related to the own relevant point and then for notifying a judgment result, and also is directed to a notification method and a recording medium.

BACKGROUND ART

Conventional techniques capable of utilizing positional information of emergency vehicles have been described in the below-mentioned publications. First, Japanese Unexamined Patent Publication No. H06-259694 describes the emergency-vehicle-positional-information display apparatus having such purposes capable of confirming the positional information of the emergency vehicle and of realizing higher security. Also, Japanese Unexamined Patent Publication No. H11-014388 describes the emergency vehicle notification system having such purposes that both the present position and the target position of the emergency vehicle are notified/acquired so as to predict the scheduled traveling route of the emergency vehicle, and traveling of the emergency vehicle is effectively supported. Also, Japanese Unexamined Patent Publication No. H11-328563 describes the notification destination retrieving apparatus and the retrieving method thereof having such purposes that in the emergency center and the like of the vehicle emergency notification system, the emergency notification destination such as the relevant fire station is retrieved based upon the position of the accidental vehicle, and when the accident happens to occur, quick rescue can be carried out.

Also, Japanese Unexamined Patent Publication No. H11-250383 describes both the member management method and the information acquisition/provision system. That is, in such a system for providing the service by which the emergency vehicle is delivered from the center when the accident happens to occur, the contract time limits of the members may be managed and also various sorts of information may be given to the members via the vehicle apparatus and the wireless lines under such an initial condition that the membership fees are required. Furthermore, in order to request quick rescue, other systems are known. That is, emergency vehicles are delivered from centers by initiating terminal apparatus which are exclusively used and are operated by users. Japanese Unexamined Patent Publication No. S63-164751 and Japanese Unexamined Patent Publication No. H07-015541 describe such apparatus and methods, capable of notifying emergency information to persons such as families and acquaintances, and centers, and also capable of notifying the emergency information from these persons and the centers to the notification destinations such as fire stations.

However, the above-described conventional systems own the below-mentioned problems, and therefore these problems should be desirably solved. For instance, when persons hear a siren of an emergency vehicle, there are many possibilities that these persons are worried about such a case that trouble/accident happen to occur at their homes, schools and offices where their families are living. Normally, in such a case that trouble/accident happen to occur as to the own families, any persons apparently want to immediately receive this notification, and furthermore, want to go to places of their families as quickly as possible. However, while there is a very small possibility that these trouble/accident happen to occur at their families, it is practically difficult to provide to users, such a service capable of notifying only such possibilities that fire/accident problem occur as to their families.

Also, in the conventional notification apparatus for detecting the emergency event so as to notify the detected emergency event to the families and acquaintances, there are some cases that dispatching of the emergency vehicle cannot be requested, depending upon the occurrence modes of the emergency events.

There is another problem in the conventional notification apparatus, although traveling of the emergency vehicles can be more effectively supported, and also, when the accidents happen to occur, quick rescue can be carried out. However, the conventional notification apparatus cannot confirm the conditions under which trouble/accident happen to occur at the own home and the own families. Furthermore, the users cannot employ the conventional notification apparatus in order to confirm as to whether or not an accident actually happens to occur at a desirable point.

The present invention has been made to solve the above-described conventional problems, and therefore, has an object to provide a notification apparatus, a notification method, and a recording medium, which are capable of notifying such a fact that either trouble or an accident happens to occur at a previously registered point in a case that a target point of a vehicle is made coincident with this previously registered point.

DISCLOSURE OF THE INVENTION

The above-described problems could be solved by a notification apparatus, a notification method, and a recording medium, according to the present invention, which are described as follows:

(1) A notification apparatus of the present invention includes: acquisition means for acquiring target point information capable of specifying a target point to which a vehicle is directed; storage means for previously storing thereinto registered point information capable of specifying a desirable point; identification means for identifying the target point information acquired by the acquisition means with the registered point information stored in the storage means to judge as to whether or not the target point information is made coincident with the registered point information; and notification means for notifying an identification result obtained by the identification means.

(2) In the notification apparatus as recited in the preceding item (1), the notification means notifies the identification result when the target point information is made coincident with the registered point information.

(3) In the notification apparatus as recited in the preceding item (1) or (2), the notification means notifies the registered point information which is made coincident with the target point information in connection with the identification result.

(4) In the notification apparatus as recited in the preceding item (1), (2) or (3), the notification apparatus is comprised of charging means for charging a fee to a predetermined charging destination when the target point information is made coincident with the registered point information.

(5) In the notification apparatus as recited in the preceding item (1), (2), (3) or (4), the notification apparatus further includes: a conversion means for converting either a sort of the target point information or a sort of the registered point information when sorts of the target point information and of the registered point information, which are identified with each other by the identification means, are different from each other.

(6) In the notification apparatus recited in the preceding item (5), when at least one of either of the target point information or the registered point information corresponds to positional information indicative of a predetermined point, the conversion means converts the positional information into address information by employing a correspondence relationship between the positional information indicative of the predetermined point and address information indicative of an address of the predetermined point.

(7) In the notification apparatus as recited in the preceding items (1), (2), (3), (4), (5), or (6), the identification means judges as to whether or not a target point indicated by the target point information which is acquired by the acquisition means is located within a predetermined range where a registered point is located at a center thereof and the registered point is indicated by the registered point information which is stored in the storage means.

(8) In the notification apparatus recited in the preceding item (7), the notification means performs notifying operations in different notification systems when the target point information is made coincident with the registered point information, and also when the target point is located within the predetermined range of the registered point.

(9) In the notification apparatus as recited in the preceding items (1), (2), (3), (4), (5), or (6), the identification means produces a map forming instruction, containing at least one of either positional information or address information, based upon a result of identifying the target point information acquired by the acquisition means, with the registered point information stored in the storage means; the storage means includes a map information storage means for storing thereinto map information used to display a map; the notification apparatus includes: map forming means for deriving from the map information storage means, map information of an area containing all of positions which are indicated by either the positional information or the address information, which are contained in the map forming instruction produced by the identification means, and for forming such a map information that the positions indicated by either the positional information or the address information are represented as signs; and the notification means displays the map information which is formed by the map forming means.

(10) In the notification apparatus recited in the preceding item (9), the identification means produces the map forming instruction, while registered point information which is made coincident with the target point information is used as the positional information; and in a case that there is no registered point information which is made coincident with the target point information, the identification means produces the map forming instruction while both the target point information and the registered point information registered in the storage means are used as the positional information.

(11) In the notification apparatus as recited in the preceding item (9) or (10), in such a case that address information contained in the map forming instruction produced by the identification means is coarser than address information contained in the map information, the map forming means derives map information of such address information which is partially made coincident with the address information of the map forming instruction.

(12) In the notification apparatus as recited in the preceding items (1), (2), (3), (4), (5), (6), (7), (8), (9), (10), or (11), the acquisition means acquires second target point information capable of specifying a second target point subsequent to the target point information capable of specifying the target point to which the vehicle is directed; and the notification means notifies the second target point information when the target point information is made coincident with the registered point information stored in the storage means as a result of the identifying operation by the identification means.

(13) In the notification apparatus as recited in the preceding items (1), (2), (3), (4), (5), (6), (7), (8), (9), (10), (11), or (12), the notification apparatus further includes: present position detecting means for detecting a present position of the notification apparatus; and a route searching means for searching a route defined from the present position detected by the present position detecting means up to either the target point or the second target point; and wherein: the notification means notifies the route searched by the route searching means.

(14) In the notification apparatus as recited in the preceding items (1), (2), (3), (4), (5), (6), (7), (8), (9), (10), (11), (12), or (13), the storage means stores thereinto notification destination information indicative of a notification destination to which the notification means notifies the identification result in correspondence with the registered point information; and the notification means notifies the identification result to the notification destination which is indicated by the notification destination information, which corresponds to either the registered point information which is made coincident with the target point information by the identification means or the registered point information in which a target point indicated by the target point information is located in a predetermined range for setting the registered point as a center.

(15) In the notification apparatus as recited in the preceding items (4), (5), (6), (7), (8), (9), (10), (11), (12), (13), or (14), the storage means stores thereinto charging destination information indicative of a charging destination to which the charging means charges the fee in correspondence with the registered point information; and the charging means charges the fee to the charging destination which is indicated by the charging destination information, which corresponds to either the registered point information which is made coincident with the target point information by the identification means or the registered point information in which a target point indicated by the target point information is located in a predetermined range for setting the registered point as a center.

(16) In the notification apparatus as recited in the preceding item (14) or (15), the notification apparatus includes: registration means for referring the registered point information, the notification destination information, or the charging destination information; for deleting the registered point information, the notification destination information, or the charging destination information from the recording means; and for adding the registered point information, the notification destination information, or the charging destination information to the recording means.

(17) In the notification apparatus as recited in the preceding items (1), (2), (3), (4), (5), (6), (12), (13), (14), (15), or (16), the storage means stores thereinto identification degree information which determines a range of an identifying operation when the target point information is identified with the registered point information; the identification means identifies the target point information with the registered point information based upon the identification degree information; and the notification means notifies the identification result in different notification systems in response to the identification degree information.

(18) A notification method of the present invention is a notification method using a notification apparatus equipped with a storage means for previously storing thereinto registered point information capable of specifying a desirable point, the notification method includes: an acquisition step for acquiring target point information capable of specifying a target point to which a vehicle is directed; an identification step for identifying the target point information acquired by the acquisition step with the registered point information stored in the storage means to judge as to whether or not the target point information is made coincident with the registered point information; and a notification step for notifying an identification result obtained by the identification step.

(19) In the notification method recited in the preceding item (18), the notification step notifies the identification result when the target point information is made coincident with the registered point information.

(20) In the notification method recited in the preceding item (18), or (19), the notification step notifies the registered point information which is made coincident with the target point information in connection with the identification result.

(21) In the notification method recited in the preceding item (18), (19), or (20), the notification method includes a charging step for charging a fee to a predetermined charging destination when the target point information is made coincident with the registered point information.

(22) In the notification method recited in the preceding item (18), (19), (20), or (21), the notification method includes: a conversion step for converting either a sort of the target point information or a sort of the registered point information when sorts of the target point information and of the registered point information, which are identified with each other by the identification step, are different from each other.

(23) In the notification method recited in the preceding item (22), when at least one of the target point information and the registered point information corresponds to positional information indicative of a predetermined point, the conversion step converts the positional information into address information by employing a correspondence relationship between the positional information indicative of the predetermined point and address information indicative of an address of the predetermined point.

(24) In the notification method recited in the preceding item (18), (19), (20), (21), (22), or (23), the identification step judges as to whether or not a target point indicated by the target point information which is acquired by the acquisition step is located within a predetermined range where a registered point is located at a center thereof and the registered point is indicated by the registered point information which is stored in the storage means.

(25) In the notification method recited in the preceding item (24), the notification step performs notifying operations in different notification systems when the target point information is made coincident with the registered point information, and also when the target point is located within the predetermined range of the registered point.

(26) In the notification method recited in the preceding item (18), (19), (20), (21), (22), or (23), the storage means includes a map information storage means for storing map information used to display a map; the identification step includes a map forming instruction producing step which produces a map forming instruction containing at least one of positional information and address information based upon a result of identifying the target point information acquired by the acquisition step with the registered point information stored in the storage means; the notification method includes: a map forming step for deriving from the map information storage means, map information of an area containing all of positions which are indicated by either the positional information or the address information, which are contained in the map forming instruction produced by the map forming instruction producing step, and for forming such a map information that the positions indicated by either the positional information or the address information are represented as signs; and the notification step displays the map information which is formed by the map forming step.

(27) In the notification method recited in the preceding item (26), the map forming instruction producing step produces the map forming instruction, while registered point information which is made coincident with the target point information is used as the positional information; and in a case that there is no registered point information which is made coincident with the target point information, the map forming instruction producing step produces the map forming instruction while both the target point information and the registered point information registered in the storage means are used as the positional information.

(28) In the notification method recited in the preceding item (26), or (27), in such a case that address information contained in the map forming instruction produced by the map forming instruction producing step is coarser than address information contained in the map information, the map forming step derives map information of such address information which is partially made coincident with the address information of the map forming instruction.

(29) In the notification method recited in the preceding item (18), (19), (20), (21), (22), (23), (24), (25), (26), (27), or (28), the notification method includes a second acquisition step for acquiring second target point information capable of specifying a second target point, subsequent to the acquisition step; and the notification step notifies the second target point information when the target point information is made coincident with the registered point information stored in the storage means as a result of the identifying operation by the identification step.

(30) In the notification method recited in the preceding item (18), (19), (20), (21), (22), (23), (24), (25), (26), (27), (28), or (29), the notification method includes: a present position detecting step for detecting a present position of the notification apparatus; and a route searching step for searching a route defined from the present position detected by the present position detecting step up to either the target point or the second target point; and wherein: the notification step notifies the route searched by the route searching step.

(31) In the notification method recited in the preceding item (18), (19), (20), (21), (22), (23), (24), (25), (26), (27), (28), (29), or (30), the storage means stores thereinto notification destination information indicative of a notification destination to which the notification step notifies the identification result in correspondence with the registered point information; and the notification step notifies the identification result to the notification destination which is indicated by the notification destination information, which corresponds to either the registered point information which is made coincident with the target point information by the identification step or the registered point information in which a target point indicated by the target point information is located in a predetermined range for setting the registered point as a center.

(32) In the notification method recited in the preceding item (21), (22), (23), (24), (25), (26), (27), (28), (29), (30), or (31), the storage means stores thereinto charging destination information indicative of a charging destination to which the charging step charges a fee in correspondence with the registered point information; and the charging step charges the fee to the charging destination which is indicated by the charging destination information, which corresponds to either the registered point information which is made coincident with the target point information by the identification step or the registered point information in which a target point indicated by the target point information is located in a predetermined range for setting the registered point as a center.

(33) In the notification method recited in the preceding item (18), (19), (20), (21), (22), (23), (29), (30), (31), or (32), the storage means stores thereinto identification degree information which determines a range of an identifying operation when the target point information is identified with the registered point information; the identification step identifies the target point information with the registered point information based upon the identification degree information; and the notification step notifies the identification result in different notification systems in response to the identification degree information.

(34) A computer readable recording medium of the present invention is featured by that a program for causing a computer to execute the notification method recited in the preceding item (18), (19), (20), (21), (22), (23), (24), (25), (26), (27), (28), (29), (30), (31), (32), or (33) is recorded thereon.

In the notification apparatus according to the preceding item (1) of the present invention, the notification method according to the preceding item (18), and the recording medium according to the preceding item (34), the storage unit previously stores thereinto the registered point information capable of specifying the desirable point; the acquisition means (acquisition step) acquires the target point information capable of specifying the target point to which the vehicle is directed; the identification means (identification step) identifies the acquired target point information with the registered point information stored in the storage means to judge as to whether or not the target point information is made coincident with the registered point information; and notification means (notification step) notifies the identification result obtained by the identification means (identification step).

In the notification apparatus according to the preceding item (2) of the present invention, the notification method according to the preceding item (19), and the recording medium according to the preceding item (34), the notification means (notification step) notifies the identification result when the target point information is made coincident with the registered point information. Also, in the notification apparatus according to the preceding item (3) of the present invention, the notification method according to the preceding item (20), and the recording medium according to the preceding item (34), the notification means (notification step) notifies the registered point information which is made coincident with the target point information in connection with the identification result.

As a consequence, the user (owner of the notification apparatus) can quickly know such a fact that an emergency event happens to occur at his families and his acquaintances. Also, in the notification apparatus according to the preceding item (4) of the present invention, the notification method according to the preceding item (21), and the recording medium according to the preceding item (34), the charging means (charging step) charges the fee to a predetermined charging destination when the target point information is made coincident with the registered point information. As a consequence, as a fee system of an emergency event notification service, since such a fee system can be available by which a service fee is required only when notification is carried out in addition to another fee system for regularly collecting a member fee, a service provider can provide various services by way of flexible fee systems.

Also, in the notification apparatus according to the preceding item (5) of the present invention, the notification method according to the preceding item (22), and the recording medium according to the preceding item (34), even when the sort of the target point information is different from the sort of the registered point information, which are identified with each other, the identification means (identification step) can identify these target/registered point information with each other.

Also, in the notification apparatus according to the preceding item (6) of the present invention, the notification method according to the preceding item (23), and the recording medium according to the preceding item (34), when at least one of the target point information and the registered point information corresponds to the positional information indicative of a predetermined point, the conversion means (conversion step) converts the positional information into the address information by employing the correspondence relationship between the positional information indicative of the predetermined point and the address information indicative of the address of the predetermined point. As a result, the identification means (identification step) can identify the target point information with the registered point information by absorbing the error which is caused by the precision of the positional information.

Also, in the notification apparatus according to the preceding item (7) of the present invention, the notification method according to the preceding item (24), and the recording medium according to the preceding item (34), the identification means (identification step) judges as to whether or not the target point indicated by the acquired target point information is located within a predetermined range where the registered point is located at the center thereof and the registered point is indicated by the registered point information which is stored in the storage means. In particular, in the notification apparatus according to the preceding item (8) of the present invention, the notification method according to the preceding item (25), and the recording medium according to the preceding item (34), the notification means (notification step) performs notifying operations in different notification systems when the target point information is made coincident with the registered point information, and also when the target point is located within the predetermined range of the registered point.

As a consequence, even when the target point of the vehicle is not made completely coincident with the registered point, if the target point is located near the registered point, namely within a predetermined range, then the notification may be made for the sake of confirmation even under such a condition that the content of the target point information is not so precise rather than that of the registered point information, and only approximate places are known.

Also, in the notification apparatus according to the preceding item (9) of the present invention, the notification method according to the preceding item (26), and the recording medium according to the preceding item (34), and furthermore, in the notification apparatus according to the preceding item (10) of the present invention, the notification method according to the preceding item (27), and the recording medium according to the preceding item (34), since the notification means (notification step) for displaying the map information indicates the positions represented by both the target point information and the registered point information on the map as the signs, the notification means (notification step) can notify the position indicated by the coincident registered point information, or the position indicated by the target point information, and the position indicated by the registered point information in the visible/easy-understandable manner.

Also, in the notification apparatus according to the preceding item (11) of the present invention, the notification method according to the preceding item (28), and the recording medium according to the preceding item (34), in such a case that the address information contained in the map forming instruction produced by the identification means (identification step) is coarser than the address information contained in the map information, the map forming means (map forming step) derives map information of such address information which is partially made coincident with the address information of the map forming instruction. As a consequence, the map information is represented, while the target point information is indicated by a shape for indicating a wide range, and the registered point information is indicated by a shape of indicating a narrow range, namely by an approximate point shape, so that visible/easy-understandable notification can be carried out.

Also, in the notification apparatus according to the preceding item (12) of the present invention, the notification method according to the preceding item (29), and the recording medium according to the preceding item (34), the acquisition means (second acquisition step) acquires the second target point information capable of specifying the second target point to which the vehicle is directed; and the notification means (notification step) notifies the second target point information when the target point information is made coincident with the registered point information stored in the storage means as a result of the identifying operation by the identification means (identification step).

As a result, the user can quickly go to the present places of his families and his acquaintances, who are injured.

Also, in the notification apparatus according to the preceding item (13) of the present invention, the notification method according to the preceding item (30), and the recording medium according to the preceding item (34), the present position detecting means (present position detecting step) detects the present position of the notification apparatus; and the route searching means (route searching step) searches the route defined from the present position detected by the present position detecting means (present position detecting step) up to either the target point or the second target point; and also the notification means (notification step) notifies the route searched by the route searching means (route searching step). As a consequence, since the user (owner of notification apparatus) can grasp, for example, an accident occurring point (target point), and a route defined up to a hospital (second target point) where an injured person is medically treated, the user can rush to the place of interest.

Also, in the notification apparatus according to the preceding item (14) of the present invention, the notification method according to the preceding item (31), and the recording medium according to the preceding item (34), the storage means stores thereinto the notification destination information indicative of the notification destination in correspondence with the registered point information; and the notification means (notification step) notifies the identification result to the notification destination which is indicated by the notification destination information, which corresponds to either the registered point information which is made coincident with the target point information or the registered point information in which the target point indicated by the target point information is located in a predetermined range for setting the registered point as the center. As a consequence, if the communication destinations as to all of the families and also the communication destinations of persons which are wanted to be contacted to the families are registered into the notification destination information C, even when the notification apparatus is not owned, such a notification that the own home and the own family face to such a risky opportunity that the emergency vehicle is dispatched can be issued, and also notification can be made without any mistakes when trouble/accident happen to occur.

Also, in the notification apparatus according to the preceding item (15) of the present invention, the notification method according to the preceding item (32), and the recording medium according to the preceding item (34), the storage means stores thereinto the charging destination information indicative of the charging destination in correspondence with the registered point information; and the charging means (charging step) charges the fee to the charging destination which is indicated by the charging destination information, which corresponds to either the coincident registered point information or the registered point information in which the target point indicated by the target point information is located in a predetermined range for setting the registered point as the center. As a result, since the charging means (charging step) can charge the fee only to such a charging destination which is indicated by the charging destination information corresponding to the registered point information which is made coincident with the target point information, a service provider can provide a service with a flexible fee system as an emergency-event-notifying-service fee system.

Also, in the notification apparatus according to the preceding item (16) of the present invention, the registration means refers the registered point information, the notification destination information, or the charging destination information; deletes the registered point information, the notification destination information, or the charging destination information from the recording unit; and adds the registered point information, the notification destination information, or the charging destination information to the recording means. As a consequence, the combination among the registered point information, the notification destination information, and the charging destination information, which are used in the identifying operation, the notifying operation, and the charging operation, can be changed at any time by employing the registration means.

Also, in the notification apparatus according to the preceding item (17) of the present invention, the notification method according to the preceding item (33), and the recording medium according to the preceding item (34), the storage means stores thereinto the identification degree information which determines the range of the identifying operation when the target point information is identified with the registered point information; the identification means (identification step) identifies the target point information with the registered point information based upon the identification degree information; and the notification means (notification step) notifies the identification result in the different notification systems in response to the identification degree information. As a consequence, since the identification means can determine that which portions of both the target point information and the registered point information are made valid based upon the identification degree information, the identification means (identification step) can perform the identifying operations under plural conditions in response to individual requests set from the users, and thus can perform the identifying operations in more flexible manner.

BRIEF DESCRIPTION OF THE DRAWINGS

FIG. 15 is an explanatory diagram for indicating a structure of a table conversion unit 22 of the fourth embodiment.

FIG. 16 is a structural block diagram for showing a notification apparatus according to a fifth embodiment of the present invention.

FIG. 19 is an explanatory diagram for showing a structure of the map information "M."

FIG. 20 is an explanatory diagram for indicating a shape "S" which is constituted by a positional information number IC and a positional information group IG.

FIG. 21 is an explanatory diagram for indicating a structure of address map information MJ contained in the map information M.

FIG. 32 is an explanatory diagram for indicating a correspondence relationship among conditions while identifying operation is carried out, results of the identifying operation, structures of map forming instructions, and map information.

FIG. 42 is an explanatory diagram for showing the acquired target point information A, the registered point information B stored in the storage unit 2, the notification destination information C, and charging destination information D.

FIG. 45 is an explanatory diagram for explaining a method for representing the identification degree information E.

Figure 1:
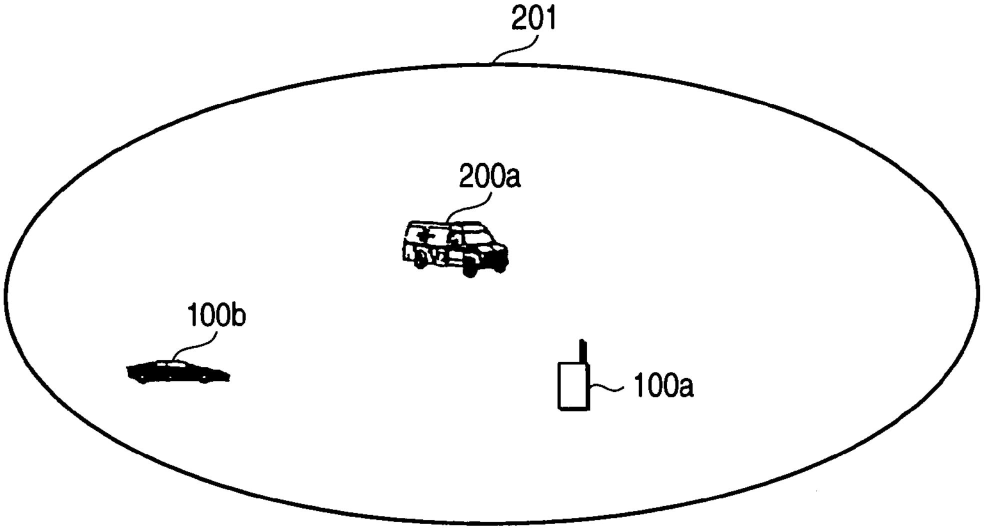
FIG. 1 is an explanatory diagram for indicating such a manner that how a notification apparatus according to the present invention is used.

It should be noted that in these drawings, reference numeral 1 shows an acquisition unit; reference numeral 2 indicates a storage unit; reference numeral 3 represents an identification unit; reference numeral 4 denotes a notification unit; reference numeral 5 is a charging unit; reference numeral 6 shows a registration unit; reference numeral 7 indicates a conversion unit; reference numeral 8 represents a present position calculating unit; reference numeral 9 denotes a path searching unit; reference numeral 10 indicates a map forming unit; reference numeral 22 shows a table conversion unit; reference numeral 23 represents a map unit; reference numerals 100, 100*a*, and 100*b* show notification apparatus; and reference numerals 200*a* and 200*b* represent stations.

BEST MODE FOR CARRYING OUT THE INVENTION

Figure 2:
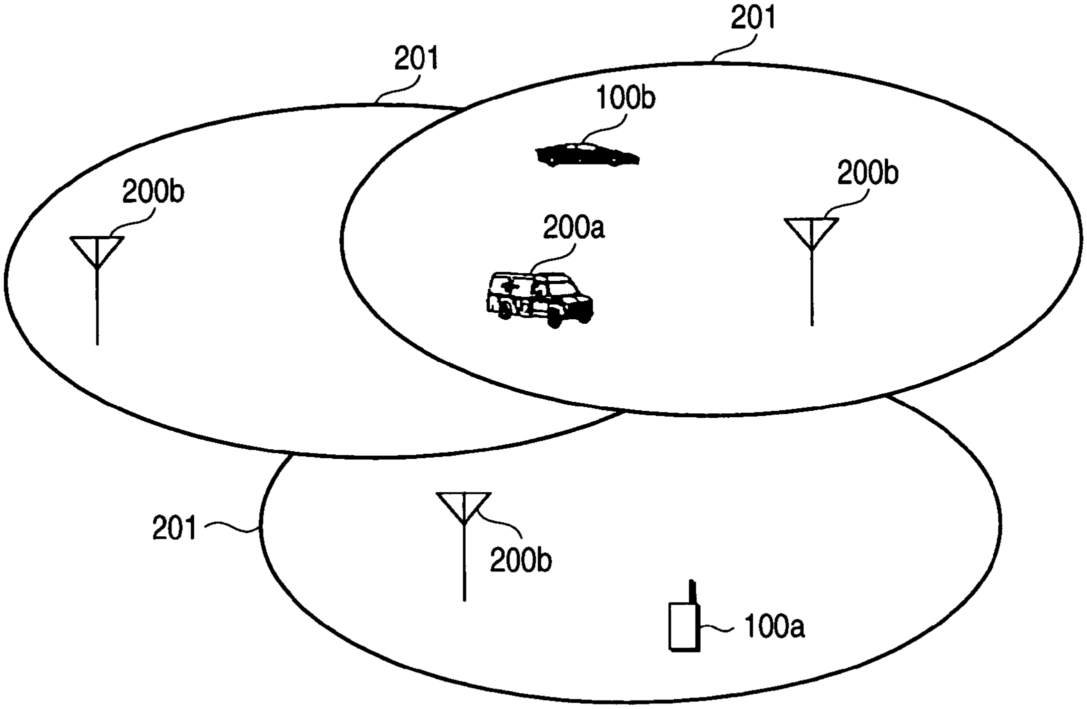
FIG. 2 is an explanatory diagram for representing another manner that how the notification apparatus according to the present invention is used.

An embodiment of the present invention will now be explained with reference to drawings. FIG. 1 and FIG. 2 are explanatory diagrams for explaining a use method of a notification apparatus according to the present invention. A station 200*a* which is mounted on an emergency vehicle and is shown in FIG. 1 and FIG. 2 is such a station for transmitting information indicative of a target point to which the emergency vehicle is directed. Also, a plurality of stations 200*b* indicated in FIG. 2 receive information transmitted from the station 200*a*, and transmit the information to undefined/large numbers of reception terminals 100*a* and 100*b* which are located within an area 201 where the station 200*b* is located at a center thereof. It should be understood that the area 201 shows such a range where each of the station 200*a* and the station 200*b* is capable of transmitting information. Also, the area 201 of the station 200*b* is made wider than an area of the station 200*a*.

Also, the notification apparatus 100*a* and 100*b* shown in FIG. 1 and FIG. 2 receives information transmitted from the station 200*a* and the station 200*b*. A notification apparatus 100*a* mounted on a mobile terminal such as a portable telephone is explained as an example, and a notification apparatus 100*b* mounted on a vehicle is explained as an example. It should be noted that arrangements of these notification apparatus 100*a* and 100*b* are similar to arrangements of the below-mentioned notification apparatus.

Various embodiments of notification apparatus and notification method according to the present invention will now be described in detail with reference to drawings in this order of [first embodiment], [second embodiment], [third embodiment], [fourth embodiment], [fifth embodiment], [sixth embodiment], [seventh embodiment], [eighth embodiment], [ninth embodiment], [tenth embodiment], [eleventh embodiment], [twelfth embodiment], [thirteenth embodiment], and [fourteenth embodiment]. It should also be noted that while the notification apparatus and the notification method according to the present invention will be explained in detail, since a recording medium according to the present invention corresponds to such a recording medium for recording thereon a program used to execute the notification method, the description thereof is involved in descriptions of the below-explained notification method.

First Embodiment

Figure 3:
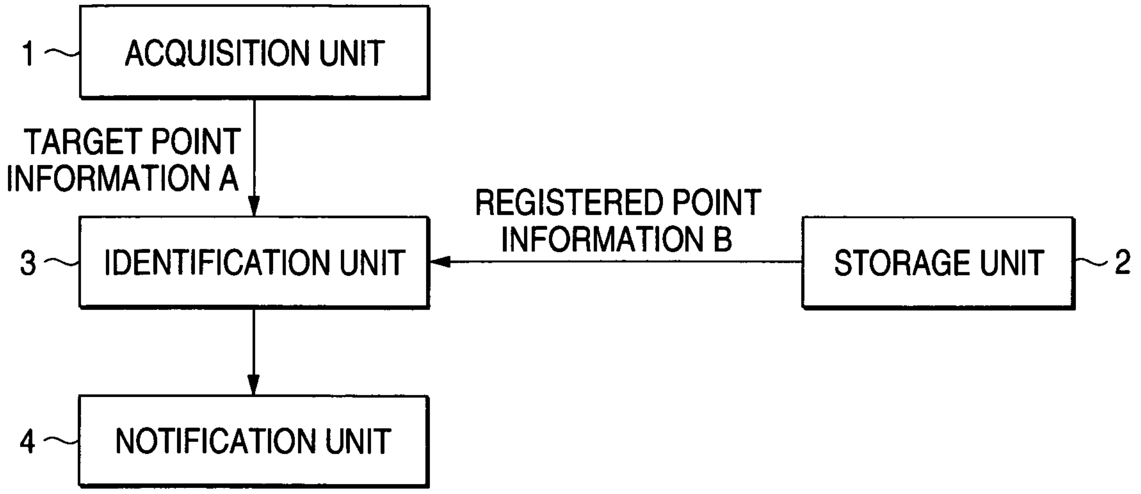
FIG. 3 is a structural block diagram for indicating a notification apparatus according to a first embodiment of the present invention.

FIG. 3 is a structural block diagram for indicating a notification apparatus according to a first embodiment of the present invention. As indicated in this drawing, the notification apparatus according to the first embodiment is arranged by an acquisition unit 1, a storage unit 2, an identification unit 3, and a notification unit 4. The acquisition unit 1 corresponds to an acquisition means. The acquisition unit 1 acquires such an information (will be referred to as "target point information A" hereinafter) indicative of a target point to which an emergency vehicle is dispatched based upon an optical beacon, an electromagnetic beacon, and the like, which are installed on the side of a road. The storage unit 2 corresponds to a storage means. The storage unit 2 stores thereinto such an information (will be referred to as "registered point information B" hereinafter) indicative of a registered point which has been previously registered by an owner of this notification apparatus. The identification unit 3 corresponds to an identification means. The identification unit 3 identifies as to whether or not the target point information A acquired by the acquisition unit 1 is made coincident with the registered point information B stored in the storage unit 2, and then, transmits an identification result to the notification unit 4. The notification unit 4 corresponds to a notification means. The notification unit 4 notifies the identification result obtained by the identification unit 3 to the owner of this communication apparatus.

The notification unit 4 performs notifying operation by employing at least any one of generations of synthesized speech, recorded real voice, warning sound, and the like; indications of a character and a symbol showing an occurrence of an accident; a change in colors of a screen; a light emission, a vibration, and so on.

In this specification, both the target point information A and the registered point information B correspond to an information formed in such a manner that address information, telephone number information, positional information, and personal ID information are systematically combined with each other and the combined information is encoded. It should be noted that a place which is indicated by both the target point information A and the registered point information B can be specified by employing the address information. Also, as to the address information, the storage capacity of the storage unit 2 may be reduced by employing such a manner that while "prefectures; shi/ku/cho/son (city/ward/town/village); oaza (section of city/ward/town/village)" used in Japan, and "state, city, street" used in USA/Europe, are expressed by employing characters and numbers which are determined in accordance with a certain rule, "banchi (block number)" and "go (house number)" arrayed in a ruled manner are employed with these characters and numbers. Furthermore, address information may be represented by way of a rule which is commonly used in the world by acquiring such a portion indicative of a country. Thus, such a place which is indicated by both the target point information A and the registered point information B can be specified, namely, even any places within the word irrespective of languages may be specified.

Also, since telephone number information is employed, such a place indicated by both the target point information A and the registered point information B may be specified based upon an installed place of telephone. Also, in a case that a telephone number corresponds to a telephone number of a portable appliance such as a portable telephone and a PHS, both a person who is located at a place indicated by the target point information A and an owner of a notification apparatus where the registered point information B is registered may be specified. As to the telephone number information, since such numbers arranged in this order of, for example, "country number, telephone number, extension number" are employed, either a telephone installed place within any place in the world or an owner of a notification apparatus to which the registered point information B is registered may be specified.

Also, as to the positional information, for example, since latitude and longitude are employed, even in such a place where there is no address thereof, or no telephone number thereof, a place which is indicated by the target point information A and the registered point information B may be specified. Also, a method for expressing positional information may be simplified in such a manner that as the positional information, for instance, while a constant range is segmented and the respective segmented areas are expressed by numbers, positions located within this constant range are expressed by coordinate values, or these positions are arranged in a ruled manner in the order of "latitude/longitude" by numerically expressing latitude and longitude. Furthermore, since "heights" are arranged in a similar manner, in such a case that living stages are different from each other even in the same building, these stages may be specified.

Also, since personal ID information which has been allocated to each of individuals is employed, both a person which is located at a place expressed by the target point information A and an owner of a notification apparatus to which the registered point information B has been registered may be specified.

A description will be made of a notification method executed by the notification apparatus according to this embodiment. It should also be noted that two different notification methods will now be explained in this embodiment, and the respective notification methods are defined as a first example and a second example.

FIRST EXAMPLE

Figure 4:
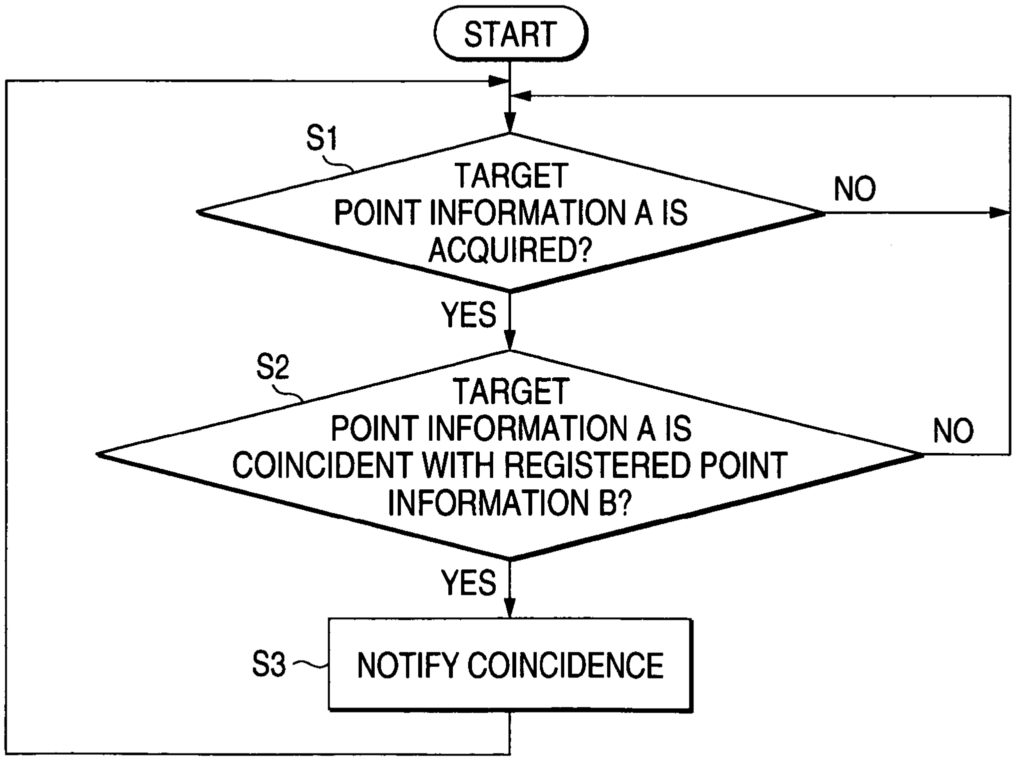
FIG. 4 is a flow chart for describing a notification method of a first example, which is executed by the notification apparatus of the first embodiment.

FIG. 4 is a flowchart for describing a notification method of a first example, which is executed by the notification apparatus of this embodiment.

At a first step S1, a judgment is made as to whether or not the acquisition unit 1 acquires the target point information A. If the acquisition unit 1 does not acquire the target point information A, then the process operation defined in step S1 is repeatedly carried out. If yes, then the process operation is advanced to a step S2. In this step S2, a check is made as to whether or not the acquired target point information A is identical to the registered point information B stored in the storage unit 2 by the identification unit 3. If the target point information A is not made coincident with the registered point information B, then the process operation is returned to the step S1. To the contrary, if the target point information A is made coincident with the registered point information B, the process operation is advanced to a step S3. In this step S3, the notification unit 4 notifies such a fact that these information A and B are made coincident with each other to an owner of a notification apparatus, and thereafter, the process operation is returned to the step S1.

As previously explained, in accordance with the notification method of this first example, as a result of identification made by the identification unit 3, only when the target point information A is made coincident with the registered point information B stored in the storage unit 2, the notification unit 4 notifies such a fact that the target point information A is made coincident with the registered point information B to the owner of the notification apparatus, namely, notifies such a fact that an emergency event happens to occur at the registered point.

SECOND EXAMPLE

Figure 5:
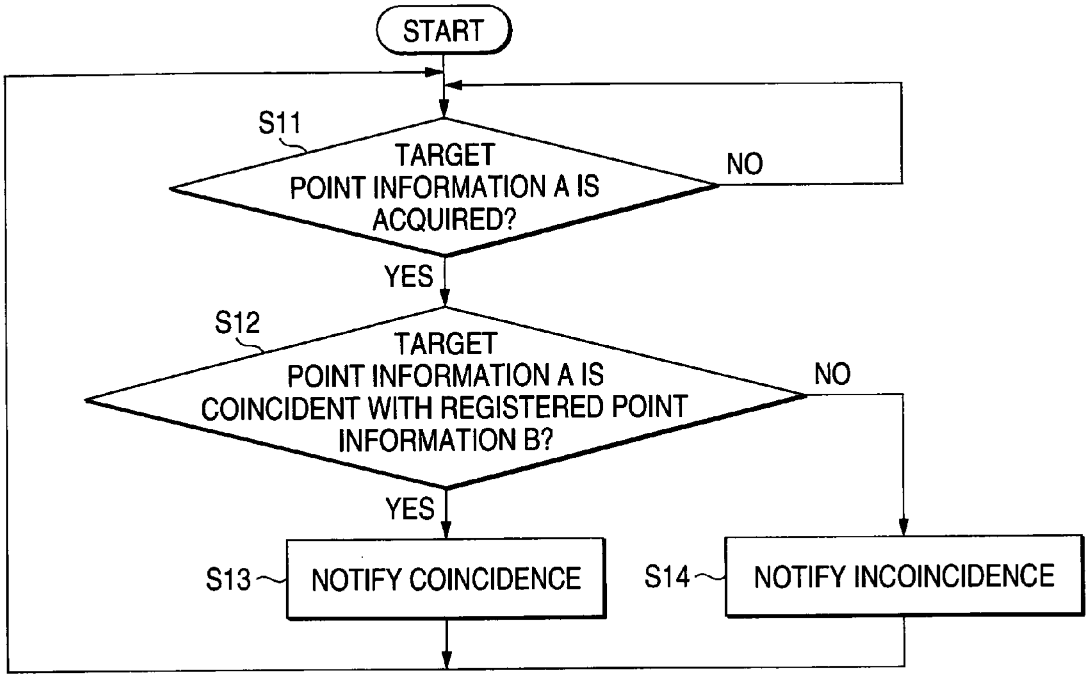
FIG. 5 is a flowchart for describing a notification method of a second example, which is executed by the notification apparatus of the first embodiment.

FIG. 5 is a flow chart for describing a notification method of a second example, which is executed by the notification apparatus of this embodiment.

At a first step S11, a judgment is made as to whether or not the acquisition unit 1 acquires the target point information A. If the acquisition unit 1 does not acquire the target point information A, then the process operation defined in step S1 is repeatedly carried out. If yes, then the process operation is advanced to a step S12. In this step S12, a check is made as to whether or not the acquired target point information A is identical to the registered point information B stored in the storage unit 2 by the identification unit 3. If the target point information A is made coincident with the registered point information B, then the process operation is advanced to a step S13. To the contrary, if the target point information A is not made coincident with the registered point information B, the process operation is advanced to a step S14. In this step S13, the notification unit 4 notifies such a fact that these target/registered point information A and B are made coincident with each other to an owner of a notification apparatus, and thereafter, the process operation is returned to the step S11. Also, in the step S14, the notification unit 4 notifies such a fact that these target/registered point information A and B are not made coincident with each other to the above-described owner, and thereafter, the process operation is returned to the previous step S11.

As previously explained, in accordance with the notification method of this second example, as a result of identification made by the identification unit 3, even when the target point information A is made, or not made coincident with the registered point information B stored in the storage unit 2, the notification unit 4 notifies such an identification result made by the identification unit 3 to the owner of the notification apparatus. It should be understood that notification methods are different from each other in a case of "coincident" and of "incoincident." For instance, in a case that the notification unit 4 is equipped with a display function, when these information A and B are coincident with each other, a message of "emergency event happens to occur" is displayed, whereas when these information A and B are not coincident with each other, another message of "emergency vehicle is just dispatched" is displayed. As the respective notification methods indicative of "coincident", or "incoincident", instead of these messages, a voice generating method, a turn-ON method by a light emitting means, a vibration method by a vibration means may be replaced.

As previously explained, in accordance with the notification method and the notification method of this second embodiment, when a house location of a user and/or a location of a family are registered as the registered point information B, the identification unit 3 identifies the registered point information B with the target point in formation A which indicates a dispatch destination as an accident occurring point of an emergency vehicle. Then, when these registered point information B and target point information A are made coincident with each other, the notification unit 4 notifies this fact to the user. As a consequence, the user can immediately know this fact in such a case that the emergency vehicle is dispatched to the registered point.

Also, in accordance with the notification method of the first example, since the notification unit 4 notifies such a fact to the owner of the notification apparatus only when the target point information A is made coincident with the registered point information B, this owner can avoid to have such a cumbersome feeling that this owner receives notification having no relationship with himself. Also, in accordance with the notification method of the second example, since the notification unit 4 notifies such a fact to the owner irrespective of such a fact as to whether the target point information A is made coincident, or not coincident with the registered point information B, a total number of notification is increased, and thus, the owner can have such an actual feeling that this owner owns the notification apparatus. Also, such an attention may be paid to such a fact that the event does not constitute the dispatch of the emergency vehicle.

Second Embodiment

Figure 6:
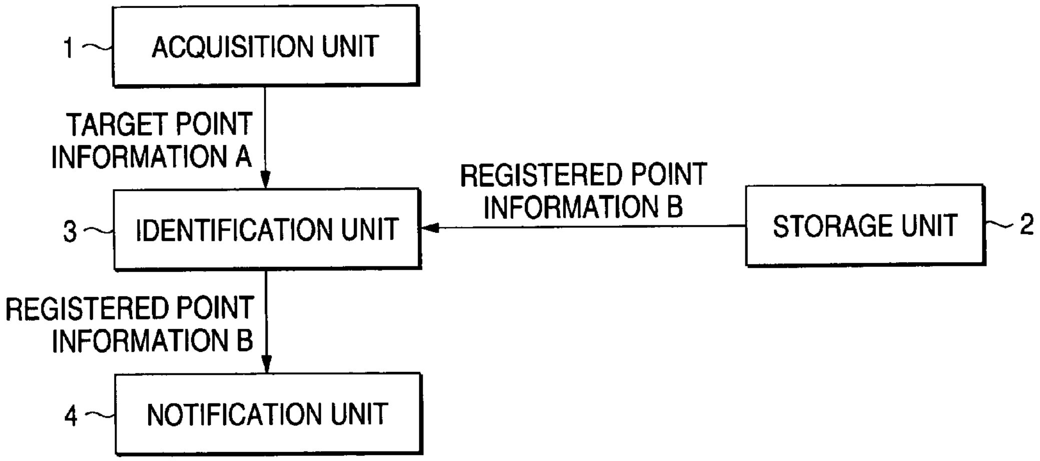
FIG. 6 is a structural block diagram for representing a notification apparatus according to a second embodiment of the present invention.

FIG. 6 is a structural block diagram for indicating a notification apparatus according to a second embodiment of the present invention. In this drawing, it should be noted that the same reference numerals shown in FIG. 3 (namely, first embodiment) will be employed as those for denoting the same, or similar portions, and explanations thereof are omitted.

Figure 7:
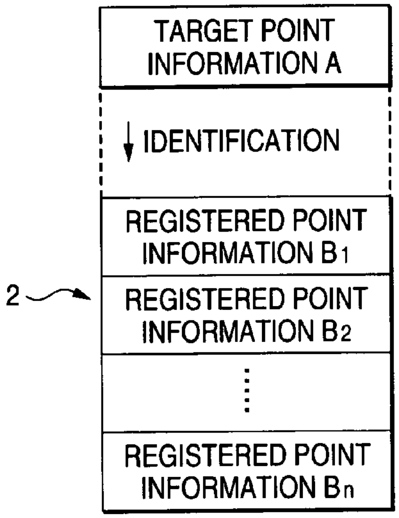
FIG. 7 is an explanatory diagram for indicating target point information "A" and registered point information $B_1$ to $B_n$.

As indicated in FIG. 6, similar to the notification apparatus of the first embodiment, the notification apparatus according to the second embodiment is arranged by employing an acquisition unit 1, a storage unit 2, a identification unit 3, and a notification unit 4. It should also be noted that the identification unit 3 of this second embodiment sends not only an identification result made between target point information A and registered point information B, but also the coincident registered point information B to the notification unit 4. Also, as indicated in FIG. 7, the storage unit 2 is constructed in such a manner that one record is arranged by one field called as the registered point information B, and a plurality of records (registered point information) "$B_1$" to "$B_n$" are arrayed in either an ascent order or a descent order.

Figure 8:
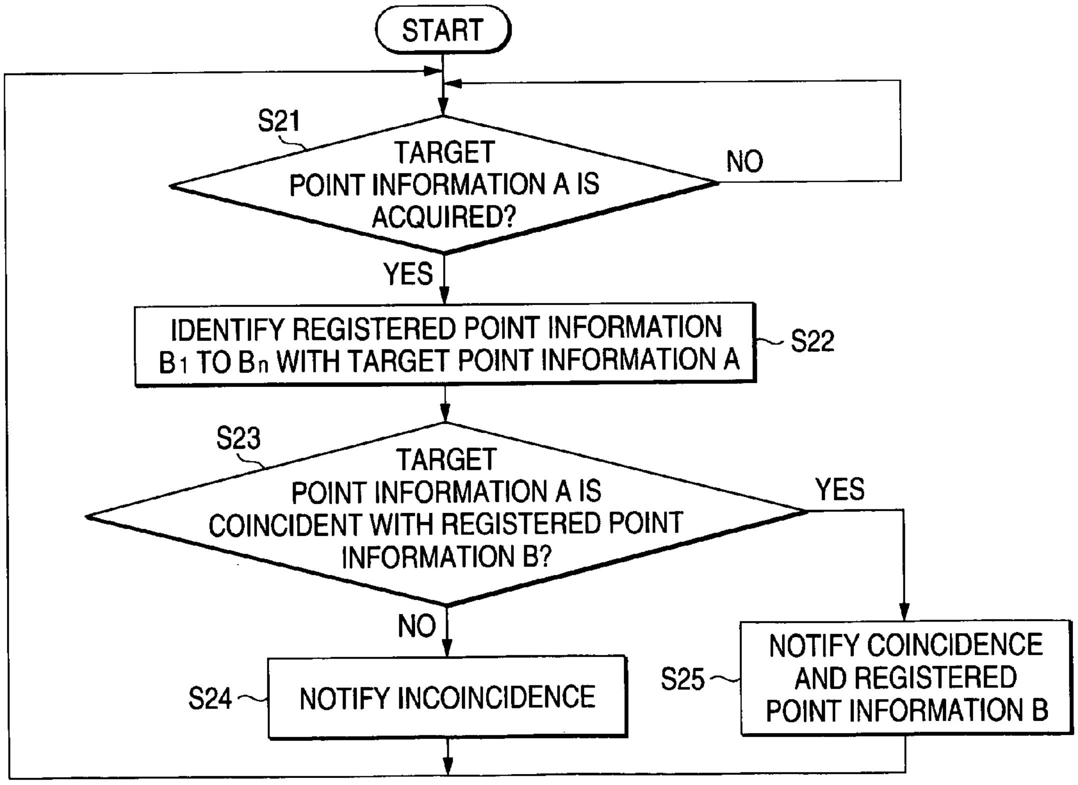
FIG. 8 is a flow chart for explaining a notification method executed by the notification apparatus of the second embodiment.

Next, a notification method which is executed by the notification apparatus of this second embodiment will now be described with reference to a flow chart indicated in FIG. 8.

At a first step S21, a judgment is made as to whether or not the acquisition unit 1 acquires the target point information A. If the acquisition unit 1 does not acquire the target point information A, then the process operation defined in step S21 is repeatedly carried out. If yes, then the process operation is advanced to a step S22. In this step S22, a check is made as to whether or not the acquired target point information A is identical to the registered point information $B_1$ to $B_n$ stored in the storage unit 2 by the identification unit 3. Next, in a step S23, a judgment is made as to whether or not the registered point information B which has been identified in the step S22 is made coincident with the target point information A. If the target point information A is not made coincident with the registered point information B, then the process operation is advanced to a step S24. To the contrary, if the target point information A is made coincident with the registered point information B, the process operation is advanced to a step S25.

Figure 9:
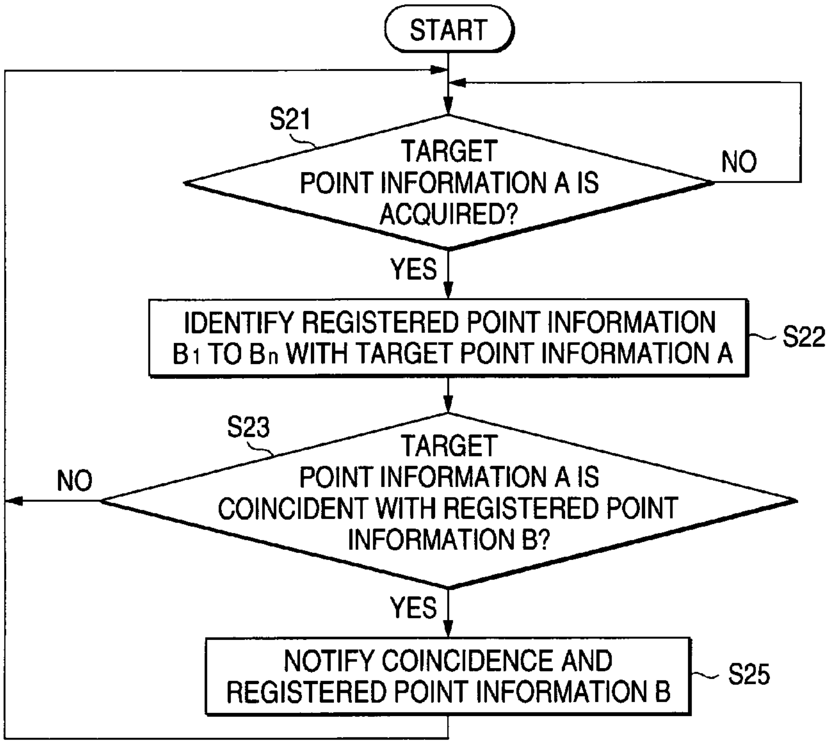
FIG. 9 is a flow chart for representing another notification method executed by the notification apparatus of the second embodiment.

In this step S24, the notification unit 4 notifies such a fact that these target/registered point information A and B are not made coincident with each other to an owner of a notification apparatus, and thereafter, the process operation is returned to the step S21. Also, in the step S25, the notification unit 4 notifies such a fact that these target/registered point information A and B are made coincident with each other, and further notifies the coincident registered point information B to the above-described owner, and thereafter, the process operation is returned to the step S21. It should also be noted that as indicated in FIG. 9, while the step S24 shown in FIG. 8 is omitted, in such a case that the registered point information B is not finally made coincident with the target point information A, the notification unit 4 may not issue any notification. In FIG. 9, the same reference numerals contained in the process steps of the flow chart shown in FIG. 8 are applied to the same, or similar process steps.

As previously explained, in accordance with both the notification apparatus and the notification method of this second embodiment, even in such a case that a plurality of registered point information $B_1$ to $B_n$ are registered in the storage unit 2, since the identification unit 3 sequentially identifies each of these registered point information $B_1$ to $B_n$ with the target point information A one by one, even if the owner of the notification apparatus registers a plurality of registered point information $B_1$ to $B_n$ into the storage unit 2, this owner can immediately and easily grasp such a fact that either trouble (event) or an accident happens to occur in which registered point. Also, since the plural sets of these registered point information $B_1$ to $B_n$ are stored in the storage unit 2 in either the ascent order or the descent order, the identification unit 3 is not required to rearrange the order of these registered point information $B_1$ to $B_n$, so that the load of the identifying process operation can be reduced.

Third Embodiment

Figure 10:
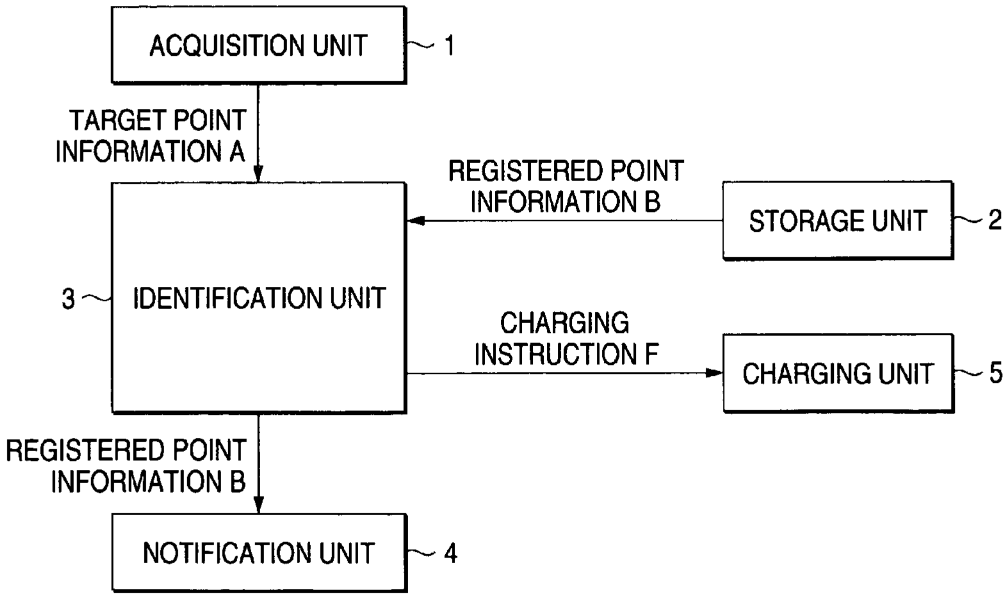
FIG. 10 is a structural block diagram for indicating a notification apparatus according to a third embodiment of the present invention.

FIG. 10 is a structural block diagram for indicating a notification apparatus according to a third embodiment of the present invention. In this drawing, it should be noted that the same reference numerals shown in FIG. 6 (namely, second embodiment) will be employed as those for denoting the same, or similar portions, and explanations thereof are omitted.

As indicated in FIG. 10, the notification apparatus according to the third embodiment is arranged by further employing a charging unit 5 (charging means) in addition to the structural elements owned by the notification apparatus according to the second embodiment. This charging unit 5 executes a charging operation in accordance with a charging instruction "F" which is supplied from the identification unit 3 only when target point information A acquired in the acquisition unit 1 is made coincident with registered point information B stored in the storage unit 2.

As a charging method executed by the charging unit 5, for instance, similar to a prepaid card, such a mode that a fee is withdrawn from a previously paid fee may be employed. Alternatively, another mode may be employed in which charging destination information such as a bank account number and a credit card number is transmitted to an information provider every charging operation, and then, the information provider charges a fee.

Figure 11:
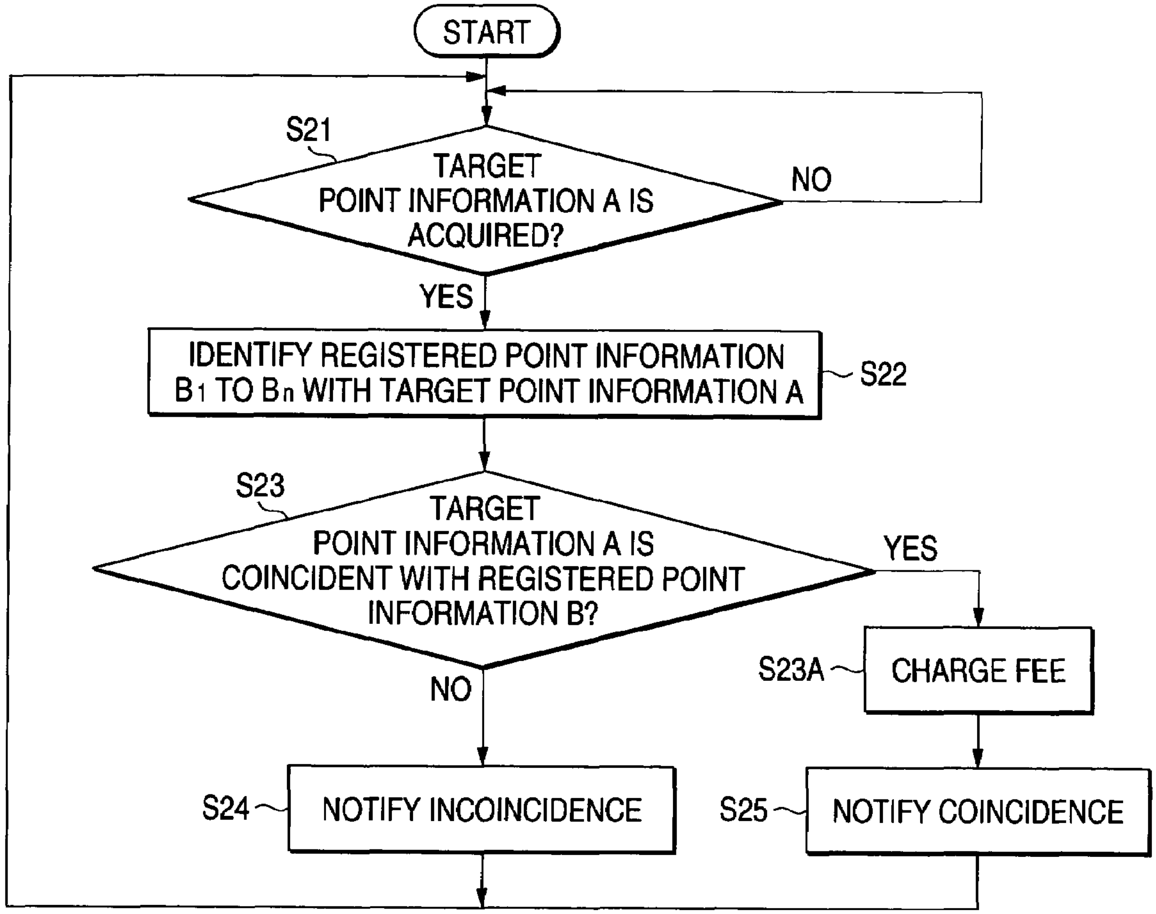
FIG. 11 is a flow chart for explaining a notification method executed by the notification apparatus of the third embodiment.

A notification method executed by the notification apparatus of this embodiment will now be explained with reference to a flow chart shown in FIG. 11. It should also be understood that in this drawing, the same reference numerals shown in FIG. 8 (namely, second embodiment) will be employed as these for denoting the same, or similar steps, and explanations thereof are omitted.

First, in the notification method of this embodiment, after process operations defined from the step S21 to the step S23 have been carried out, if the target point information A is made coincident with the registered point information B in the step S23, then the process operation is advanced to a step S23A. In this step S23A, the identification unit 3 sends the charging instruction "F" to the charging unit 5, and the charging unit 5 executes the charging operation, and thereafter, the process operation is advanced to a step S25. Other operations are similar to those of the notification method of the second embodiment.

Figure 12:
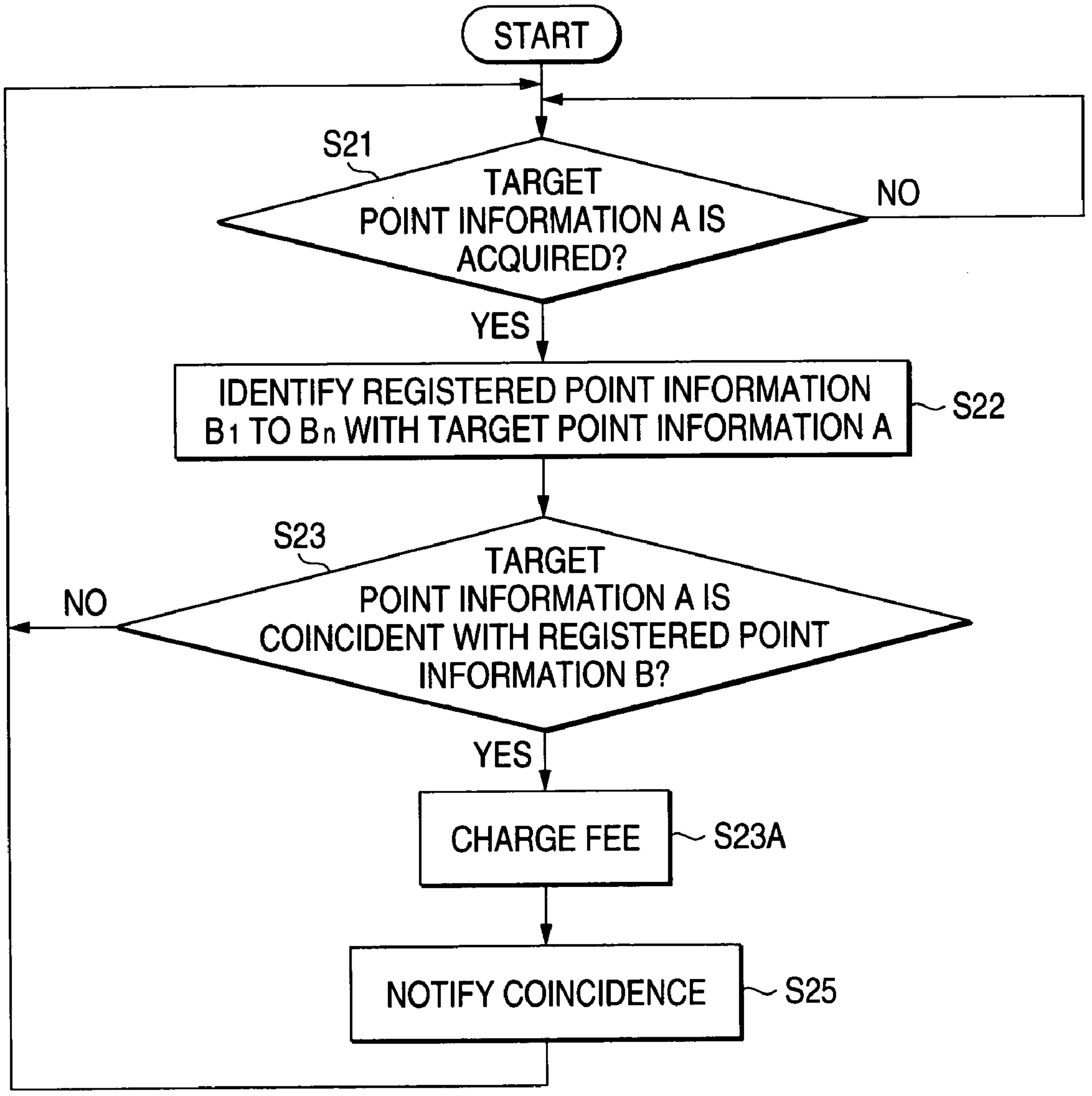
FIG. 12 is a flow chart for representing another notification method executed by the notification apparatus of the third embodiment.

It should also be noted that similar to the flow chart shown in FIG. 9 of the second embodiment, while the process operation defined in the step S24 is omitted, in such a case that the registered point information B is not finally made coincident with the target point information A, the notification unit 4 may send no notification to the above-described owner. A flow chart of this alternative case is represented in FIG. 12.

As previously explained, in accordance with the notification apparatus and the notification method of this third embodiment, the charging operation can be carried out only when the target point information A is made coincident with the registered point information B and thus the notification is given to the owner of this notification apparatus. As a consequence, as the fee system of the emergency event notification service, such a fee system for collecting the service fee only when a notification is carried out may be employed in addition to another fee system for regularly collecting a membership fee.

Fourth Embodiment

Figure 13:
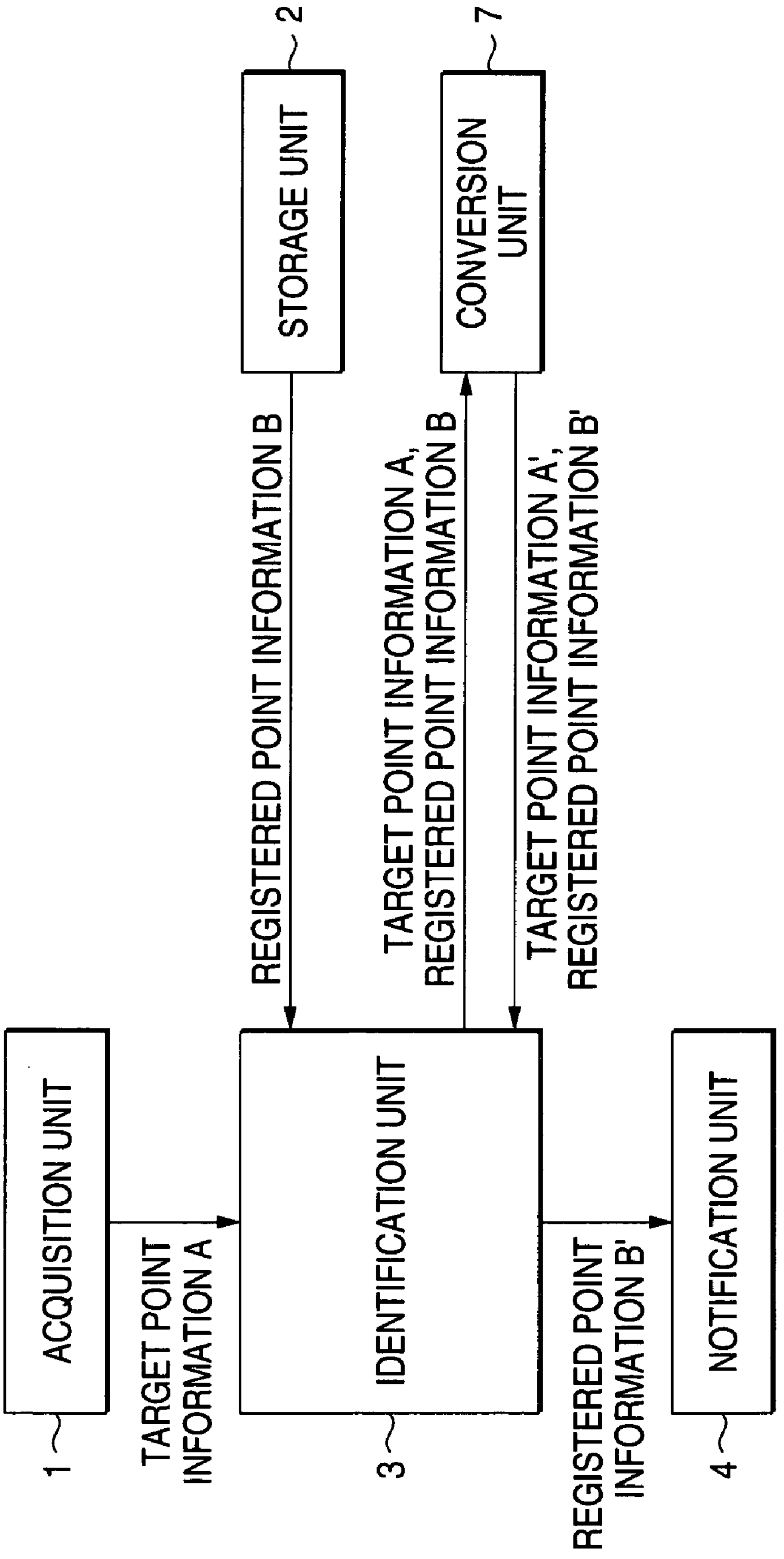
FIG. 13 is a structural block diagram for indicating a notification apparatus of a first example according to a fourth embodiment of the present invention.
Figure 14:
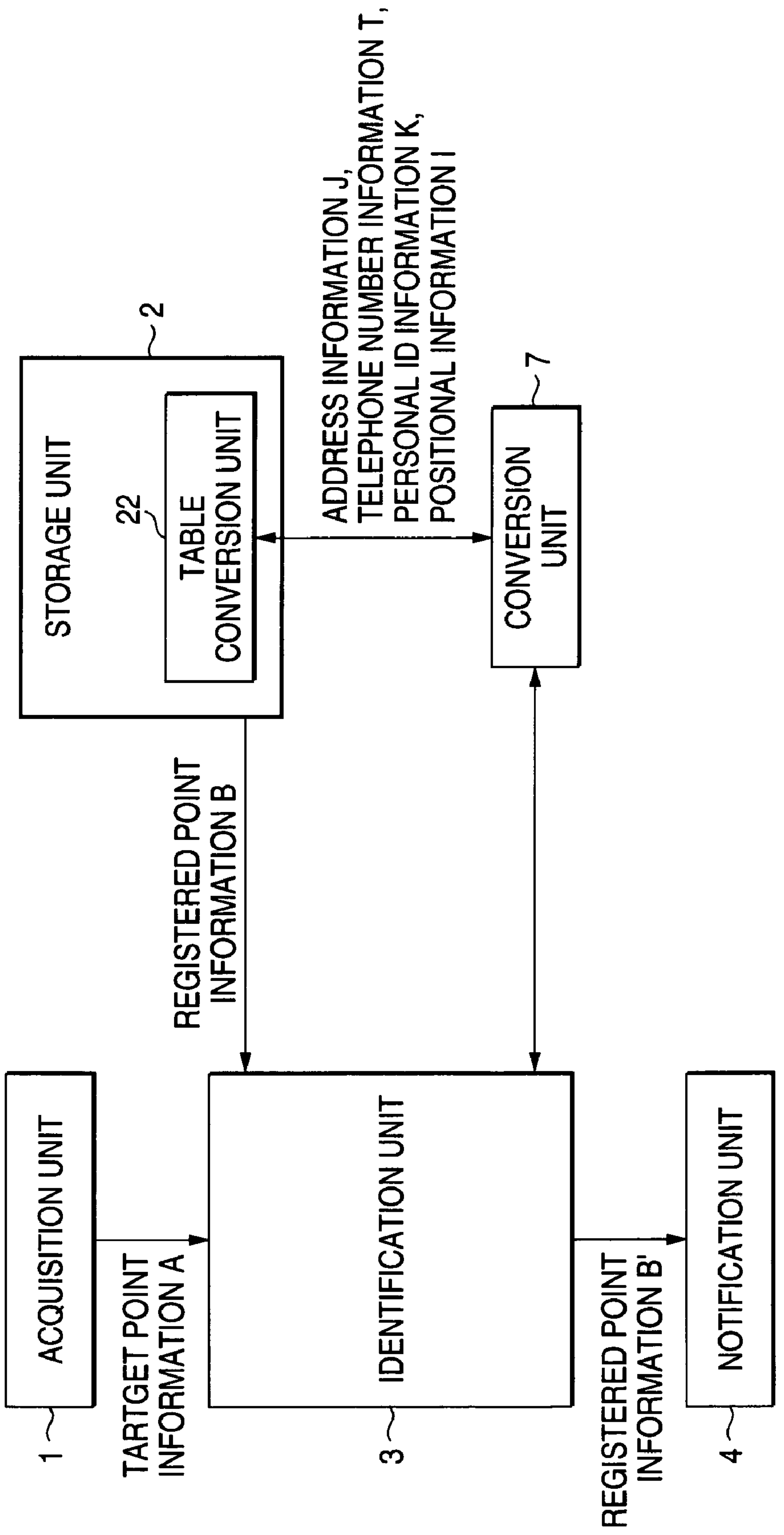
FIG. 14 is a structural block diagram for showing a notification apparatus of a second example according to a fourth embodiment of the present invention.

Referring now to FIG. 13, a notification apparatus according to a first example of a fourth embodiment will be explained in the following explanations. Subsequently, a notification apparatus according to a second example will be described with reference to FIG. 14. FIG. 13 is a structural block diagram for indicating the notification apparatus of a first example according to the fourth embodiment of the present invention. FIG. 14 is a structural block diagram for indicating the notification apparatus of a second example according to the fourth embodiment of the present invention. In this drawing, it should be noted that the same reference numerals shown in FIG. 6 (namely, second embodiment) will be employed as those for denoting the same, or similar portions, and explanations thereof are omitted.

First, as indicated in FIG. 13, the notification apparatus of the first example according to the fourth embodiment is arranged by employing a conversion unit 7 (converting means) in addition to the structural elements contained in the notification apparatus of the second embodiment. The conversion unit 7 converts a sort of target point information A and a sort of registered point information B, respectively. Also, an identification unit 3 of this fourth embodiment executes an identifying operation in such a manner that when the sort of the target point information A acquired in the acquisition unit 1 is different from the sort of the registered point information B stored in the storage unit 2, the identification unit 1 once sends information to the conversion unit 7 so as to convert the information into identifiable sorts, and thereafter performs the identifying operation thereof. When the conversion unit 7 converts the registered point information B into another registered point information B' having a different sort, the identification unit 3 sends this registered point information B' to the notification unit 4.

Also, in the notification apparatus according to the second example of this embodiment, as shown in FIG. 14, a storage unit 2 contains therein a table conversion unit 22 in addition to the conversion unit 7, and the conversion unit 7 converts a sort of information by employing this table conversion unit 22. The table conversion unit 22 stores thereinto various sorts of information conversion tables. These conversion tables are constituted in correspondence with address information J, telephone number information T, personal ID information K, and positional information I, for instance, as indicated in FIG. 15.

It should also be noted that in this conversion table 22, since a table number of combinations is increased depending upon precision (fineness), the positional information I is not handled as a key, but is handled as such an item indicative of typical positions of the address information J, the telephone number information T, and the personal ID information K. Alternatively, as to the respective items of the address information J, the telephone number information T, the personal ID information K, and the positional information I, other converting tables which are aligned in either an ascent order or a descent order may be prepared. In this alternative case, since the information is converted by employing such conversion tables which are aligned based upon the sorts of the registered point information before being converted, converting time may be reduced.

In this example, in such a case that the target point information A corresponds to the address information J and the registered point information B corresponds to the telephone number information T, the identifying unit 3 informs the conversion unit 7 to convert the target point information A into the telephone number information T. The conversion unit 7 converts the address information J received from the identification unit 3 into the telephone number information T corresponding thereto by employing the table conversion unit 22, and thereafter, sends the converted telephone number information T to the identification unit 3. However, since a total number of the transmitted telephone number information T is not always equal to 1, the conversion unit 7 judges as to whether or not all of the address information which have been registered in the conversion table shown in FIG. 15 are coincident with the address information received from the identification unit 3, and then sends all of the corresponding telephone number information T to the identification unit 3.

Also, in such a case that plural sorts of registered point information B which have been registered in the storage unit 2 are not identical to each other, every time the identification unit 3 identifies one of registered point information B with the target point information A, this registered point information B may be converted by the conversion unit 7 in such a manner that the sort of this registered point information B is made coincident with the sort of the target point information A.

As previously explained, in accordance with the notification apparatus of this embodiment, since the conversion unit 7 can convert the sort of the target point information A and the sort of the registered point information B, even in such a case that both a sort of target point information A is different from a sort of registered point information B, which will be identified with each other, the identification unit 3 can identify these sorts of target/registered point information A and B with each other. It should be noted that as a result of identification, the identification unit 3 may notify the identification result only when these sorts of target/registered point information A/B are coincident with each other. Otherwise, the identification unit 3 may notify the identification result irrespective of such a fact as to whether or not the sort of target point information A is identical to the sort of registered point information B. Alternatively, this notification apparatus may be provided with the charging unit 5 owned by the notification apparatus of the third embodiment, and then may perform charging operation only when the sort of target point information A is made coincident with the sort of registered point information B.

Fifth Embodiment

FIG. 6 is a structural block diagram for indicating a notification apparatus according to a fifth embodiment of the present invention. In this drawing, it should be noted that the same reference numerals shown in FIG. 14 (namely, second example of fourth embodiment) will be employed as those for denoting the same, or similar portions, and explanations thereof are omitted. As represented in FIG. 16, the notification apparatus according to the fifth embodiment is arranged by employing a map unit 23 contained in the storage unit 2, instead of the table conversion unit 22 owned by the notification apparatus according to the second example of the fourth embodiment. The map unit 23 stores thereinto the below-mentioned map information M.

Figure 17:
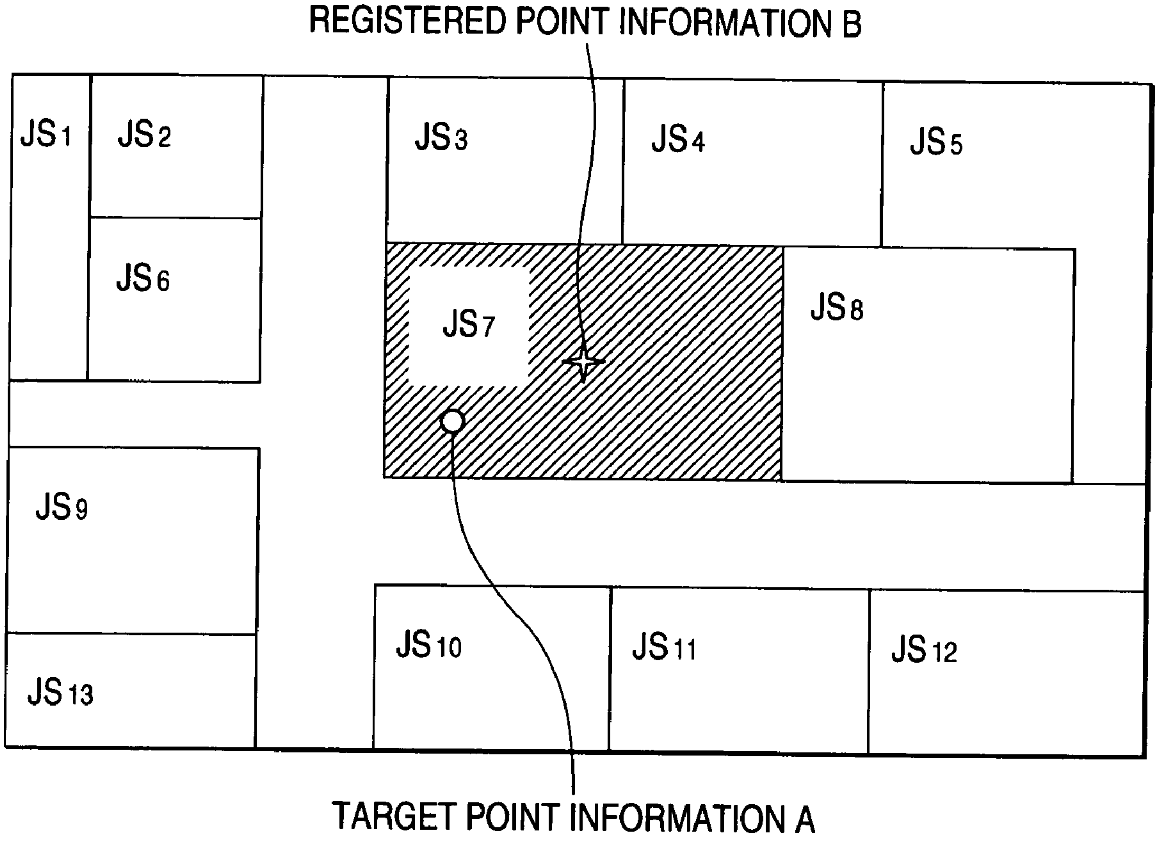
FIG. 17 is an explanatory diagram for indicating target point information A and registered point information B.

A conversion unit 7 of this fifth embodiment is to convert positional information I of target point information A and/or positional information I of registered point information B into address information J by employing address map information MJ stored in the map unit 23. In a case that the acquired target point information A and/or the acquired registered point information B corresponds to the positional information I, this conversion unit 7 absorbs an error between the target point information A and the registered point information B, and then, can identify the target point information A with the registered point information B in an identification unit 3. Also, the above-described error indicates a "shift" which is produced due to a precision difference in such a case that, for example, both the target point information A and the registered point information B are equal to the positional information I, as shown in FIG. 17, although positions which are indicated by the target point information A and the registered point information B represent such places which are indicated by a hatched line.

Figure 18:
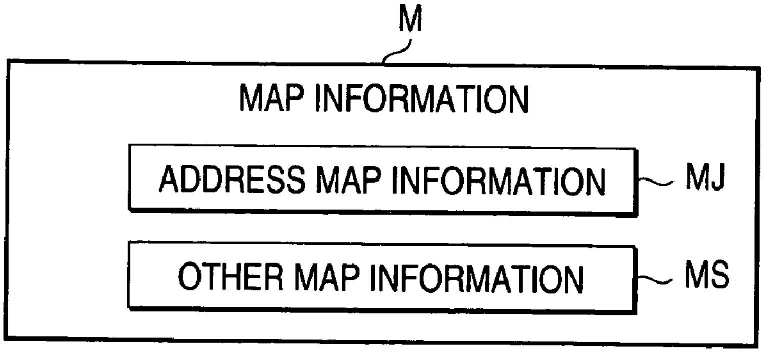
FIG. 18 is an explanatory diagram for indicating a classification of map information "M."

As indicated in FIG. 18, the map information M recorded by the map unit 23 may be classified into the address map information MJ and other map information MS, and is constituted by a shape "S" and an attribute "Z" as represented in FIG. 19. As shown in FIG. 20, the shape S is constructed of both a positional information number IC and a positional information group IG which is constituted by at least one positional information I. Also, the attribute Z indicates either a display method or an indication for implying the shape S containing dots such as character strings. This display method is related to a color, a width, and a texture of the shape S which is expressed by the positional information group IG.

FIG. 21 is an explanatory diagram for explaining a structure of the address map information MJ contained in the map information M. The shape S of the address map information MJ corresponds to a shape used to form an address. In this case, the shape S will be especially called as an "address shape" JS. Also, the attribute Z is arranged by address information J indicative of an address and an address rule JR indicative of a rule of an address which indicates the address shape JS. As to the address information J, an address map be directly indicated by characters, or characters may be systematically coded. Also, in a case that there are rules which are commonly defined by all ranges, or a large range, the address rule JR may be omitted.

For instance, in Japan, the address shape JS is expressed by shapes of administrative boundaries such an Japanese administrative divisions (prefectures; shi/ku/cho/son (city/ward/town/village); oaza (section of city/ward/town/village); and banchi (house number)), and by plane shapes indicative of sites of personal houses. Also, the address information J is expressed by that addresses of plane shapes are directly expressed by characters, or addresses are systematically coded. Also, the address rule JR is omitted, since there is a commonly-used rule, namely positions contained in plane shapes belong to addresses thereof.

Also, for example, in USA/Europe where addresses are expressed by street names, the address shape JS is expressed by such shapes that streets are represented by line shapes. Also, as to the address information J, addresses containing street names are directly expressed by characters, or addresses are systematically coded. Furthermore, the address rule JR is arranged by defining addresses along streets in correspondence with rules, into which addresses of both sides of these streets are described.

It should also be noted that when the amount of the address map information JM is increased, such a management manner is preferable, since the map unit 23 takes long time so as to seek the address shape JS corresponding to the positional information I received by the conversion unit 7. That is, the positional information is segmented, and the segmented positional information which are stored every segment is managed as management information. In this alternative case, the map unit 23 may seek such a segment containing the positional information I from the management information, and then may seek a corresponding address shape within this sought segment, so that resulting conversion time may be shortened.

Next, a description is made of operations executed by the notification apparatus according to this fifth embodiment. In such a case that the address shapes JS are expressed by the plane shapes as in Japan, the conversion unit 7 judges as to whether or not the received positional information I is located within all of the address shapes (plane shapes) present on the address map information MJ of the map unit 23, specifies a plane shape in which the positional information I is present, and sends the address information J corresponding to this plane shape to the identification unit 3.

Also, in a case that the address shapes JS are expressed by the line shapes as in USA/Europe, the conversion unit 7 calculates lengths between perpendiculars as to the received positional information I and all of the line shapes on the map unit 23. Then, the conversion unit 7 specifies an address up to a street name corresponding to a line shape whose length between perpendiculars is the shortest length, and determines the remaining addresses based upon the address rule JR along this street, for example, determines that this address is located on which side of this street, or how long this address is separated far from a position whose address is known. Then, the conversion unit 7 returns the determined address to the identification unit 3 as the address information J of the received positional information I.

In this fifth embodiment, in a case that the target point information A corresponds to the positional information I and the registered point information B corresponds to the address information J, the identification unit 3 sends the acquired target point information A to the conversion unit 7. As previously described, the conversion unit 7 converts the received positional information I into the address information J, and then returns the converted address information J to the identification unit 3. The identification unit 3 identifies a target point information A' which has been converted into the address information J received from the conversion unit 7 with the registered point information B which has been registered into the storage unit 2, and then sends the identification result to the notification unit 4.

For example, concrete operations will now be explained as such an example that the address shape JS is expressed by a plane shape as in Japan. Also, in such a case that while the address information J is stored as the registered point information B, the acquisition unit 1 acquires the positional information I as the target point information A, and also, the address map information MJ of the map unit 23 is represented as in FIG. 17, when the conversion unit 7 receives the target point information A from the identification unit 7 as the positional information I of FIG. 17, the conversion unit 7 judges as to whether or not the received positional information I is located inside of which plane shape as to the address shapes $JS_1$ to $JS_{13}$. In this case, since the target point information A received by the conversion unit 7 is contained within the plane shape of the address shape $JS_7$, the conversion unit 7 returns the address information $J_7$ corresponding to this address shape $JS_7$ to the identification unit 3 in accordance with the table indicated in FIG. 21. The identification unit 3 identifies the registered point information B of the storage unit 2 with the address information J received from the conversion unit 7, and judges these registered point/address information B/J as "being coincident" in a case that the address information $J_7$ is not stored as the registered point information B.

Also, in such a case that the target point information A corresponds to the address information J and the registered point information B corresponds to the positional information I, the conversion unit 7 converts the registered point information B into the address information J so as to be identified every time the identification unit 3 identifies one registered point information B. Also, in such a case that both the target point information A and the registered point information B correspond to the positional information I, every time the acquired target point information A is converted into the address information I by the converting unit 7 and further one registered point information B is identified by the identification unit 3, the registered point information B is converted into the address information J by the conversion unit 7 so as to be identified. As previously explained, the positional information I received by the conversion unit 7 may be equal to either the target point information A or the registered point information B.

Figure 22:
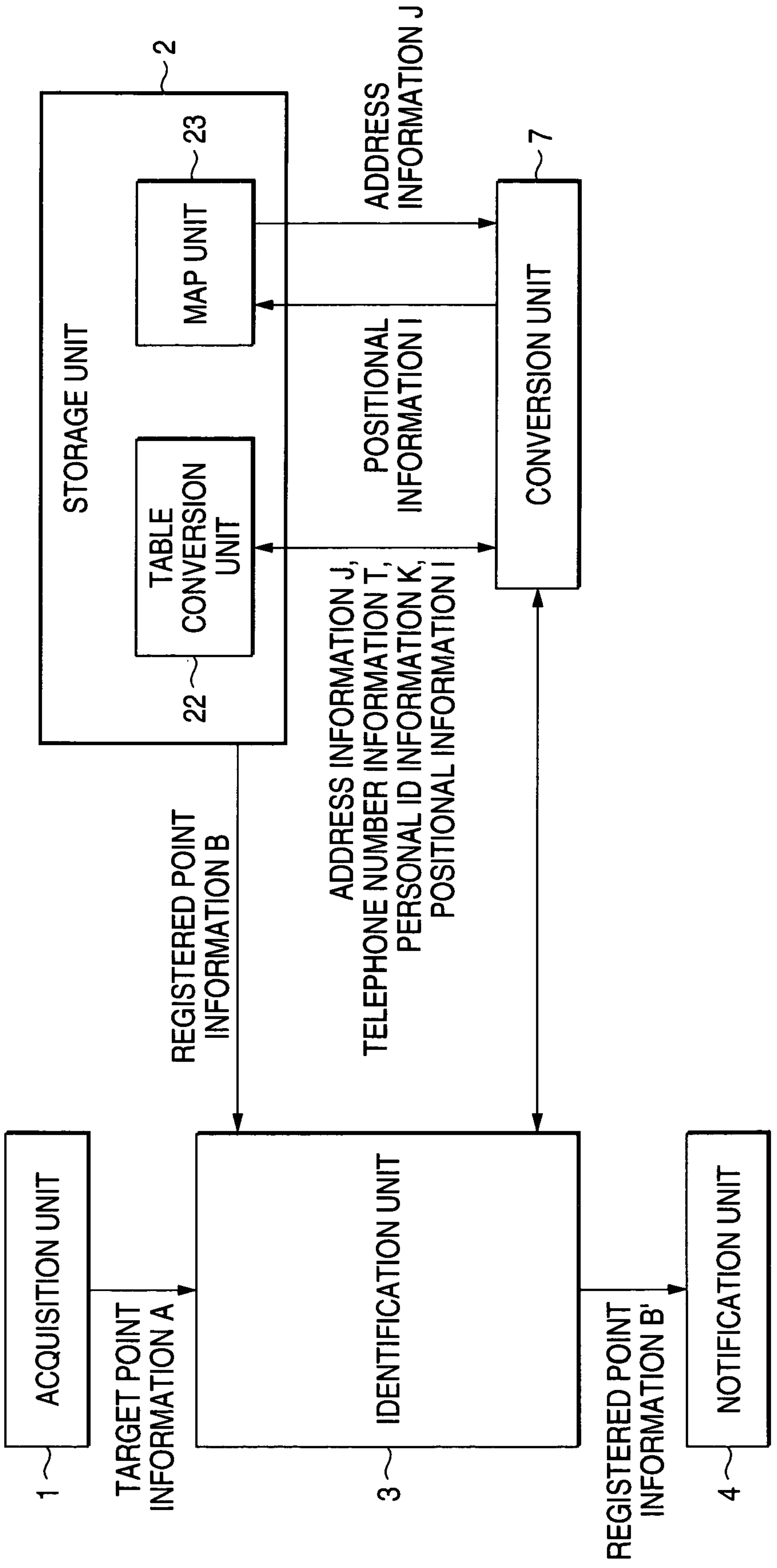
FIG. 22 is a structural block diagram for indicating another arrangement of a notification apparatus according to the fifth embodiment of the present invention.

Next, a description will now be made of such an example that the table conversion unit 22 shown in FIG. 14 and owned by the notification apparatus according to the second example of the fourth embodiment is employed in the storage unit 2 of this fifth embodiment with reference to FIG. 22. Since the conversion unit 7 of this example performs the converting process operation by being combined with both the table conversion unit 22, as to the sort of the information capable of absorbing the error of the positional information in the first example of the above-described fifth embodiment, the error can be absorbed even by not only the address information J, but also the telephone number information T and the personal ID information K.

In this example, in such a case that the target point information A corresponds to the positional information I and also the registered point information B corresponds to either the telephone number information T or the personal ID information K, the conversion unit 7 firstly converts the positional information I functioning as the target point information A into the address information J by employing the map unit 23, as explained above. Next, the conversion unit 7 converts the address information J into either the telephone number information T or the personal ID information K by employing the table conversion unit 22, and then returns the converted information T, or K to the identification unit 3. The identification unit 3 identifies either the telephone number information T or the personal ID information K as the target point information A' received from the conversion unit 7 with the registered point information B stored in the storage unit 2, and then the sends the identification result to the notification unit 4.

Also, in such a case that the target point information A corresponds to either the telephone number information T or the personal ID information K, and also the registered point information B corresponds to the positional information I, every time the identification unit 3 identifies one of the registered point information B, this identification unit 3 sends the registered point information B to the conversion unit 7. The conversion unit 7 converts the positional information I as the registered point information B into the address information J by employing the map unit 23, and subsequently converts the address information J into either the telephone number information T or the personal ID information K by using the table conversion unit 22 and then returns the converted information to the identification unit 3. The identification unit 3 identifies the target point information A with either the telephone number information T or the personal ID information K, which functions as the registered point information B' received from the conversion unit 7.

It should also be noted that the identification unit 3 may converts the acquired target point information A into the address information J by employing both the conversion unit 7 and the table conversion unit 22, and subsequently, may convert the registered point information B into the address information J every time the identification unit 3 identifies one registered point information B.

As previously explained, in accordance with the notification apparatus of this fifth embodiment, after the positional information I has been converted into the address information J by the conversion unit 7, the identification unit 3 identifies the address information J with the target point information A, so that the identification unit 3 can perform the identifying operation by absorbing the error caused by the difference in the precision of the positional information I. It should also be noted that as a result of this identifying operation, the notification unit 4 may notify the identification result only when the address information is made coincident with the target point information. Alternatively, the notification unit 4 may notify the identification result irrespective of such a fact as to whether the address information is made coincident with the target point information A, or not. Also, when the address information is made coincident with the target point information A, the notification unit 4 may notify the identification result in combination with such a fact that which registered point information B can be made coincident with the target point information A. Furthermore, the charging unit 5 owned by the notification apparatus of the third embodiment is employed, and then, the charging system may be provided in a case that the registered point information B is made coincident with the target point information A.

Sixth Embodiment

An arrangement of a notification apparatus according to a sixth embodiment is similar to the arrangement of the notification apparatus according to any one of the first embodiment to the fifth embodiment. An identification unit 3 of this sixth embodiment identifies as to whether or not a place indicated by target point information A acquired by an acquisition unit 1 is located within a constant range in which a place indicated by registered point information B stored in a storage unit 2 is located as a center thereof.

In this sixth embodiment, in a case that the identifying operation is carried out based upon the address information J, a range defined up to "oaza" of the target point information A, another rage defined up to "banchi" thereof, or another range defined up to "go" of a room number of an aggregated house such as a mansion is used as an identification subject in Japan. Also, in USA/Europe where addresses are described in names of streets, a range defined up to a street name, another range defined up to azimuth of north/south/east/west, or another range defined up to an upper digit number of an address is employed as an identification subject.

Also, in a case of such address information which have been systematically coded, assuming now that upper digits of codes indicate broad concept, a range defined from an upper digit up to a preselected digit is employed an identification subject, whereas assuming now that lower digits of the codes indicate broad concept, another range defined from a lower digit up to a preselected digit is used as an identification subject. This systematically coded address information may be independently determined on the basis of a certain basis. For instance, postal codes (ZIP Code) may be employed. Also, in a case that identifying operation is carried out based upon the telephone number T, for instance, a range defined up to a local station number is employed as an identification subject. Furthermore, in a case that the identifying operation is carried out based upon the personal ID information K, assuming now that there is such a rule that values are equal to each other up to a constant digit every household as to the coding rule, a range defined up to the household is used as an identification subject.

Also, in a case that the identifying operation is carried out based upon the positional information I, assuming now that a constant range is segmented, each of these segmented ranges is expressed by a number, and then, a position within this range is expressed by a coordinate value, a range defined up to this segment number, or another range defined from an upper digit of each of the coordinate values up to several digits is employed as an identification subject. Also, assuming now that the positional information I is expressed by latitude/longitude, such a range defined from an upper digit of the latitude up to several digits thereof, and another range defined from an upper digit of the longitude up to several digits thereof are used as an identification subject.

Figure 23:
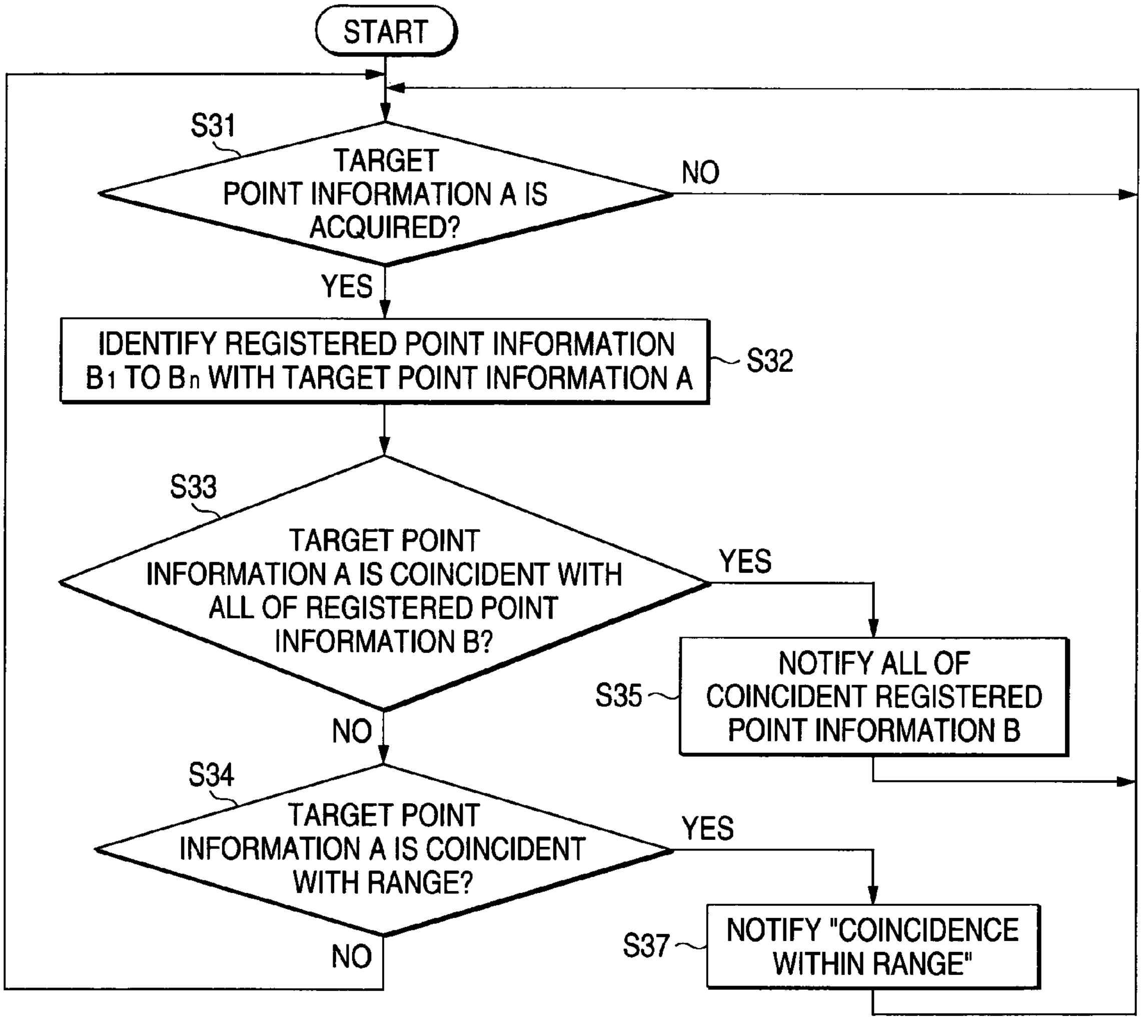
FIG. 23 is a flow chart for explaining a notification method executed by a notification apparatus according to a sixth embodiment.

Next, a notification method which is executed by the notification apparatus of this sixth embodiment will now be described with reference to a flow chart indicated in FIG. 23.

At a first step S31, a judgment is made as to whether or not the acquisition unit 1 acquires the target point information A. If the acquisition unit 1 does not acquire the target point information A, then the process operation defined in step S31 is repeatedly carried out. If yes, then the process operation is advanced to a step S32. In this step S32, a check is made as to whether or not the acquired target point information A is identical to the registered point information $B_1$ to $B_n$ stored in the storage unit 2 by the identification unit 3. Next, in a step S33, a judgment is made as to whether or not one registered point information B is entirely made coincident with the target point information A based upon the identification result obtained in the step S32. If this target point information A is entirely made coincident with this registered point information B, then the process operation is advanced to a step S35. To the contrary, if the target point information A is not entirely made coincident with the registered point information B, the process operation is advanced to a step S34.

In the step S35, the notification unit 4 notifies to the owner of the notification apparatus, such a fact that the target point information A is entirely made coincident with the registered point information B of one record of the storage unit 2, and then, the process operation is returned to the step S31. Also, in the step S34, a judgment is made as to whether or not a place indicated by the target point information A is located within a constant range where a place indicated by the registered point information B is located as a center. If the first-mentioned place is located within the constant range, the process operation is advanced to a step S37. To the contrary, if the first-mentioned place is not located within this constant range, the process operation is returned to the step S31. In the step S37, the notification unit 4 notifies such a fact that the registered point information B is made coincident with the target point information A within the constant range to the above-described owner, and then, the process operation is returned to the step S31.

It should be noted that both the notification method executed in the step S35 and the notification method executed in the step S37 are carried out in accordance with various different modes, for instance, a display content, voice, light emission, and vibrations. As a result, since the owner can easily know a dangerous degree, such kind notification may be carried out.

As previously explained, in accordance with the notification method and the notification method of this sixth embodiment, the notification unit 4 can notify such a fact to the owner of the notification apparatus even when the target point which is indicated by the target point information A and to which the emergency vehicle is directed is located near the registered point indicated by the registered point information B. Also, in such a case that only such an approximate place indicated by the target point information A is known which is not so detail as compared with the registered point information B, the notification unit 4 may notify confirmation notification. Alternatively, while the charging unit 5 employed in the notification apparatus of the third embodiment is provided with this notification apparatus, such a charging system may be realized and performed in such a case that the registered point information B is entirely made coincident with the target point information A and/or the registered point information B is made coincident with the target point information A within a constant range. Also, since charge amounts are involved in a charging instruction issued from the identification unit 3 to the charging unit 5, charge amounts may be varied in such a case that the registered point information B is entirely made coincident with the target point information B and also is made coincident within a constant range.

Seventh Embodiment

Figure 24:
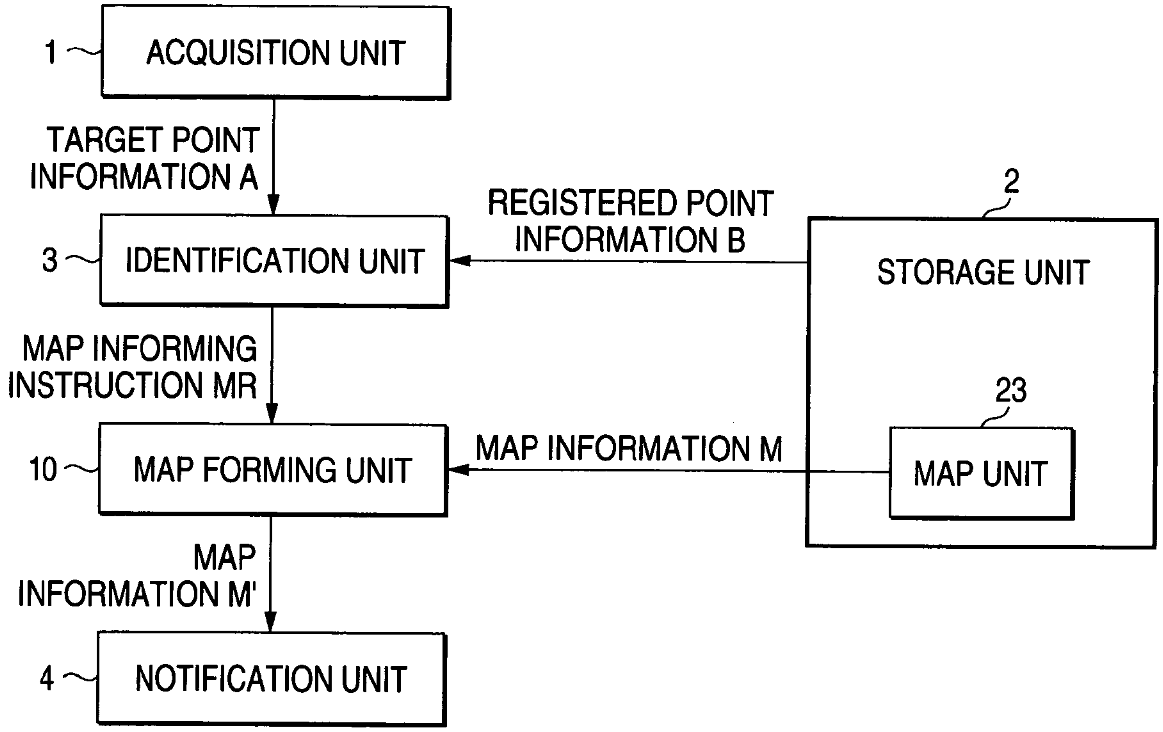
FIG. 24 is a structural block diagram for showing a notification apparatus according to a seventh embodiment of the present invention.

FIG. 24 is a structural block diagram for indicating a notification apparatus according to a seventh embodiment of the present invention. In this drawing, it should be noted that the same reference numerals shown in FIG. 3 (namely, first embodiment) will be employed as those for denoting the same, or similar portions, and explanations thereof are omitted. As indicated in FIG. 24, the notification apparatus according to the seventh embodiment is arranged by further employing a map forming unit 10 (map forming means) in addition to the structural elements owned by the notification apparatus according to the first embodiment, and a storage unit 2 contains a map unit 23 corresponding to a map information storage means.

When an identifying operation is ended, an identification unit 3 produces a map forming instruction MR containing a plurality of positional information "I" by employing registered point information B stored in the storage unit 2 and/or target point information A acquired from an acquisition unit 1, and then sends the produced map forming instruction MR to the map forming unit 10. As represented in FIG. 20, the map forming instruction MR is constituted by a positional information number IC indicative of a total number of positional information I, and a positional information group IG which is made of plural sets of the positional information I, the total quantity of which is equal to a total number of the above-described positional information IC.

Figure 25:
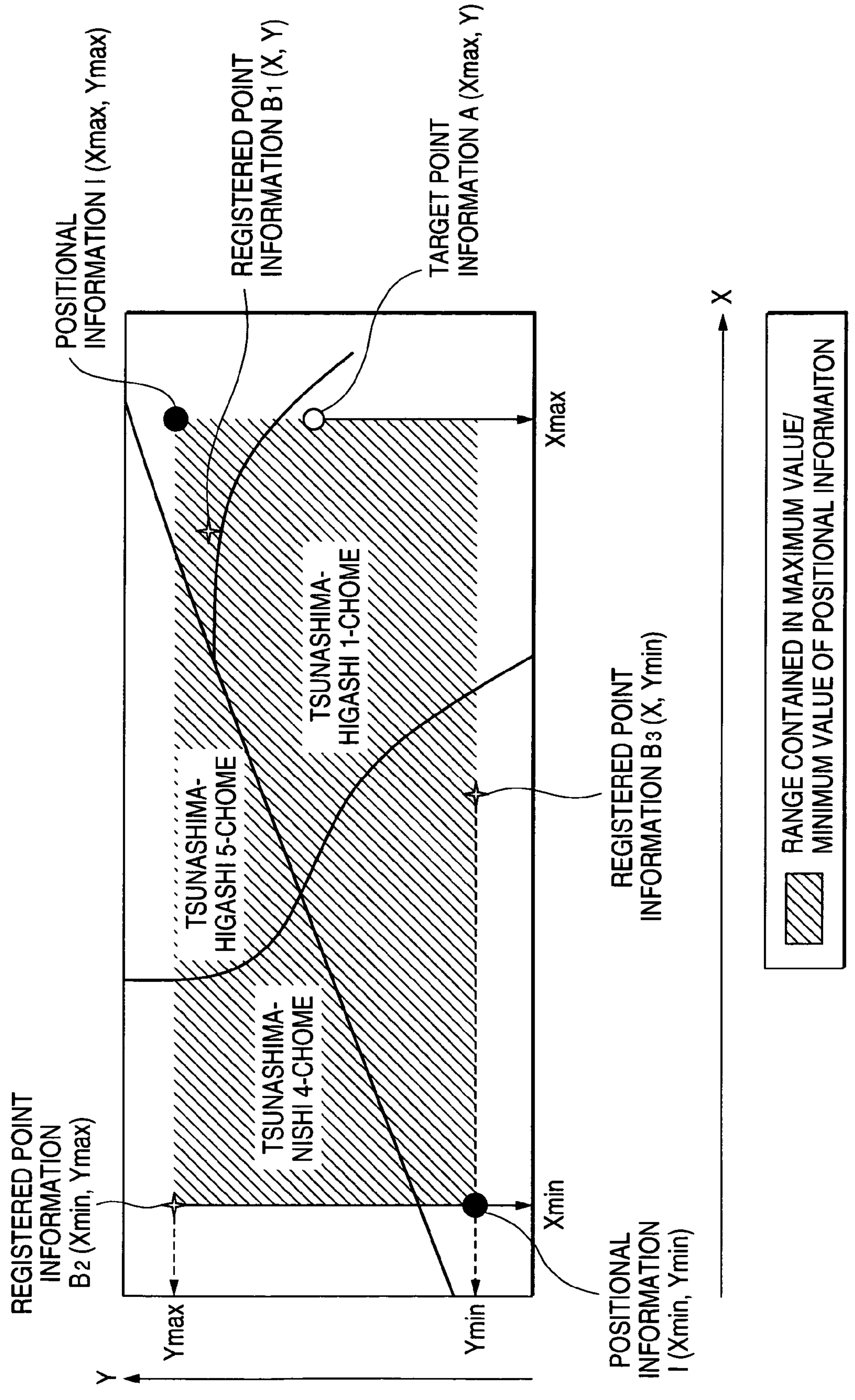
FIG. 25 is an explanatory diagram for indicating a method for deriving the map information M from a map unit 23.

Also, the map forming unit 10 receives the map forming instruction MR from the identification unit 3, derives map information M from the map unit 23, and thereafter, forms such a map information M' and then sends this formed map information M' to the notification unit 4. That is, the map forming unit 10 forms this map information M' in the most enlarged scale, where all of the map information I is expressed as marks on the map, while this most enlarged scale contains a plurality of positional information I indicated by the map forming instruction MR. A system for deriving the map information from the map unit 23 by the map forming unit 10 may be conceived as follows. That is, as shown in FIG. 25, while both a maximum value and a minimum value of the positional information I indicated by the map forming instruction MR are specified, all of such map information M which contains positional information between the maximum value and the minimum value may be derived. Alternatively, while an information deriving range is widened by extending a predetermined value from the maximum value along a plus direction and a predetermined value from the minimum value along a minus direction, any information may be derived. Also, in such a case that the map unit 23 stores map information which has been segmented within a constant range, all of such segments may be derived which are contained between the maximum value and the minimum value of the positional information I indicated by the map forming instruction MR.

Also, while a direction of an indication is considered, the map forming unit 10 may change the entire direction of the formed map information M' in such a manner that, for instance, the target point information A is located at an upper portion, and then may cut out only a rectangular portion which is used in the map indication so as to send the cut rectangular portion to the notification unit 4. Also, when the map information M' is formed, in a case that there are large numbers of derived map information M, the map forming unit 10 may apply priority orders to these derived map information M in accordance with the attribute Z, and then may form this map information M' by employing only such map information M' having higher priority orders.

Also, the notification unit 4 displays the map information M' formed in the map forming unit 10 so as to notify this map information M' to the owner of the notification apparatus. The map information M' may be realized even by a vector map constituted by both a coordinate value and a character string, even by a raster map such as a bit map, or even by compressing these vector map and raster map. Since an information amount as to the map information M' of the vector map is smaller than that of the raster map, necessary information can be quickly sent to the notification unit 4. Also, in a case that the map information M' of the raster map is sent to the notification unit 4, the notification unit 4 need not be equipped with a function capable of displaying the vector map. In a case that the map information M' corresponds to either the compressed vector map or the compressed raster map, since an information amount of this compressed information is smaller than that of the non-compressed information, necessary information can be quickly sent to the notification unit 4.

Figure 26:
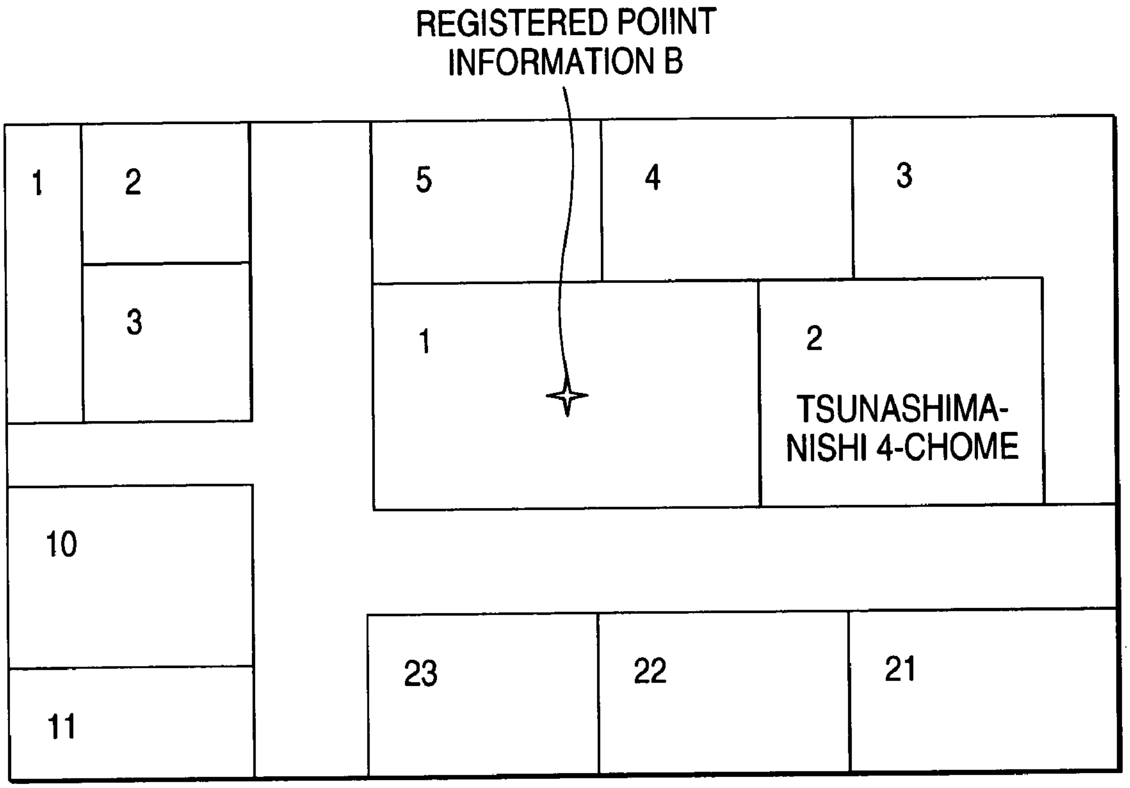
FIG. 26 is an explanatory diagram for describing map information M' in such a case that registered point information B is made coincident with target point information and the identifying operation is complete.
Figure 27:
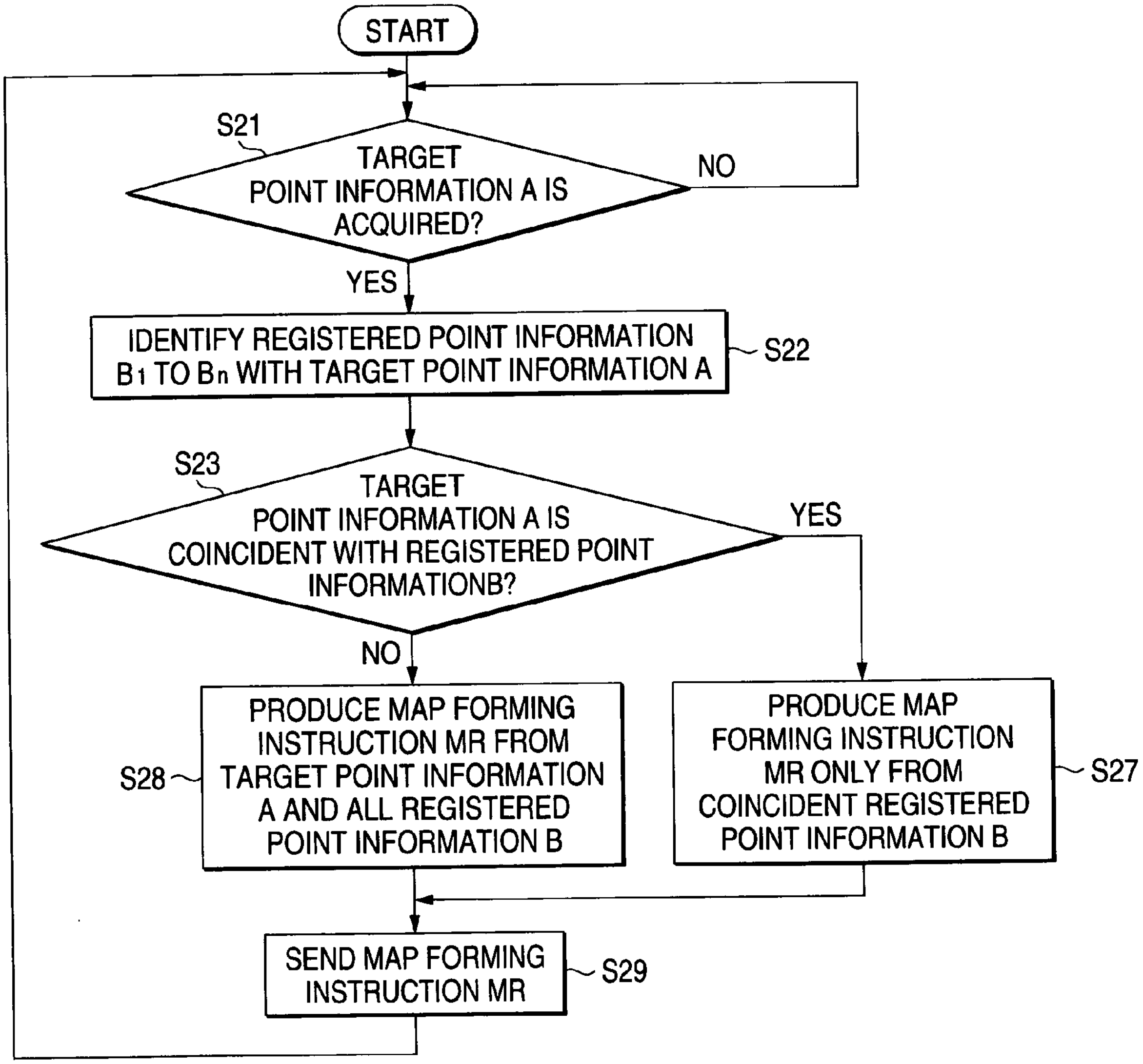
FIG. 27 is a flow chart for explaining a notification method executed by a notification apparatus according to the seventh embodiment.

It should also be noted that the notification unit 4 may alternately display both the map information M', and such an indication of either "! emergency event happens to occur!" or "emergency vehicle is being dispatched" every time constant time has elapsed. Also, as represented in FIG. 26, while the registered point information B is displayed, a guide content by voice may be changed; while a light emitting means is employed, a method for turning ON this light emitting means maybe changed; or while a vibration means is employed, a vibration method thereof may be changed. Alternatively, only when the registered point information B is made coincident with the target point information A, the map forming unit 10 is operated and then the notification unit 4 may display the map information M'. A notification method executed by the notification apparatus of this embodiment will now be explained with reference to a flow chart shown in FIG. 27. It should also be understood that in this drawing, the same reference numerals shown in FIG. 8 (namely, second embodiment) will be employed as those for denoting the same, or similar steps, and explanations thereof are omitted.

First, in a step S23, the identification unit 3 identifies the target point information A with the registered point information B. In this step S23, in a case that these target/registered point information A/B are made coincident with each other, the identification unit 3 produces the map forming instruction MR by employing only the coincident registered point information B. At this time, the positional information number IC of the map forming instruction MR becomes "1".

On the other hand, in a case that all of the registered point information B is not made coincident with the target point information A in the step C23, the process operation is advanced to a step S28. In this step S28, the identification unit 3 produces the map forming instruction MR based upon both the target point information A and all of the registered point information B. At this time, the map forming instruction MR is constituted in such a manner that the target point information A is set to first positional information $I_1$, and the registered point information B is set to second positional information $I_2$ and the subsequent positional information $I_n$. In order to discriminate the first positional information $I_1$ of the map forming instruction MR from the second positional information $I_2$ to the subsequent positional information $I_n$, the positional information $I_1$ and the positional information $I_2$ to $I_n$ are expressed by using different colors and different shaped marks. As a consequence, the positional information number IC of the map forming instruction MR becomes "number of target point information A+number of registered point information B". Finally, in a step S29, the identification unit 3 transmits the map forming instruction MR which is formed in either the step S27 or the step S28 to the map forming unit 10, and then, the process operation is returned to the step S21.

Thereafter, the map forming unit 10 sends to the notification unit 4, the map information M' in which all of the positional information I of the map forming instruction MR have been expressed by the marks based upon both the map forming instruction MR sent from the identification unit 3 and the map information M supplied from the map unit 23. This notification unit 4 displays this map information M' and notifies the map information M' to the owner.

Figure 28:
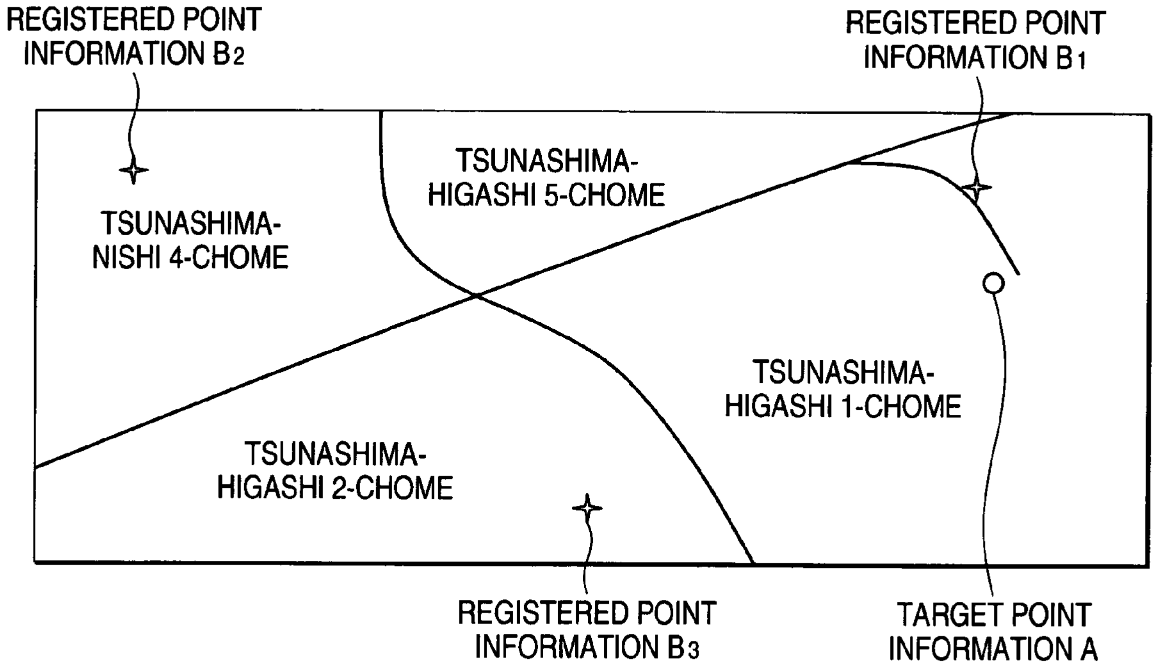
FIG. 28 is an explanatory diagram for describing map information M' in such a case that all of the registered point information B are not made coincident with target point information and the identifying operation is complete.

When the registered point information B is made coincident with the target point information A, as shown in FIG. 26, a peripheral area of this registered point information B is displayed in an enlarge manner as the map information M'. On the other hand, in such a case that all of the registered point information B is not made coincident with the target point information A, as shown in FIG. 28, all of the registered point information B and the target point information A are compressed to be displayed as the map information M' in such a manner that these registered point information B and target point information A may be displayed. As a result, the notification unit 4 can notify either "coincident" or "not coincident" to the owner in a visible/easy-understandable manner. In a case that the registered point information B is not made coincident with the target point information A, since the positions of the target point information A and of the registered point information B can be grasped and also all of the registered point information B is displayed, the owner can confirm as to whether or not the registered point constitutes the identification subject.

As previously explained, in accordance with the notification apparatus and the notification method of this seventh embodiment, since the notification unit 4 of the notification apparatus for displaying the map information M' represents both the target point information A and the registered point information B as the marks on the map, both the position indicated by the target point information A and the position indicated by the registered point information B which constitutes the identification subject can be notified in the visible/easy-understandable manner. Furthermore, the charging unit 5 owned by the notification apparatus of the third embodiment is employed, and then, the charging system may be provided in a case that the registered point information B is made coincident with the target point information A. Also, while both the conversion unit 7 and the table conversion unit 22 are provided which have been explained in the fourth embodiment, after the sorts of both the target point information A and the registered point information B are converted by the conversion unit 7, these converted target/registered point information A/B may be made coincident with each other. Also, while the map unit 23 of the storage unit 2 is employed which has been explained in the fifth embodiment, the error between the target point information A and the registered point information B may be absorbed.

Figure 29:
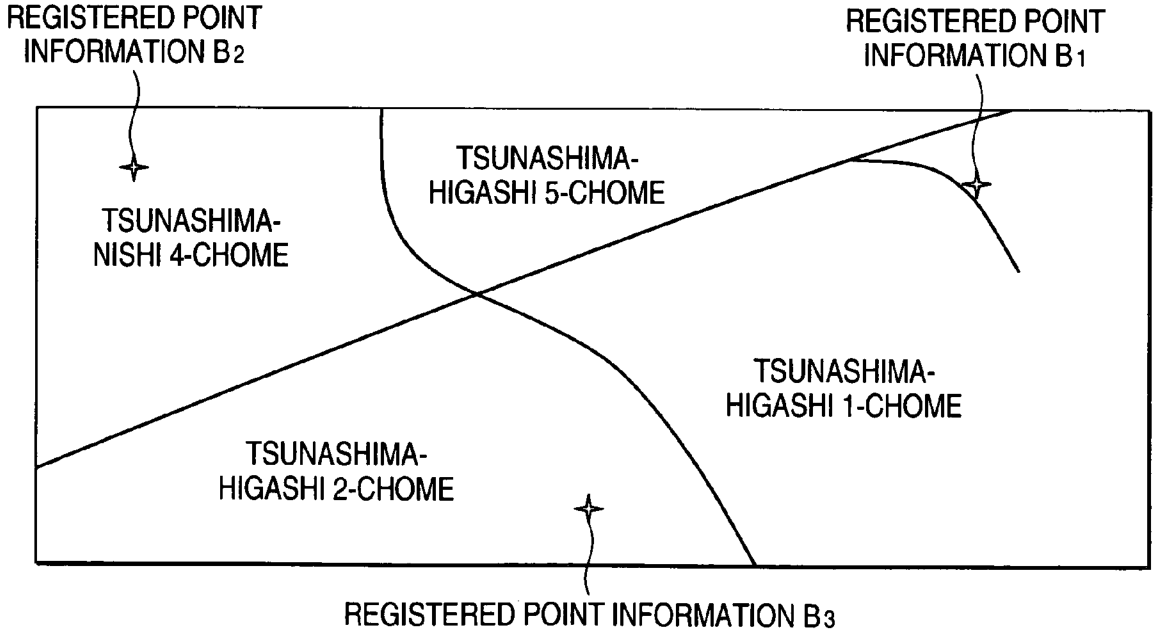
FIG. 29 is an explanatory diagram for showing such a map information M' in which the registered point information B is indicated by dots.

Also, in such a case that a result of identifying operation executed between the target point information A and the registered point information B becomes "incoincident", as shown in FIG. 29, the identification unit 3 may not involve the target point information A into the map forming instruction MR sent to the map forming unit 10. At this time, as to an unhappy aspect of a third party, although such an event that an emergency vehicle is dispatched happens to occur in any persons other than the owner, since no one knows the occurrence of this emergency event and also where this emergency event occurs, the privacy can be guarded.

Eighth Embodiment

Figure 30:
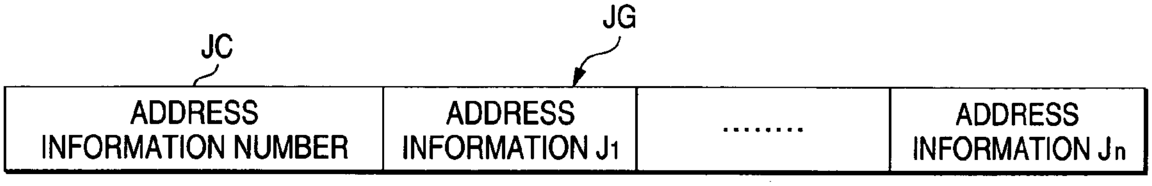
FIG. 30 is an explanatory diagram for indicating a structure of a map forming instruction MR in an eighth embodiment.

In the notification apparatus of the seventh embodiment, the map forming instruction MR contains the positional information I, whereas in a notification apparatus of an eighth embodiment, a map forming instruction MR is constructed of address information J. FIG. 30 is an explanatory diagram for showing a structure of the map forming instruction MR in the eighth embodiment. As represented in this drawing, the map forming instruction MR is constituted by an address information number JC indicative of a total number of address information J, and an address information group JG which is made of plural sets of the address information J, the total quantity of which is equal to a total number of the above-described address information JC.

An identification unit 3 of this eighth embodiment checks as to whether or not target point information A is identified with registered point information B. As a result of this identifying operation, in a case that these target/registered point information A/B are made coincident with each other, the identification unit 3 produces the map forming instruction MR by employing only one address information J corresponding to the coincident registered point information B. At this time, the address information number JC of the map forming instruction MR becomes "1". As a result of this identifying operation, in a case that all of the registered point information B is not made coincident with the target point information A, the identification unit 3 produces the map forming instruction MR based upon address information J corresponding to both the target point information A and all of the registered point information B. At this time, the map forming instruction MR is constituted in such a manner that the target point information A is set to first address information $J_1$, and the registered point information B is set to second address information $J_2$ and the subsequent address information $J_n$. As a consequence, the address information number JC of the map forming instruction MR becomes "number of target point information A + number of registered point information B".

Also, the map forming unit 10 of this eighth embodiment receives the information forming instruction MR which contains at least one address information J from the identification unit 3, and derives an address shape JS from the address map information MJ (see FIG. 21) stored in the map unit 23 of the storage unit 2. This address shape JS corresponds to each of the address information J contained in the map forming instruction MR.

Next, both a maximum value and a minimum value are obtained from all of the positional information I contained in the derived address shape JS, and then, map information which contains positional information between the maximum value and the minimum value is derived from the map unit 23. Alternatively, while an information deriving range is widened by extending a predetermined value from the maximum value along a plus direction and a predetermined value from the minimum value along a minus direction, the map forming unit 10 may derive the map information M. Also, in such a case that the map unit 23 stores map information which has been segmented within a constant range, all of such segments may be derived which are contained between the maximum value and the minimum value of the positional information I indicated by the map forming instruction MR.

Figure 31:
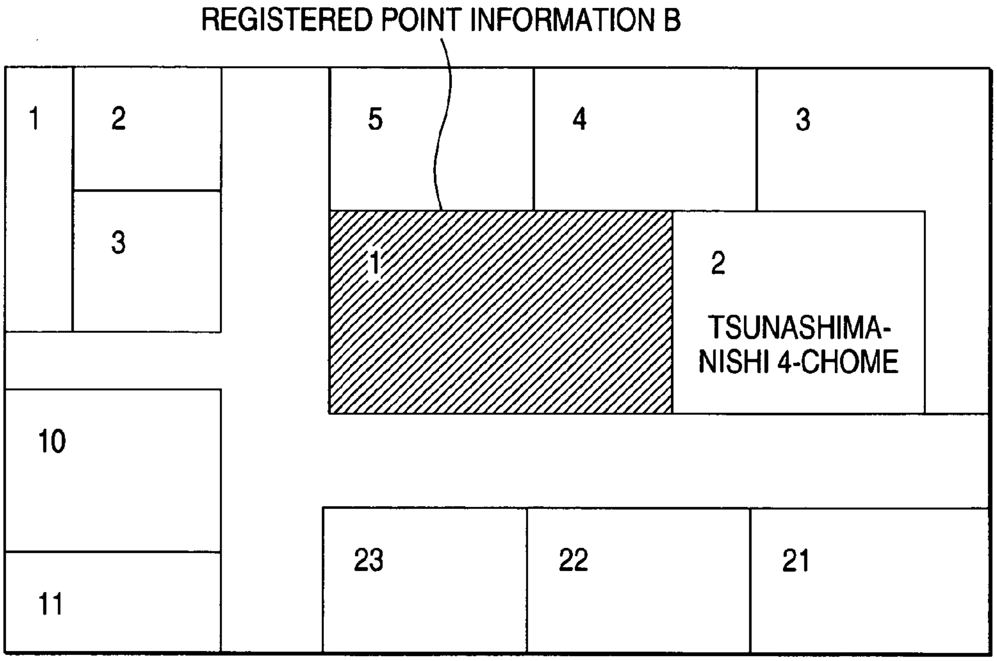
FIG. 31 is an explanatory diagram for showing an image of such a map information M' that an address shape JS is indicated on a map.

Next, the map forming unit 10 forms a map in such a manner that the derived map information M may be expressed in the most enlarged scale, and represents the address shapes JS corresponding to the respective address information J of the map forming instruction MR on this formed map by changing either the color representation or the width representation as compared with those of other address shapes JS, and then, sends this resultant map as the map information M' to the notification unit 4. The notification unit 4 displays the map information M' received from the map forming unit 10 so as to notify this map information M' to the owner. FIG. 31 is an explanatory diagram for explaining an image of the map information M' made by displaying the address shapes JS on the map.

In such a case that the address information J of the map forming instruction MR received from the identification unit 3 is coarser than the address information J of the address map information MJ of the map unit 23, the map forming unit 10 displays address shapes JS of all of the address map information MJ as the address shape JS corresponding to the map forming instruction MR on the map information M', while all of these address map information MJ owns such address information J, even which is partially made coincident with the address information J of the map forming instruction MR. As a consequence, in such a case that the content of the target point information A is not so precise than that of the registered point information B, and thus only an approximate place is known, and also in a case that both the target point information A and the registered point information B are located within a constant range, the identification unit 3 constitutes the address information $J_1$ of the map forming instruction MR based upon either the target point information A itself whose content is not so precise than that of the registered point information B, or the portion of the target point information A which is made coincident with the registered point information B. Also, the identification unit 3 constitutes the address information $J_2$ and the subsequent address information thereof based upon either all of the registered point information B stored in the storage unit 2 or a partial portion of the registered point information B which is made coincident with the target point information A. As a consequence, the target point information may be represented by the shape indicative of the wide range whereas the registered point information B is represented by the narrow range, namely, the map information M' may be expressed by such a shape which is substantially same as a dot, so that visible/easy-understandable notification can be given to the owner of the notification apparatus.

Figure 33:
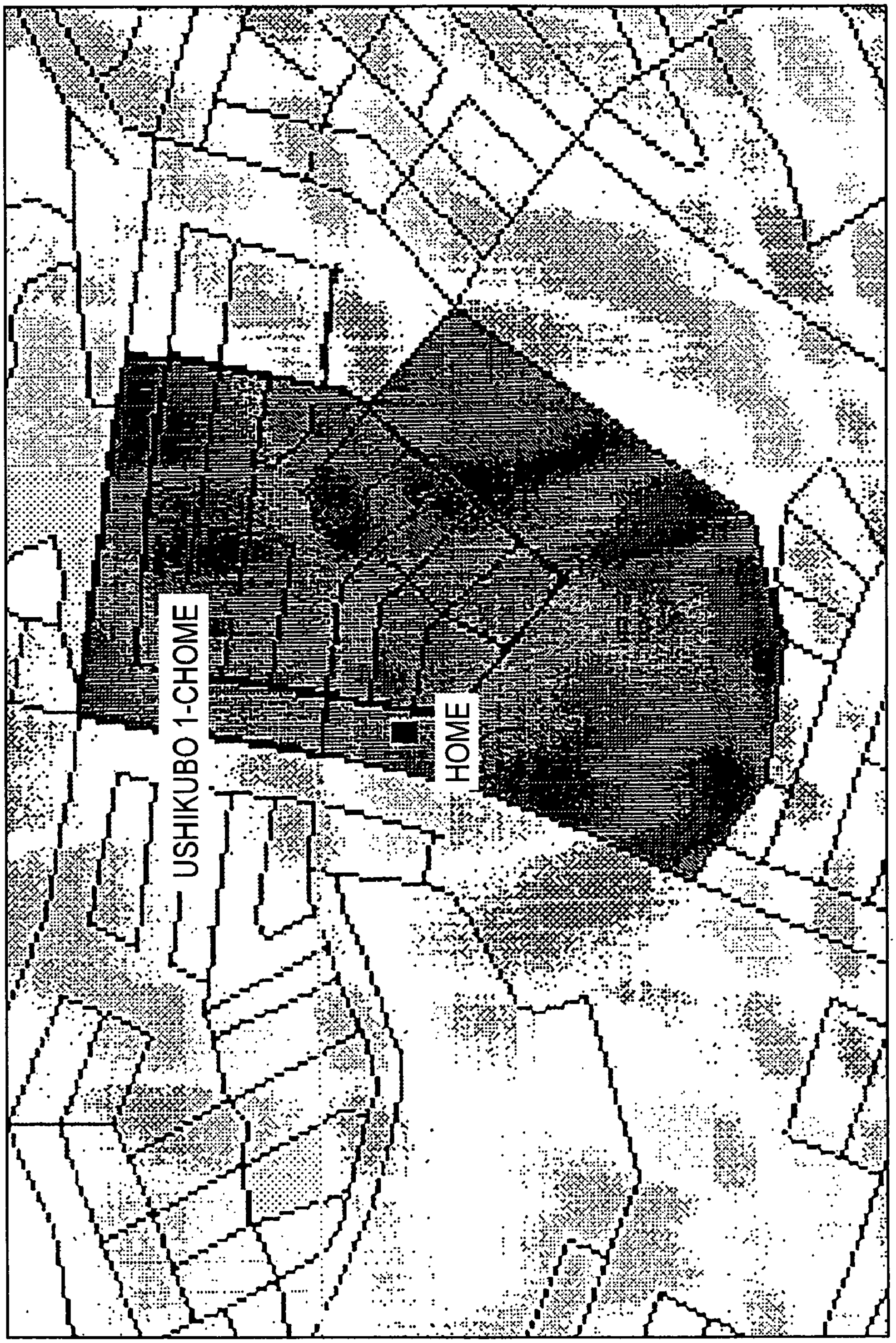
FIG. 33 is an explanatory diagram for showing an image of map information M' which is formed in a case (a) of FIG. 32.

FIG. 32 is an explanatory diagram for explaining a correspondence relationship among a condition during identifying operation, a result of identifying operation, a structure of a map forming instruction, and map information. In this drawing, a case (a) corresponds to such a case that the content of the target point information A is not so precise than that of the registered point information B, and as a result of identifying operation, any one of registered point information $B_x$ is made coincident with the target point information A. In this case, as to the structure of the map forming instruction MR, the first address information $J_1$ is equal to the target point information A itself, and a portion of the second and subsequent address information J corresponds to the registered point information $B_x$. An image of the map information M' formed in this case (a) is represented in FIG. 33.

Figure 34:
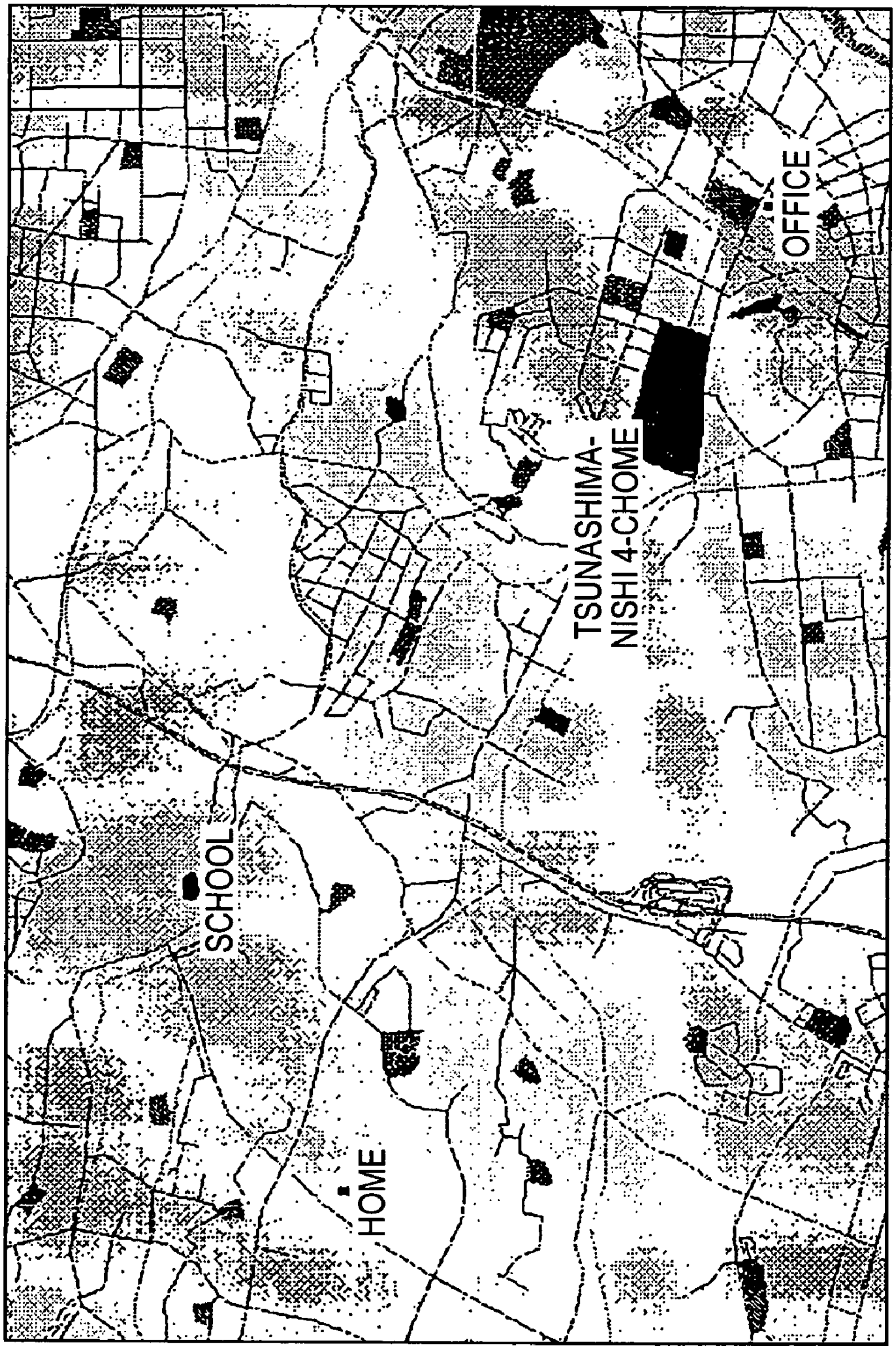
FIG. 34 is an explanatory diagram for showing an image of map information M' which is formed in a case (b) of FIG. 32.

Also, a case (b) corresponds to such a case that the content of the target point information A is not so precise than that of the registered point information B, and as a result of identifying operation, all of the registered point information is not made coincident with the target point information. In this case, as to the structure of the map forming instruction MR, the first address information $J_1$ is equal to the target point information A itself, and also the second and subsequent address information J correspond to all of the registered point information $B_1$ to $B_n$ stored in the storage unit 2. An image of the map information M' formed in this case (b) is represented in FIG. 34.

Also, a case (c) corresponds to such a case that an identifying operation is made as to whether or not a range where the registered point information B is located at a center thereof is made coincident with the target point information A, and as a result of this identifying operation, anyone of registered point information $B_x$ is made coincident with the target point information A. In this case, as to the structure of the map forming instruction MR, the first address information $J_1$ is equal to such a portion within the target point information A, which is used in the identifying operation, and also second and subsequent address information J correspond to the registered point information $B_x$. An image of the map information M' formed in this case (c) is represented in FIG. 33.

Furthermore, a case (d) corresponds to such a case that an identifying operation is made as to whether or not a range where the registered point information B is located at a center thereof is made coincident with the target point information A, and as a result of identifying operation, all of registered point information is not made coincident with the target point information A. In this case, as to the structure of the map forming instruction MR, the first address information $J_1$ is equal to such a portion within the target point information A, which is used in the identifying operation, and also second and subsequent address information J correspond to all of the registered point information $B_1$ to $B_n$. An image of the map information M' formed in this case (d) is shown in FIG. 34.

A concrete example of the above-described case (b) will be explained as follows: It is so assumed that the address information J defined up to "prefectures", "shi/ku/cho/son (city/ward/town/village)", "oaza (section of city/ward/town/village", "banchi (block number)", and "go (house number)" has been registered as the registered point information B, whereas the target point information A received by the identification unit 3 is constructed only of "prefectures", "shi/ku/cho/son (city/ward/town/village)", "oaza (section)" and "chome (subsection)". Then, the identification unit 3 identifies the received target point information A with the registered point information B within such a range defined up to "prefectures", "shi/ku/cho/son", "oaza", and "chome". In this case, in such a case that all of the registered point information B is not made coincident with the target point information A, as to the map forming instruction MR to be notified to the map forming unit 10, the address information $J_1$ is constituted by the acquired target point information A itself, and also the address information $J_2$ and the subsequent address information are constituted by all of the registered point information B.

As to the address information $J_1$ of the map forming instruction MR received by the map forming unit 10, since such information defined up to only “prefectures”, “shi/ku/cho/son”, “oaza”, and “chome” is described, this map forming unit 10 derives such an address shape JS from the address map information JM of the map unit 23, and then represents this derived address shape JS in red colors, for example. This address shape JS owns such an address information J whose information defined up to “prefectures”, “shi/ku/cho/son”, “oaza”, and “chome” is made coincident therewith. Also, as to the address information $J_2$ to $J_n$ of the map forming instruction MR received by the map forming unit 10, since such information defined up to “prefectures”, “shi/ku/cho/son (city/ward/town/village)”, “oaza (section)”, “chome (subsection)”, “banchi (block number)”, and “go (house number)” is described, the map forming unit 10 derives such an address shape JS from the address map information JM of the map unit 23, and then expresses this derived address shape JS in, for instance, blue colors. This address shape JS owns such an address information J whose information defined up to “prefectures”, “shi/ku/cho/son”, “oaza”, “chome”, “banchi”, and “go” is made coincident therewith.

The map forming unit 10 calculates both a maximum value and a minimum value from the positional information I of all of the derived address shapes JS, and then derives such a map information M contained in this range from the map unit 23. The map forming unit 10 forms such a map in a maximum scale, which contains all of the derived map information M, and produces map information M', and then sends this produced map information M' to the notification unit 4. In this map information M', the address shape JS corresponding to the address information J indicated by the map forming instruction MR is represented in both the red color and the blue color on this formed map. As a result, as shown in FIG. 34, since such a map information M is displayed in which the target point information A is represented by a shape indicative of a wide range and also the registered point information B is represented by a shape indicative of a narrow range, the map information M can be notified in visible/easy-understandable manner to the owner.

It should be understood that the Japanese address information has been described in the above-described example. In a case of the USA/European address information in which addresses are indicated by street names, when the above-described address of “chome” is replaced by an address of “street name”, the above-described notification method may be similarly applied. Also, in the above-explained eighth embodiment, the address map information MJ has been indicated in the map unit 23, assuming that only the address shapes having the most precise classification have been stored. Alternatively, such address shapes having large classifications other than the address shapes having the most precise classification may be stored. In this alternative case, the address information J corresponding to this address shape JS is stored by omitting the fineness thereof in response to the magnitude of the classification. The map forming unit 10 derives all of the address shapes JS which are made coincident with the received address information J from the address map information MJ of the map unit 23 and then forms a map. This implies that for instance, in Japan, in a case that the shape having the most precise classification is defined as a site shape of a personal house, the shapes having the large classification are defined as shapes of “banchi”, “oaza”, “shi/ku/cho/son”, and “prefectures”.

As previously described, in accordance with both the notification apparatus and the notification method of this eighth embodiment, since both the target point information A and the registered point information B are represented as the shapes on the map, both the target point information A and the registered point information B which constitutes the subject of the identifying operation can be notified in the visible/easy-understandable manner. It should also be noted that the charging unit 5 owned by the notification apparatus of the third embodiment is employed, and then, the charging system may be provided in a case that the registered point information B is made coincident with the target point information A. Also, while both the conversion unit 7 and the table conversion unit 22 are provided which have been explained in the fourth embodiment, after the sorts of both the target point information A and the registered point information B are converted by the conversion unit 7, these converted target/registered point information A/B maybe made coincident with each other.

Ninth Embodiment

Figure 35:
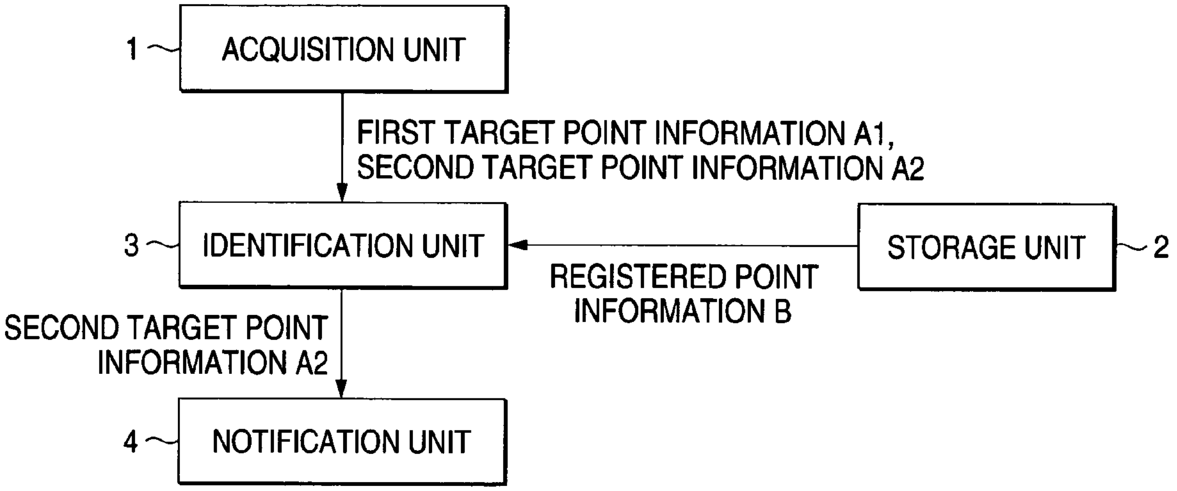
FIG. 35 is a structural block diagram for representing a notification apparatus according to a ninth embodiment of the present invention.

FIG. 35 is a structural block diagram for indicating a notification apparatus according to a ninth embodiment of the present invention. In this drawing, it should be noted that the same reference numerals shown in FIG. 3 (namely, first embodiment) will be employed as those for denoting the same, or similar portions, and explanations thereof are omitted. As indicated in FIG. 35, similar to the notification apparatus of the first embodiment, the notification apparatus according to the ninth embodiment is arranged by employing an acquisition unit 1, a storage unit 2, an identification unit 3, and a notification unit 4. It should also be noted that the acquisition unit 1 of this ninth embodiment is different from that of the first embodiment, and is capable of acquiring a plurality of target point information A.

Figure 36:
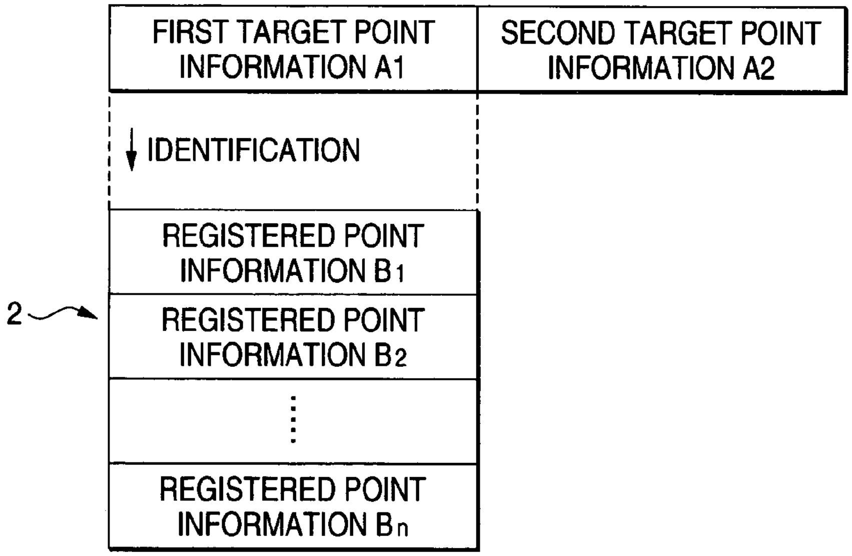
FIG. 36 is an explanatory diagram for showing identification between acquired first target point information A1 and registered point information B stored in a storage unit 2, and second target point information A2.

The acquisition unit 1 of this ninth embodiment acquires first target point information “A1” where an accident occurring point to which an emergency vehicle is dispatched is defined as a first target point, and also acquires second target point information “A2” where a medical treatment point to which the emergency vehicle is dispatched so as to perform a medical treatment is defined as a second target point. Also, the identification unit 3 of this ninth embodiment identifies the first target point information A1 with the registered point information B stored in the storage unit 2. When the first target point information A1 is made coincident with the registered point information B, this identification unit 3 notifies the acquired second target point information A2 in connection with an identification result to the notification unit 4, while this identification result informs that the first target point information A1 is made coincident with the registered point information B. FIG. 36 shows the identifying operation executed between the acquired first target point information A1 and the registered point information B stored in the storage unit 2.

As previously described, in accordance with the notification apparatus and the notification method of this ninth embodiment, when trouble and accident happen to occur at a registered point, in such a case that the owner of the notification apparatus faces to such a risky opportunity that, for instance, the emergency vehicle is dispatched to the own home and the own family, this owner can immediately go to the family since the owner can know such a destination as a hospital where a medical treatment of an injured person is carried out. Alternatively, while the acquisition unit 1 acquires three, or more target point information A, the acquisition unit 1 may identify the first target point information A1 with the registered point information B and may notify the second target point information A2 and the subsequent target point information, so that a plurality of destination places may be notified to the owner.

Also, the second target point information A2 may be realized by the address information J, the telephone number information T, the personal ID information K, and also the positional information I. In such a case that the second target point information A2 corresponds to the address information J, the telephone number information T, the personal ID information K, and also the positional information I, the conversion unit 7 explained in the fourth embodiment may be employed so as to convert this second target point information A2 into the positional information I, and may represent this second target point information A2 as dots on the map. Alternatively, this notification apparatus may be provided with the map forming unit 10 which has been explained in the seventh embodiment. Also, the notification apparatus may notify such registered point information B which is made coincident with the second target point information A2.

Tenth Embodiment

Figure 37:
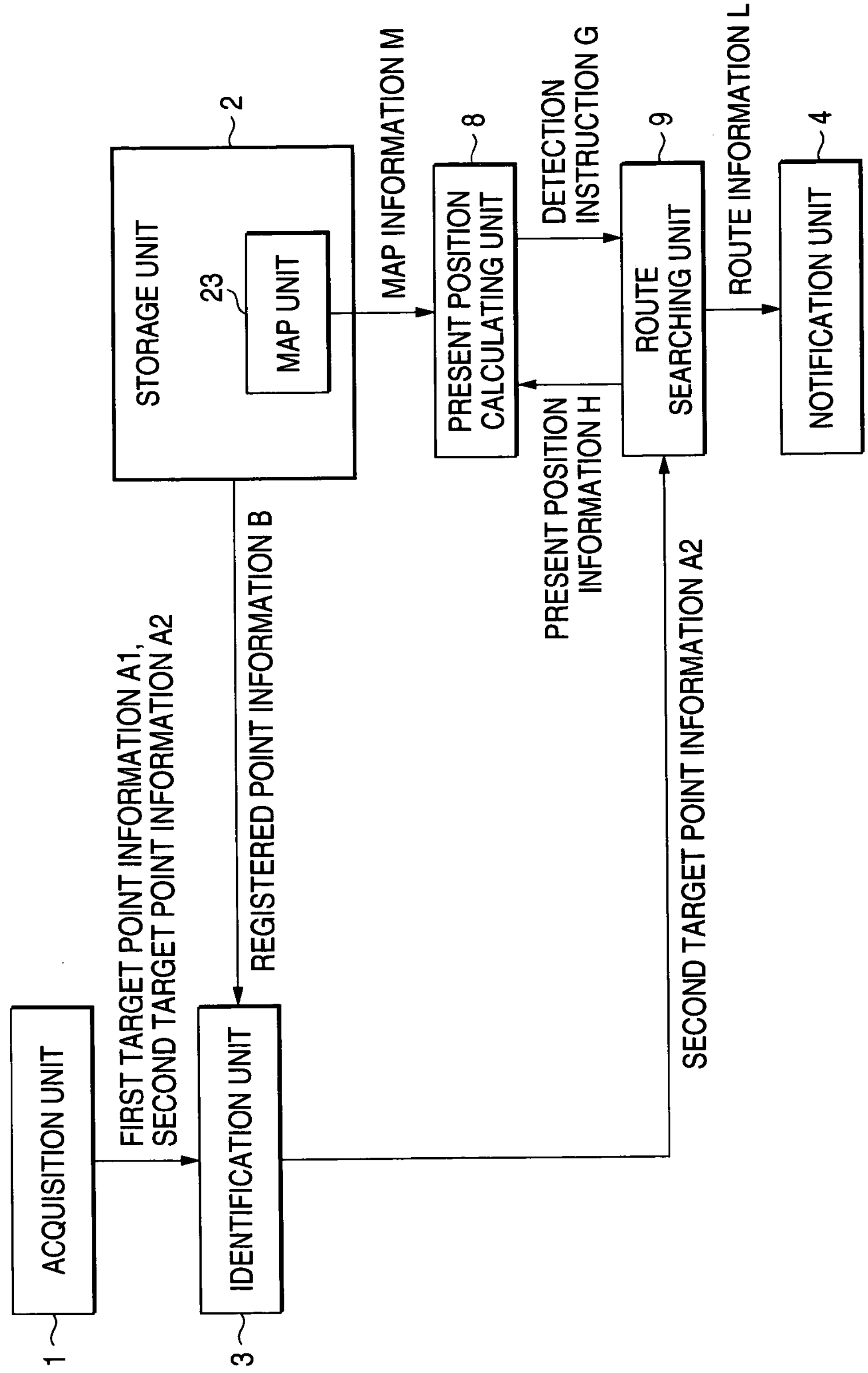
FIG. 37 is a structural block diagram for representing a notification apparatus according to a tenth embodiment of the present invention.

FIG. 37 is a structural block diagram for indicating a notification apparatus according to a tenth embodiment of the present invention. In this drawing, it should be noted that the same reference numerals shown in FIG. 35 (namely, ninth embodiment) will be employed as those for denoting the same, or similar portions, and explanations thereof are omitted.

As indicated in FIG. 37, the notification apparatus according to the tenth embodiment is arranged by further employing a present position calculating unit 8 and a route searching unit 9 in addition to the structural elements owned by the notification apparatus according to the ninth embodiment. This present position calculating unit 8 corresponds to a present position detecting means, and detects a present position. The route searching unit 9 corresponds to a route searching means, and searches a route defined between two points. A storage unit 2 contains therein a map unit 23.

Also, an identification unit 3 identifies first target point information A1 acquired by an acquisition unit 1 with registered point information B stored in the storage unit 2 in response to a sort of the first target point A1 and a sort of the registered point information B, while a conversion unit 7 (not shown) is employed in a proper manner. When the first target point information A1 is made coincident with the registered point information B, the identification unit 3 sends second target point information A2 to the route searching unit 9. When the route searching unit 9 receives the second target point information A2 from the identification unit 3, this route searching unit 9 outputs a detection instruction "G" to the present position detecting unit 8. When the present position detecting unit 8 receives the detection instruction G, the present position detecting unit 8 detects a present position to return present positional information "H" to the route searching unit 9.

While the route searching unit 9 sets the present positional information H received from the present position detecting unit 8 as a starting point and also sets the second target point information A2 received from the identification unit 3 as an end point, this route searching unit 9 searches a route defined between two points, namely between the starting point and the endpoint by employing the map unit 23 which stores therewith map information M in addition to especially a transportation network in which connections of roads and railroads are prepared. Then, this route searching unit 9 sends route information L to the notification unit 4. The route information "L" corresponds such information indicative of railroad names and station names, such information representative of road names and crossing names, or such information that searched routes are indicated on a map in a conspicuous manner. The notification unit 4 notifies the route information L received from the route searching unit 9 to the owner of the notification apparatus.

As previously explained, in accordance with the notification method and the notification method of this tenth embodiment, since the owner can know such a route defined from the present position up to the target point indicated by the second target point information A2, the owner can grasp such a route up to a destination, for example, a hospital so as to perform a medical treatment, and thus, the own can quickly go to the place where the medical treatment is carried out. It should also be noted that the searching unit 9 of this tenth embodiment searches the route defined from the present position up to the target point indicated by the second target point information A2. Alternatively, this route searching unit 9 may search such a route defined from the present position up to a target point A1 indicated by the first target point information A1.

Eleventh Embodiment

Figure 38:
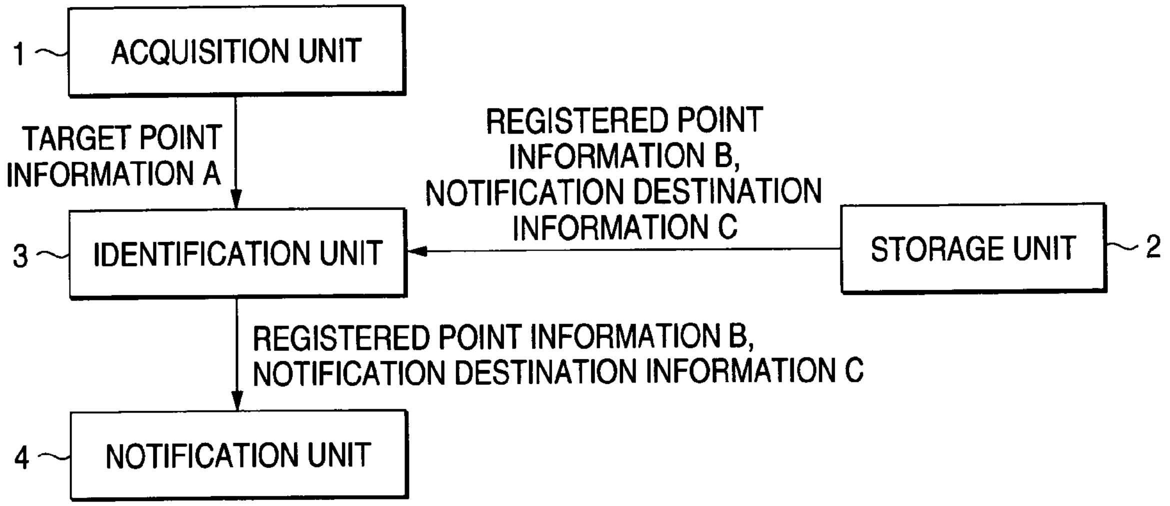
FIG. 38 is a structural block diagram for representing a notification apparatus according to an tenth embodiment of the present invention.
Figure 39:
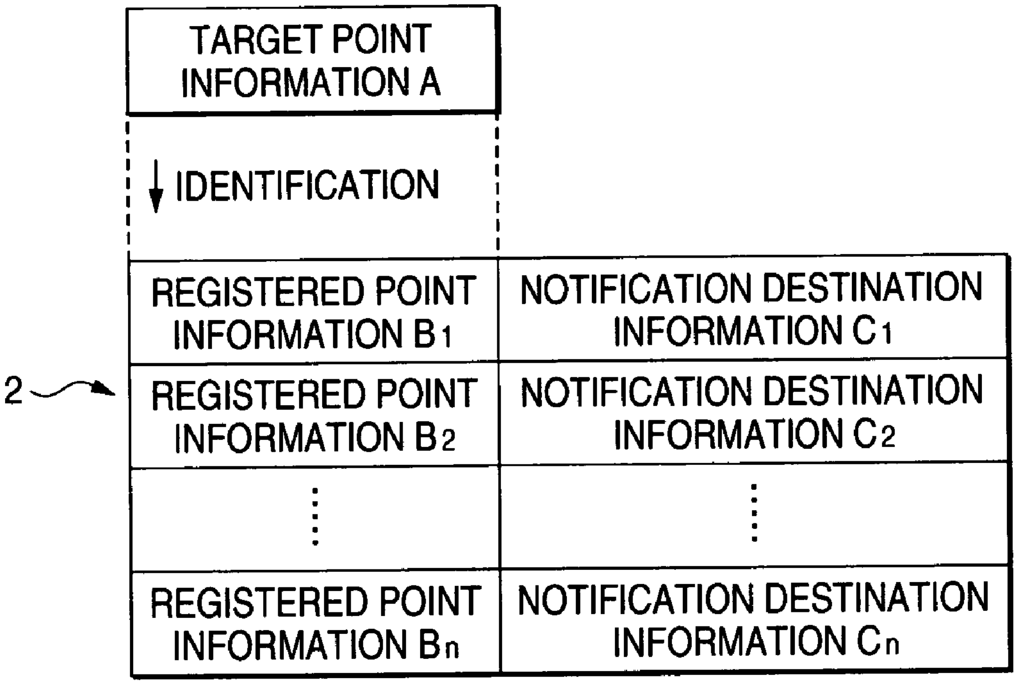
FIG. 39 is an explanatory diagram for showing acquired first target point information A, and registered point information B stored in the storage unit 2, and notification destination information C which constitutes a pair with respect to the registered point information B.

FIG. 38 is a structural block diagram for indicating a notification apparatus according to an eleventh embodiment of the present invention. In this drawing, it should be noted that the same reference numerals shown in FIG. 3 (namely, first embodiment) will be employed as those for denoting the same, or similar portions, and explanations thereof are omitted. As indicated in FIG. 38, similar to the notification apparatus of the first embodiment, the notification apparatus according to the eleventh embodiment is arranged by employing an acquisition unit 1, a storage unit 2, an identification unit 3, and a notification unit 4. It should also be noted that the storage unit 2 of this eleventh embodiment stores thereinto registered point information B and notification destination information C in a pain mode, which is different from the storage unit 2 of the first embodiment. FIG. 39 represents acquired target point information A, the registered point information B stored in the storage unit 2, and the notification destination information C which constitutes the pair with the registered point information B. In this eleventh embodiment, one record is constituted by such two fields as the registered point information B and the notification destination information C.

The identification unit 3 of this eleventh embodiment identifies as to whether or not the target point information A acquired in the acquisition unit 1 is made coincident with either the registered point information B or the notification destination information C, which are stored in the storage unit 2. As a result of this identifying operation, when these target point information A, and registered point information B, or notification destination information C are made coincident with each other, the identification unit 3 sends to the notification unit 4, both the registered point information B and the notification destination information C which constitutes the pair with this registered point information B. The notification unit 4 notifies such a fact that the target point information A is made coincident with the registered point information B to such a notification destination indicated by the notification destination information C.

Figure 40:
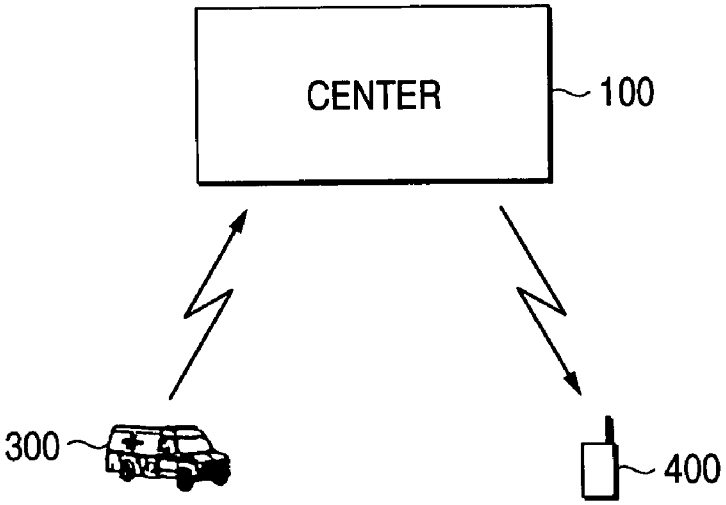
FIG. 40 is an explanatory diagram for indicating such a manner that how a notification apparatus is used.

The notification apparatus of this eleventh embodiment maybe provided with a center, while this center totally manages dispatch destinations, namely accident occurring points of emergency vehicles within a certain region. For instance, while one's house and offices of families are registered as the registered point information B into the storage unit 2, and further, the own telephone number, the own portable telephone number, and the like are registered as the notification destination information C into this storage unit 2, the notification unit 4 executes notifying operation by using a telephone line. FIG. 40 represents one example when this notifying operation is carried out. In this drawing, reference numeral 300 shows an emergency vehicle, and reference numeral 100 indicates a center equipped with the notification apparatus. This center 100 totally manages, especially, dispatch destinations as accident occurring points of the emergency vehicle 300. Also, reference numeral 400 represents a hand-carryable telephone such as a portable telephone. It should be noted that as the center 100, a fire department (fire station), and a police station may be employed. Alternatively, as this center 100, such a center may be employed which totally manages dispatch destinations of emergency vehicles belonging to a plurality of fire departments and a plurality of police stations.

As previously explained, in accordance with the notification method and the notification method of this eleventh embodiment, even when the notification apparatus is not owned, such a notification that the own home and the own family face to such a risky opportunity that the emergency vehicle is dispatched can be issued. Also, if the communication destinations as to all of the families and also the communication destinations of persons which are wanted to be contacted to the families are registered into the notification destination information C, then notification can be made without any mistakes when trouble/accident happen to occur.

It should also be noted that the notification apparatus maybe provided with the conversion unit 7, the table conversion unit 22, and the map unit 23, which have been explained in the above-described embodiment. Also, while the conversion unit 7 is employed, the notification apparatus may convert the sort of the target point information A and the sort of the registered point information B so as to be identified with each other, and may absorb the error between the target point information A and the registered point information B. Alternatively, the identification unit 3 may identify as to whether or not the target point information is location within a constant range where the registered point information B is located at a center thereof. In a case that the target point information A is made coincident with all of the registered point information B, and when the target point information A is located within a constant range, the identification unit 3 may notify such a fact by way of different notification methods. Furthermore, the notification apparatus may be provided with the map forming unit 10 explained in the above-described embodiment, the identification unit 3 may notify such a fact based upon the map.

Also, while the acquisition unit 1 acquires both the first target point information A1 as the accident occurring point to which the emergency vehicle is dispatched and the second target point information A2 as the medical treatment point to which the emergency vehicle is directed so as to perform the medical treatment, the identification unit 3 identifies the first target point information A1 with the registered point information B. As a result of this identifying operation, if the first target point information A1 is made coincident with the registered point information B, the notification unit 4 may notify the second target point information A2. Also, while the notification apparatus is provided with both the present position detecting unit 8 and the route searching unit 9, which have been explained in the above-described embodiment, the notification unit 4 may notify the route information L defined from the present position of the notification destination information C up to the second target point information A2.

Also, if a plurality of the registered point information B are arranged in the ascent order, or the descent order to be stored in the storage unit 2, then the identifying operation may be quickly carried out in the identification unit 3. In this alternative case, the identification unit 3 does not accomplish the identifying operation in a case that one of the registered point information B is made coincident with the target point information A, but performs the identifying operation in the storage unit 2 after the registered point information B has been made coincident with the target point information A until this registered point information B is not made coincident therewith. As a result, in such a case that one registered point information B corresponds to a plurality of notification destination information C, the correct identifying operation may be carried out. Also, since the plural registered point information B need not be identified until the final registered point information B, the identifying operation may be quickly ended.

Furthermore, FIG. 39 indicates such an example that one registered point information B corresponds to one notification destination information C. Alternatively, another arrangement may be realized in such a manner that a plurality of notification destination information may correspond to one registered point information B, or a plurality of registered point information B may correspond to one notification destination information C.

Twelfth Embodiment

Figure 41:
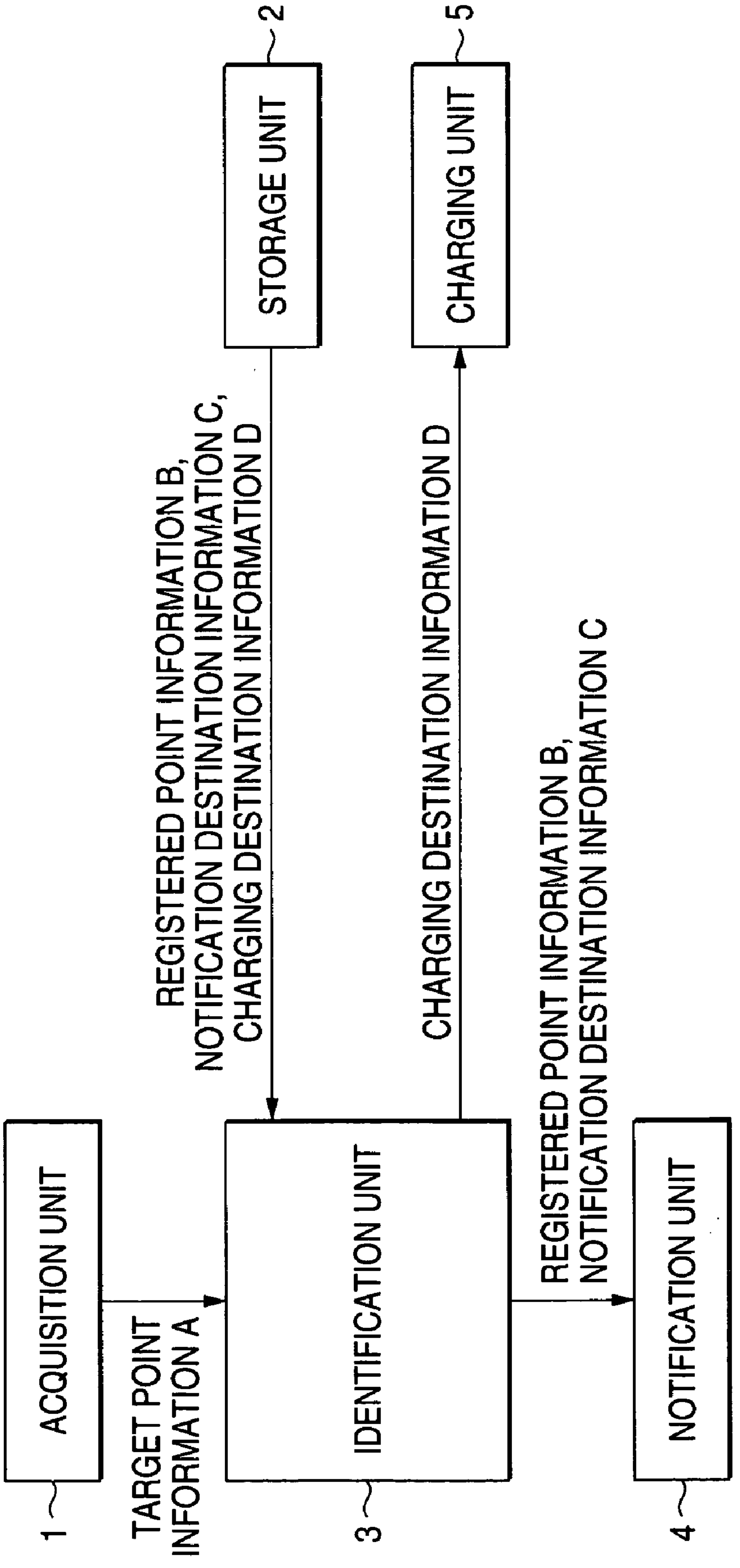
FIG. 41 is a structural block diagram for indicating a notification apparatus according to a twelfth embodiment of the present invention.

FIG. 41 is a structural block diagram for indicating a notification apparatus according to a twelfth embodiment of the present invention. In this drawing, it should be noted that the same reference numerals shown in FIG. 38 (namely, eleventh embodiment) will be employed as those for denoting the same, or similar portions, and explanations thereof are omitted.

As indicated in FIG. 41, the notification apparatus according to the twelfth embodiment is arranged by further employing a charging unit 5 (charging means) in addition to the structural elements owned by the notification apparatus according to the eleventh embodiment. A storage unit 2 stores thereinto registered point information B, notification destination information C, and charging destination information D in a pair mode. FIG. 42 represents acquired target point information A, the registered point information B stored in the storage unit 2, and the notification destination information C, and also the charging destination information D stored in this storage unit 2. One record is constituted by such three fields as the registered point information B and the notification destination information C, and also the charging destination information D.

The identification unit 3 of this twelfth embodiment identifies as to whether or not the target point information A acquired in the acquisition unit 1 is made coincident with either the registered point information B or the notification destination information C, which are stored in the storage unit 2. As a result of this identifying operation, when these target point information A and registered point information B, or notification destination information C are made coincident with each other, the identification unit 3 sends to the notification unit 4, both the registered point information B and the notification destination information C which constitutes the pair with this registered point information B, and also this identification unit 3 sends the charging destination information D which constitutes the above-described information B and C to the charging unit 5. The charging unit 5 of this embodiment charges a fee as to a charging destination which is indicated by the charging destination information D sent from the charging unit 3.

As previously described, in accordance with the notification apparatus and the notification method of this twelfth embodiment, since the charging unit can charge the fee only to such a charging destination which is indicated by the charging destination information D corresponding to the registered point information B which is made coincident with the target point information A, a service provider can provide a service with a flexible fee system as an emergency-event-notifying-service fee system. It should be noted that in FIG. 42, both one notification point information C and one charging destination information D correspond to one registered point information B. Alternatively, both a plurality of notification destination information C and a plurality of charging destination information D may correspond to one registered point information B. Also, a plurality of registered point information B may correspond to both one notification destination information C and one charging destination information D.

Thirteenth Embodiment

Figure 43:
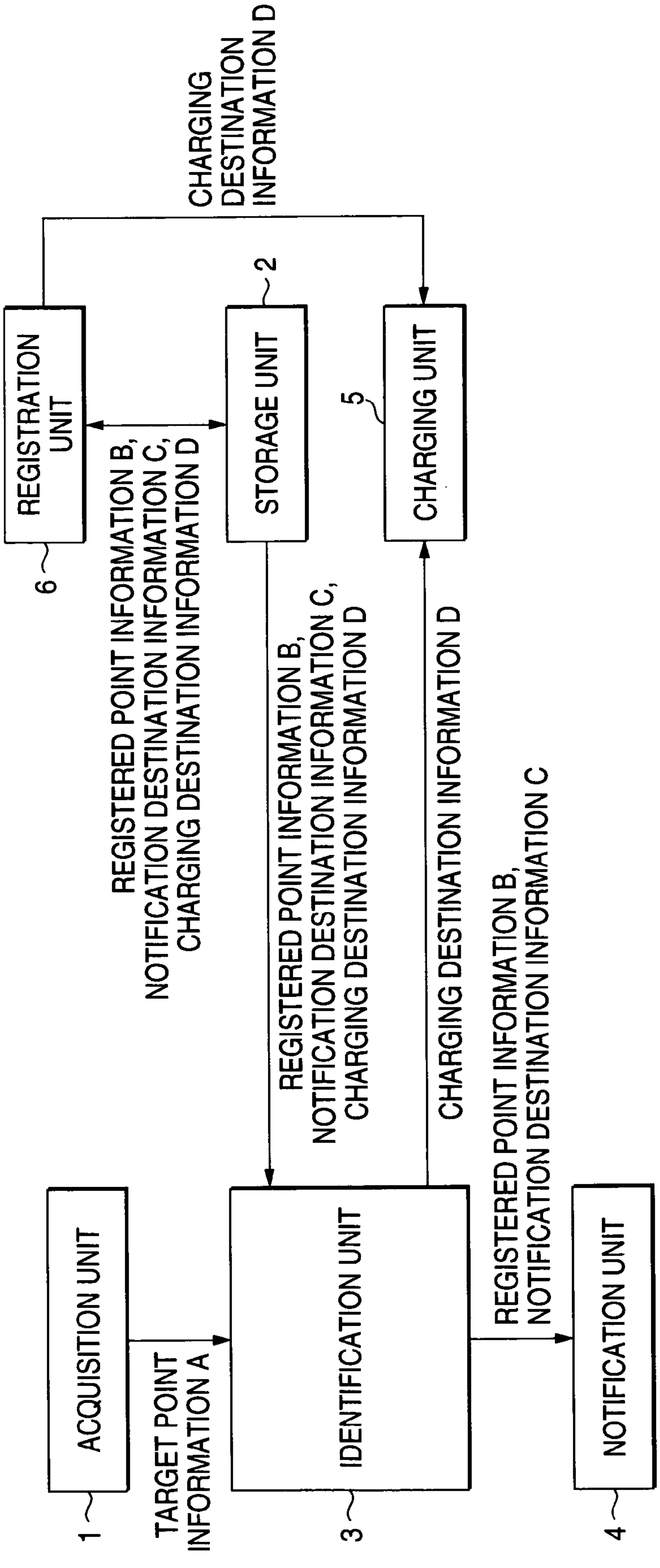
FIG. 43 is a structural block diagram for indicating a notification apparatus according to a thirteenth embodiment of the present invention.

FIG. 43 is a structural block diagram for indicating a notification apparatus according to a thirteenth embodiment of the present invention. In this drawing, it should be noted that the same reference numerals shown in FIG. 41 (namely, twelfth embodiment) will be employed as those for denoting the same, or similar portions, and explanations thereof are omitted.

As indicated in FIG. 43, the notification apparatus according to the thirteenth embodiment is arranged by further employing a registration unit 6 (registration means) in addition to the structural elements owned by the notification apparatus according to the twelfth embodiment.

The registration unit 6 is employed so as to refer, add, or delete registered point information B, notification destination information C, or charging destination information D, which are stored in a storage unit 2, in response to a request issued from a user. In a case that either an adding request or a deleting request is issued, the registration unit 6 supplies to the charging unit 5, such a charging destination information D formed by combining the registered point information B, the notification destination information C, and the charging destination information D, which are requested to be added, or deleted. At this time, the charging unit 5 charges a fee to a charging destination indicated by the received charging destination information D.

As previously explained, in accordance with the notification apparatus of this thirteenth embodiment, the combination among the registered point information B, the notification destination information C, and the charging destination information D, which are used in the charging operation, can be changed at any time by employing the registration unit 6. As a consequence, the notification apparatus can be used under better user friendly condition. Also, in a case that either the adding request or the deleting request is issued from the registration unit 6 as to the registered point information B, the notification destination information C, and the charging destination information D, the charging unit 5 can charge the fee to the charging destination indicated by the charging destination information D which is formed by combining the registered point information B, the notification destination information C, and the charging destination information D, which are requested to be added, or deleted. As a result, the notification apparatus can provide services of various charging systems.

Fourteenth Embodiment

Figure 44:
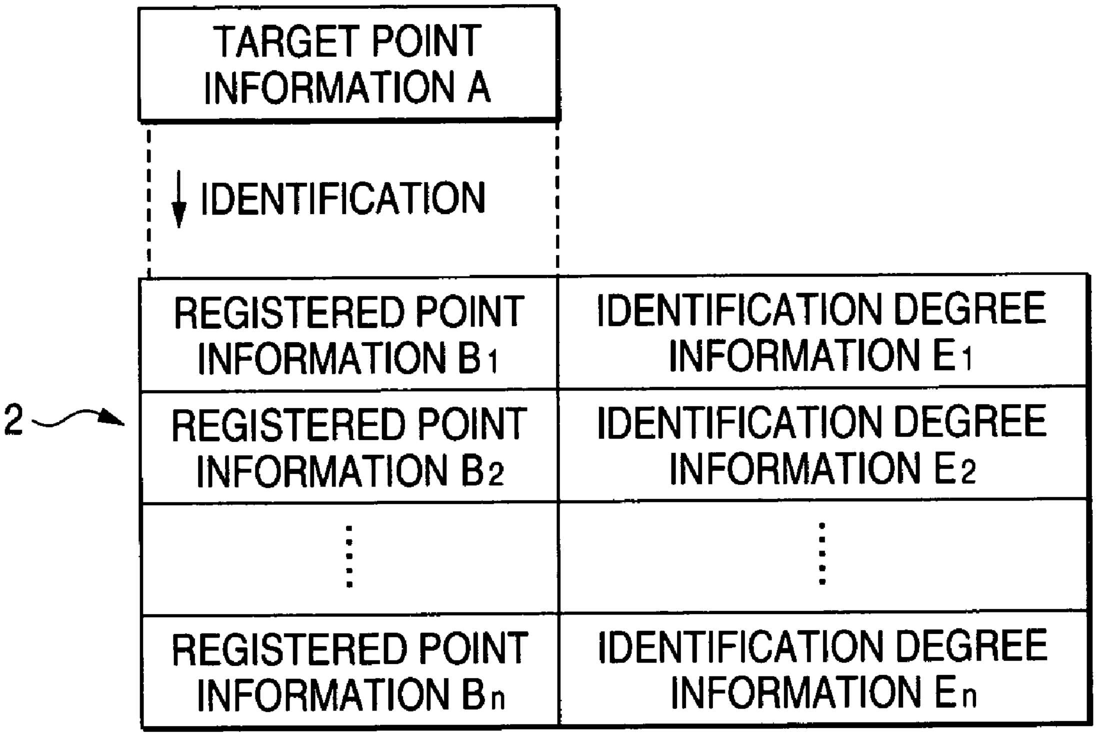
FIG. 44 is an explanatory diagram for showing the acquired target point information A, the registered point information B stored in the storage unit 2, and identification degree information E.

A notification apparatus according to a fourteenth embodiment of the present invention is arranged in a similar structure to that of the notification apparatus of the first embodiment. A storage unit 2 of this fourteenth embodiment stores thereinto identification degree information "E" (will be explained later) corresponding to registered point information B in addition to the registered point information B. FIG. 44 indicates acquired target point information A, and both the registered point information B and the identification degree information E, which are stored in the storage unit 2. In this case, one record is constituted by such two fields as the registered point information B and the identification degree information E. The identification degree information E indicates that any one of the target point information A and the registered point information B is made valid while an identifying operation is carried out by the identification unit 3, namely indicates this result as ON, or OFF.

When the registered point information B is identified with the target point information A, the identification unit 3 of this 14th embodiment changes an identification range between the target point information A and the registered point information B based upon the identification degree information E. Also, the notification unit 4 of this embodiment changes a notification method based upon the identification degree information E.

Referring now to FIG. 45, a description will be made of a representation method of the identification degree information E and the notification method of this fourteenth embodiment. A concrete example shown in FIG. 45 is such an example that an identifying operation is carried out based upon address information J.

In this drawing, both the target point information A and the registered point information B, which are used during the identifying operation, are represented by 25 digits, respectively. That is, digit numbers 1 to 2 show "prefectures"; digit numbers 3 to 5 represent "shi/ku/cho/son (city/ward/town/village)"; digit numbers 6 to 8 denote "oaza (section of city/ward/town/village)"; digit numbers 9 to 10 indicate "chome (subsection)"; digit numbers 11 to 15 show "banchi (block number)"; digit numbers 16 to 20 indicate "go (house number)"; and also digit numbers 21 to 25 represent "room number". For example, such digits of "1410908399001000010100102" shown in FIG. 45*a*) indicate "room number 102, 100-banchi 101-go, Tsunashima-nishi 99-chome, kohoku-ku, Yokohama-shi, Kanagawa".

Similarly, the identification degree information E is constructed of 25 digits. Among these 25 digits of both the target point information A and the registered point information B which are used in an identifying operation, a digit for making the identifying operation valid is expressed by "1", and a digit for making the identifying operation invalid is represented by "0". For example, among digits of "1111111111111110000000000" shown in FIG. 45*b*), since digit numbers 1 to 15 are "1" and digit numbers 16 to 25 are "0", items which become valid in an identifying operation correspond to "prefectures", "shi/ku/cho/son", "oaza", "chome", and "banchi".

When the identification unit 3 identifies the target point information A acquired from the acquisition unit 1 with the registered point information B stored in the storage unit 2, the identification unit 3 identifies these target/registered point information A/B only when the identification degree information E is digits of "1". When these target/registered point information A and B made coincident with each other, the identification unit 3 sends such an identification degree information E corresponding to the coincident registered point information B to the notification unit 4. The notification unit 4 changes the notification method based upon the received identification degree information E, and then notifies this changed notification method. For instance, in such a case that the received identification degree information E is constituted by "1", the notification unit 4 displays "! emergency event happens to occur !", whereas in such a case that the received identification degree information E is not constituted by "1", the notification unit 4 shows "emergency vehicle is being dispatched", which may represent differences.

As previously explained in accordance with the notification apparatus and the notification method of this fourteenth embodiment, the identification unit can determine that which portions of both the target point information A and the registered point information B are made valid based upon the identification degree information E, which are utilized in the identifying operation. As a consequence, the identification unit can perform the identifying operations under plural conditions in response to individual requests sent from the users of the notification apparatus, and thus can perform the identifying operations in more flexible manners. It should also be noted that as explained in the above-described embodiment, the notification unit may also notify the coincident registered point information B, and may display the registered point information B on the map by dots. Also, the storage unit 2 stores thereinto both the notification destination information C and the charging destination information D in correspondence with the registered point information B other than both the registered point information B and the identification degree information E. Furthermore, as represented in a sixteenth embodiment, the registration unit 6 capable of registering therein the identification degree information E in addition to the registered point information B, the notification degree information C, and the charging destination information D may be provided.

In the above-described embodiments (first to fourteenth embodiments), such a description has been made that the target point indicated by the target point information A is such a target point to which the emergency vehicle is dispatched. Alternatively, the present invention is not limited to the emergency vehicle, but may be applied to automobiles such as general-purpose automobiles and taxis, which do not require emergency uses, and also may be applied to trains.

INDUSTRIAL APPLICABILITY

As previously explained, in accordance with the notification apparatus, the notification method, and the storage medium of the present invention, while the storage means has previously stored thereinto the registered point information capable of specifying the desirable point, in the acquisition means (acquisition step), the target point information is acquired which is capable of specifying the target point to which the vehicle is directed. In this identification means (identification step), the acquired target point information is identified with the registered point information stored in the storage means so as to judge as to whether or not this target point information is made coincident with the registered point information. In the notification means (notification step), the identification result obtained from the identification means (identification step) is notified.

For instance, when a user home and locations of families/acquaintances are registered in the registered point information, in such a case that a vehicle such as an ambulance car and a fire engine is dispatched to an accident occurring point, and this target point is made coincident with a registered point which has been previously registered by the user, since this fact may be notified to the user (owner of notification apparatus), the user can quickly know that the emergency event happens to occur at the locations of the families and acquaintances.

The invention claimed is:

1. A notification apparatus comprising:

an acquisition unit for acquiring target point information capable of specifying a target point to which a vehicle is directed;

a storage unit for previously storing thereinto registered point information capable of specifying a desirable point;

an identification unit for identifying said target point information acquired by said acquisition unit with said registered point information stored in the storage unit to judge as to whether or not said target point information is made coincident with said registered point information; and a notification unit for notifying an identification result obtained by said identification unit.

2. The notification apparatus as claimed in claim 1, wherein said notification unit notifies the identification result when said target point information is made coincident with said registered point information.

3. The notification apparatus as claimed in claim 1, wherein said notification unit notifies the registered point information which is made coincident with said target point information in connection with the identification result.

4. The notification apparatus as claimed in claim 1, further comprising a charging unit for charging a fee to a predetermined charging destination when said target point information is made coincident with said registered point information.

5. The notification apparatus as claimed in claim 1, further comprising a conversion unit for converting either a sort of said target point information or a sort of said registered point information when sorts of the target point information and of the registered point information, which are identified with each other by said identification unit, are different from each other.

6. The notification apparatus as claimed in claim 5, wherein, when at least one of said target point information and said registered point information corresponds to positional information indicative of a predetermined point, said conversion unit converts said positional information into address information by employing a correspondence relationship between the positional information indicative of the predetermined point and address information indicative of an address of said predetermined point.

7. The notification apparatus as claimed in claim 1, wherein said identification unit judges as to whether or not a target point indicated by the target point information which is acquired by said acquisition unit is located within a predetermined range where a registered point is located at a center thereof and said registered point is indicated by the registered point information which is stored in said storage unit.

8. The notification apparatus as claimed in claim 7, wherein said notification unit performs notifying operations indifferent notification systems between when said target point information is made coincident with said registered point information and when said target point is located within said predetermined range of the registered point.

9. The notification apparatus as claimed in claim 1, wherein said identification unit produces a map forming instruction containing at least one of positional information and address information based upon a result of identifying the target point information acquired by said acquisition unit with the registered point information stored in said storage unit, wherein said storage unit includes a map information storage unit for storing thereinto map information used to display a map, wherein said notification apparatus further comprises a map forming unit for deriving from said map information storage unit, map information of an area containing all of positions which are indicated by either the positional information or the address information, which are contained in the map forming instruction produced by said identification unit, and for forming such a map information that the positions indicated by either said positional information or said address information are represented as signs, wherein said notification unit displays the map information which is formed by said map forming unit.

10. The notification apparatus as claimed in claim 9, wherein said identification unit produces the map forming instruction, while registered point information which is made coincident with said target point information is used as the positional information, wherein, in case that there is no registered point information which is made coincident with said target point information, said identification unit produces the map forming instruction while both said target point information and the registered point information registered in said storage unit are used as the positional information.

11. The notification apparatus as claimed in claim 9, wherein, if address information contained in the map forming instruction produced by said identification unit is coarser than address information contained in said map information, said map forming unit derives map information of such address information which is partially made coincident with the address information of said map forming instruction.

12. The notification apparatus as claimed in claim 1, wherein said acquisition unit acquires second target point information capable of specifying a second target point subsequent to the target point information capable of specifying the target point to which the vehicle is directed, wherein said notification unit notifies said second target point information when said target point information is made coincident with the registered point information stored in said storage unit as a result of the identifying operation by said identification unit.

13. The notification apparatus as claimed in claim 1, further comprising:

a present position detecting unit for detecting a present position of said notification apparatus; and a route searching unit for searching a route defined from said present position detected by said present position detecting unit up to either said target point or said second target point, wherein said notification unit notifies the route searched by said route searching unit.

14. The notification apparatus as claimed in claim 1, wherein said storage unit stores thereinto notification destination information indicative of a notification destination to which said notification unit notifies the identification result in correspondence with said registered point information, wherein said notification unit notifies the identification result to the notification destination which is indicated by said notification destination information, which corresponds to either the registered point information which is made coincident with said target point information by said identification unit or the registered point information in which a target point indicated by said target point information is located in a predetermined range including the registered point at a center thereof.

15. The notification apparatus as claimed in claim 4, wherein said storage unit stores thereinto charging destination information indicative of a charging destination to which said charging unit charges the fee in correspondence with said registered point information, wherein said charging unit charges the fee to the charging destination which is indicated by said charging destination information, which corresponds to either the registered point information which is made coincident with said target point information by said identification unit or the registered point information in which a target point indicated by said target point information is located in a predetermined range including the registered point at a center thereof.

16. The notification apparatus as claimed in claim 14, further comprising:

a registration unit for referring said registered point information, said notification destination information, or said charging destination information; for deleting said registered point information, said notification destination information, or said charging destination information from said recording unit; and for adding said registered point information, said notification destination information, or said charging destination information to said recording unit.

17. The notification apparatus as claimed in claim 1, wherein said storage unit stores thereinto identification degree information which determines a range of an identifying operation when said target point information is identified with said registered point information, wherein said identification unit identifies said target point information with said registered point information based upon said identification degree information, wherein said notification unit notifies the identification result in different notification systems in response to said identification degree information.

18. A notification method using a notification apparatus equipped with a storage unit for previously storing thereinto registered point information capable of specifying a desirable point, comprising:

an acquisition step for acquiring target point information capable of specifying a target point to which a vehicle is directed;

an identification step for identifying said target point information acquired by said acquisition step with said registered point information stored in the storage unit to judge as to whether or not said target point information is made coincident with said registered point information; and a notification step for notifying an identification result obtained by said identification step.

19. The notification method as claimed in claim 18, wherein said notification step notifies the identification result when said target point information is made coincident with said registered point information.

20. The notification method as claimed in claim 18, wherein said notification step notifies the registered point information which is made coincident with said target point information in connection with the identification result.

21. The notification method as claimed in claim 18, wherein said notification method is comprised of a charging step for charging a fee to a predetermined charging destination when said target point information is made coincident with said registered point information.

22. The notification method as claimed in claim 18, further comprising:

a conversion step for converting either a sort of said target point information or a sort of said registered point information when sorts of the target point information and of the registered point information, which are identified with each other by said identification step, are different from each other.

23. The notification method as claimed in claim 22, wherein, when at least one of said target point information and said registered point information corresponds to positional information indicative of a predetermined point, said conversion step converts said positional information into address information by employing a correspondence relationship between the positional information indicative of the predetermined point and address information indicative of an address of said predetermined point.

24. The notification method as claimed in claim 18, wherein said identification step judges as to whether or not a target point indicated by the target point information which is acquired by said acquisition step is located within a predetermined range where a registered point is located at a center thereof and said registered point is indicated by the registered point information which is stored in said storage unit.

25. The notification method as claimed in claim 24, wherein said notification step performs notifying operations in different notification systems between when said target point information is made coincident with said registered point information and when said target point is located within said predetermined range of the registered point.

26. The notification method as claimed in claim 18, wherein said storage unit includes a map information storage unit for storing map information used to display a map, wherein said identification step includes a map forming instruction producing step which produces a map forming instruction containing at least one of positional information and address information based upon a result of identifying the target point information acquired by said acquisition step with the registered point information stored in said storage unit, wherein said notification method further comprises a map forming step for deriving from said map information storage unit, map information of an area containing all of positions which are indicated by either the positional information or the address information, which are contained in the map forming instruction produced by said map forming instruction producing step, and for forming such a map information that the positions indicated by either said positional information or said address information are represented as signs, wherein said notification step displays the map information which is formed by said map forming step.

27. The notification method as claimed in claim 26, wherein said map forming instruction producing step produces the map forming instruction, while registered point information which is made coincident with said target point information is used as the positional information, wherein, in a case that there is no registered point information which is made coincident with said target point information, said map forming instruction producing step produces the map forming instruction while both said target point information and the registered point information registered in said storage unit are used as the positional information.

28. The notification method as claimed in claim 26, wherein, if address information contained in the map forming instruction produced by said map forming instruction producing step is coarser than address information contained in said map information, said map forming step derives map information of such address information which is partially made coincident with the address information of said map forming instruction.

29. The notification method as claimed in claim 18, further comprising:

a second acquisition step for acquiring second target point information capable of specifying a second target point, subsequent to said acquisition step, wherein said notification step notifies said second target point information when said target point information is made coincident with the registered point information stored in said storage unit as a result of the identifying operation by said identification step.

30. The notification method as claimed in claim 18, further comprising:

a present position detecting step for detecting a present position of said notification apparatus; and a route searching step for searching a route defined from said present position detected by said present position detecting step up to either said target point or said second target point, wherein said notification step notifies the route searched by said route searching step.

31. The notification method as claimed in claim 18, wherein said storage unit stores thereinto notification destination information indicative of a notification destination to which said notification step notifies the identification result in correspondence with said registered point information, wherein said notification step notifies the identification result to the notification destination which is indicated by said notification destination information, which corresponds to either the registered point information which is made coincident with said target point information by said identification step or the registered point information in which a target point indicated by said target point information is located in a predetermined range including the registered point at a center thereof.

32. The notification method as claimed in claim 21, wherein said storage unit stores thereinto charging destination information indicative of a charging destination to which said charging step charges a fee in correspondence with said registered point information, wherein said charging step charges the fee to the charging destination which is indicated by said charging destination information, which corresponds to either the registered point information which is made coincident with said target point information by said identification step or the registered point information in which a target point indicated by said target point information is located in a predetermined range including the registered point at a center thereof.

33. The notification method as claimed in claim 18, wherein said storage unit stores there into identification degree information which determines a range of an identifying operation when said target point information is identified with said registered point information, wherein said identification step identifies said target point information with said registered point information based upon said identification degree information, wherein said notification step notifies the identification result in different notification systems in response to said identification degree information.

34. A computer readable recording medium wherein a program for causing a computer to execute the notification method recited in claim 18 is recorded.

* * * * *